United States Patent
Carnevali

(10) Patent No.: US 10,179,633 B2
(45) Date of Patent: Jan. 15, 2019

(54) APPARATUS AND METHODS FOR ROUTING

(71) Applicant: Navionics S.R.L., Massarosa (IT)

(72) Inventor: Giuseppe Carnevali, Genoa (IT)

(73) Assignee: Navionics S.R.L. (IT)

( * ) Notice: Subject to any disclaimer, the term of this patent is extended or adjusted under 35 U.S.C. 154(b) by 0 days.

(21) Appl. No.: 15/207,773

(22) Filed: Jul. 12, 2016

(65) Prior Publication Data

US 2016/0318590 A1    Nov. 3, 2016

Related U.S. Application Data

(63) Continuation of application No. 14/146,955, filed on Jan. 3, 2014, now Pat. No. 9,405,445, which is a continuation-in-part of application No. 13/723,655, filed on Dec. 21, 2012, now Pat. No. 9,086,278.

(51) Int. Cl.
| | |
|---|---|
| *B63B 49/00* | (2006.01) |
| *G01C 21/20* | (2006.01) |
| *G06F 3/0481* | (2013.01) |
| *G06F 3/0484* | (2013.01) |
| *G06F 3/14* | (2006.01) |
| *G06T 11/00* | (2006.01) |
| *G09G 5/377* | (2006.01) |

(Continued)

(52) U.S. Cl.
CPC ............... *B63B 49/00* (2013.01); *G01C 21/00* (2013.01); *G01C 21/203* (2013.01); *G06F 3/0481* (2013.01); *G06F 3/0484* (2013.01); *G06F 3/04842* (2013.01); *G06F 3/14* (2013.01); *G06T 11/001* (2013.01); *G09B 29/007* (2013.01); *G09G 5/377* (2013.01); *G06F 2203/04804* (2013.01); *Y02T 70/745* (2013.01)

(58) Field of Classification Search
CPC ...... B63B 49/00; G01C 21/00; G01C 21/203; G06F 3/0481; G06F 3/0484; G06F 3/04842; G06F 3/14; G06F 2203/04804; G06T 11/001; G09B 29/007; G09G 5/377; Y02T 70/745
USPC ......... 701/533, 527, 400, 21; 440/6; 367/99, 367/131; 340/995.19
See application file for complete search history.

(56) References Cited

U.S. PATENT DOCUMENTS

| | | |
|---|---|---|
| 4,837,750 A | 6/1989 | Saunders |
| 5,209,112 A | 5/1993 | McCoy et al. |
| 5,400,300 A | 3/1995 | Bick et al. |

(Continued)

FOREIGN PATENT DOCUMENTS

| | | |
|---|---|---|
| GB | 2474715 | 4/2011 |
| JP | 4108451 | 6/2008 |

(Continued)

OTHER PUBLICATIONS

Invitation to Pay Additional Fees issued in corresponding International Application No. PCT/IB2014/003100.

(Continued)

*Primary Examiner* — Marthe Y Marc-Coleman
(74) *Attorney, Agent, or Firm* — Samuel M. Korte; Max M. Ali

(57) ABSTRACT

An electronic navigational system may automatically develop nautical routes, may retrieve previously-developed nautical routes, or may combine previously developed route(s) or route segment(s) with an automatically developed route or route segment(s).

21 Claims, 37 Drawing Sheets

(51) Int. Cl.
G01C 21/00 (2006.01)
G09B 29/00 (2006.01)

(56) References Cited

U.S. PATENT DOCUMENTS

| | | | |
|---|---|---|---|
| 5,475,651 A | 12/1995 | Bishop et al. | |
| 5,568,450 A | 10/1996 | Grande et al. | |
| 5,785,281 A | 7/1998 | Peter et al. | |
| 6,249,241 B1 | 6/2001 | Jordan et al. | |
| 6,266,610 B1 | 7/2001 | Schultz et al. | |
| 6,289,277 B1 | 9/2001 | Feyereisen et al. | |
| 6,317,684 B1 | 11/2001 | Roeseler et al. | |
| 6,356,837 B1 | 3/2002 | Yokota et al. | |
| 6,381,538 B1 | 4/2002 | Robinson et al. | |
| 6,469,664 B1 | 10/2002 | Michaelson et al. | |
| 6,622,085 B1 | 9/2003 | Amita et al. | |
| 6,653,947 B2 | 11/2003 | Dwyer et al. | |
| 6,680,694 B1 | 1/2004 | Knockeart et al. | |
| 6,697,329 B1 | 2/2004 | McAllister et al. | |
| 6,721,694 B1 | 4/2004 | Lambrecht et al. | |
| 6,734,808 B1 | 5/2004 | Michaelson et al. | |
| 6,750,815 B2 | 6/2004 | Michaelson et al. | |
| 6,754,485 B1 | 6/2004 | Obradovich et al. | |
| 6,865,452 B2 | 3/2005 | Burdon | |
| 6,865,476 B1 | 3/2005 | Jokerst, Sr. | |
| 6,934,657 B1 | 8/2005 | Carlson et al. | |
| 6,973,570 B1 | 12/2005 | Hamlin | |
| 7,006,406 B2 | 2/2006 | Fujimoto et al. | |
| 7,209,070 B2 | 4/2007 | Gilliland et al. | |
| 7,209,829 B2 * | 4/2007 | Litvack | G01C 21/203 340/984 |
| 7,268,703 B1 | 9/2007 | Kabel et al. | |
| 7,768,447 B2 | 8/2010 | Pryszo et al. | |
| 7,973,705 B2 | 7/2011 | Cunning et al. | |
| 8,069,006 B1 | 11/2011 | Majzlik et al. | |
| 8,082,100 B2 | 12/2011 | Grace et al. | |
| 8,296,001 B1 | 10/2012 | Kabel et al. | |
| 8,332,174 B1 | 12/2012 | Majzlik et al. | |
| 8,417,451 B2 | 4/2013 | Hersey et al. | |
| 8,463,458 B2 | 6/2013 | Wood et al. | |
| 8,463,470 B2 | 6/2013 | Wood et al. | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,577,525 B2 | 11/2013 | Wood et al. | |
| 8,606,432 B1 | 12/2013 | Wood et al. | |
| 8,620,106 B2 | 12/2013 | Pryszo et al. | |
| 8,831,868 B2 | 9/2014 | Grace et al. | |
| 8,994,527 B2 | 3/2015 | Verhulst | |
| 9,086,278 B2 | 7/2015 | Carnevali | |
| 9,880,007 B2 * | 1/2018 | Whiting | G01C 21/203 |
| 2006/0064242 A1 | 3/2006 | Litvack et al. | |
| 2006/0089794 A1 | 4/2006 | DePasqua | |
| 2007/0138347 A1 | 6/2007 | Ehlers | |
| 2007/0173139 A1 | 7/2007 | Gierke | |
| 2007/0237028 A1 | 10/2007 | Jeffers | |
| 2008/0027639 A1 | 1/2008 | Tryon | |
| 2008/0133131 A1 | 6/2008 | Poreda et al. | |
| 2008/0208445 A1 | 8/2008 | Bolton et al. | |
| 2009/0037040 A1 | 2/2009 | Salmon et al. | |
| 2009/0058718 A1 | 3/2009 | Pryszo et al. | |
| 2009/0067750 A1 | 3/2009 | Pryszo et al. | |
| 2009/0099764 A1 | 4/2009 | Ninomiya et al. | |
| 2010/0005419 A1 | 1/2010 | Miichi et al. | |
| 2010/0238025 A1 | 9/2010 | Verhulst | |
| 2011/0012773 A1 | 1/2011 | Cunning et al. | |
| 2011/0054784 A1 | 3/2011 | Wood et al. | |
| 2011/0054785 A1 | 3/2011 | Wood et al. | |
| 2011/0087426 A1 | 4/2011 | Feng | |
| 2011/0098914 A1 | 4/2011 | Milbert et al. | |
| 2011/0310088 A1 | 12/2011 | Adabala et al. | |
| 2011/0313655 A1 | 12/2011 | Litvack et al. | |
| 2012/0072102 A1 | 3/2012 | Grace et al. | |
| 2012/0158290 A1 | 6/2012 | Bharathan et al. | |
| 2012/0232719 A1 | 9/2012 | Salmon et al. | |
| 2012/0259541 A1 | 10/2012 | Downey et al. | |
| 2013/0124088 A1 | 5/2013 | Bruce et al. | |
| 2013/0328885 A1 | 12/2013 | Wood et al. | |
| 2014/0180584 A1 | 6/2014 | Carnevali | |
| 2014/0200806 A1 | 7/2014 | Carnevali | |

FOREIGN PATENT DOCUMENTS

| | | |
|---|---|---|
| WO | 0125724 | 4/2001 |
| WO | 0125725 | 4/2001 |
| WO | 2014096960 | 6/2014 |

OTHER PUBLICATIONS

International Search Report and Written Opinion dated Dec. 1, 2015, issued in corresponding International Patent Application No. PCT/IB2015/055981.

"Apparatus and Methods for Routing" Specification, Drawings, Claims and Prosecution History, of U.S. Appl. No. 13/723,655, filed Dec. 21, 2012, now U.S. Pat. No. 9,086,278, issued Jul. 21, 2015, by Navionics SPA.

ISRWO dated Aug. 28, 2014 issued in corresponding International Application No. PCT/IB2013/003168.

ISRWO dated Jun. 5, 2015 issued in corresponding International Application No. PCT/IB2013/003168.

"Apparatus and Methods for Routing" Specification, Drawings, and Prosecution History of U.S. Appl. No. 14/797,592, filed Jul. 13, 2015, by Navionics Spa.

Office Action dated Sep. 3, 2014 issued in corresponding U.S. Appl. No. 13/723,655.

ISRWO dated Oct. 14, 2015 issued in corresponding International Application No. PCT/IB2014/003100.

Annex to form PCT/ISA/206—Communication Relating to the Results of the Partial International Search dated Jun. 16, 2014, issued in corresponding International Application No. PCT/IB2013/003168.

Levec, Frank, et al., "Manual of Instructions: Bathymetric Surveys," Jun. 2004, p. 1-27, Ministry of Natural Resources.

Lindburg, Matt, P.E., "Applications of Bathymetric Surveys using GPS and Sonar," 2000 Proceedings, p. 53-57, Association of Conservation Engineers.

Akyildiz, I.F., et al., "Wireless Sensor Networks: A Survey," vol. 38, 2002, p. 393-422, Computer Networks.

MaxSea User Guide, v8.0, I&M Dec. 2000, p. 1-320.

Pillich, Bohdan, "Time Varying Objects in ECDIS," Sep. 1995, p. 111-119, International Hydrographic Review, Monaco, LXXII(2).

Geonav 4C User Guide, Jan. 2006, p. 1-76, Rev. 2.2, Navionics S.p.A.

"Apparatus and Methods for Routing" Specification, Drawings and Prosecution History of U.S. Appl. No. 14/146,955, filed Jan. 3, 2014, now U.S. Pat. No. 9,405,445, issued Aug. 2, 2016, by Navionics SPA.

*FLIR Systems, Inc. and FLIR Maritime US, Inc. v. Garmin Switzerland GmbH*, Inter Partes Review No. IPR2017-00946 Petition for Inter Partes Review, Feb. 17, 2017.

*FLIR Systems, Inc. and FLIR Maritime US, Inc. v.Garmin Switzerland GmbH*, Inter Partes Review No. IPR2017-00946 Declaration of Dr. Michael S. Braasch, Feb. 16, 2017.

De Jong, Wichert J., et al. "Automated Route Planning; A Network-Based Route Planning Solution for Marine Navigation," Department of Nautical Sciences, Royal Netherlands Naval College, Institute of Engineering Surveying & Space Geodesy, University of Nottingham, Bergen, Dec. 2001.

Tetley, L., et al., "Electronic Navigation Systems," Third Edition, Butterworth-Heineman, 2001.

Brogdon, Captain Bill, "Boat Navigation for the Rest of Us; Finding Your Way by Eye and Electronics," Second Edition, International Marine, 2001.

Assembly 19th Session, Agenda Item 10, Resolution A.817(19), Performance Standards for Electronic Chart Display and Information Systems (ECDIS), Nov. 23, 1995.

(56) References Cited

OTHER PUBLICATIONS

Xiaoxia, Wan, et al., "Electronic Chart Display and Information System," ISSN:1009-5020, Geo-spatial Information Science (Quarterly), vol. 5, Issue 1, p. 7-11, Mar. 5, 2002.
*FLIR Systems, Inc. and FLIR Maritime US, Inc.* v. *Garmin Switzerland GmbH*, Inter Partes Review No. IPR2017-00946 Declaration of Scott Bennett, Ph.D., Jan. 19, 2017.
*FLIR Systems, Inc. and FLIR Maritime US, Inc.* v. *Garmin Switzerland GmbH*, Inter Partes Review No. IPR2017-00946 Declaration of Martinus Van Der Drift, Jan. 27, 2017.
Sabelis, Hein, "Voyage Planning in ECDIS," International Hydrographic Review, Monaco, LXXVI(2), Sep. 1999.
Bowditch, Nathaniel, LL.D., "The American Practical Navigator an Epitome of Navigation," Pub. No. 9, National Imagery and Mapping Agency, Bicentennial Edition 2002.
Encyclopedia of Electronics, 2nd Edition, TAB Professional and Reference Books, definition of Computer, pp. 197-201, definition of Microprocessor pp. 552-554, and definition of Software p. 780, McGraw-Hill, Inc. 1990.
*FLIR Systems, Inc. and FLIR Maritime US, Inc.* v. *Garmin Switzerland GmbH*, Inter Partes Review No. IPR2017-00946 Patent Owner's Preliminary Response to Petition for Inter Partes Review, Jun. 13, 2017.
McGraw-Hill Dictionary of Scientific and Technical Terms, Sixth Edition, definition of "Navigation"; p. 1404, McGraw-Hill,Inc. 2003.
*FLIR Systems, Inc. and FLIR Maritime US, Inc.* v. *Garmin Switzerland GmbH*, Inter Partes Review No. IPR2017-00946 Decision Institution of Inter Partes Review, Aug. 10, 2017.
*FLIR Systems, Inc. and FLIR Maritime US, Inc.* v. *Garmin Switzerland GmbH*, Inter Partes Review No. IPR2017-00946 Patent Owner's Response to Petition for Inter Partes Review, Jun. 13, 2017.
*FLIR Systems, Inc. and FLIR Maritime US, Inc.* v. *Garmin Switzerland GmbH*, Inter Partes Review No. IPR2017-00946 Declaration of Captain Steven Browne, Nov. 15, 2017.
U.S. Department of Homeland Security, United States Coast Guard, Navigation Rules, International-Inland, 1989.
New Zealand Office Action dated Nov. 2, 2017 issued in related New Zealand Application No. 710150.
Australian Office Action dated Sep. 13, 2017 issued in corresponding Australian Application No. 2013365921.

* cited by examiner

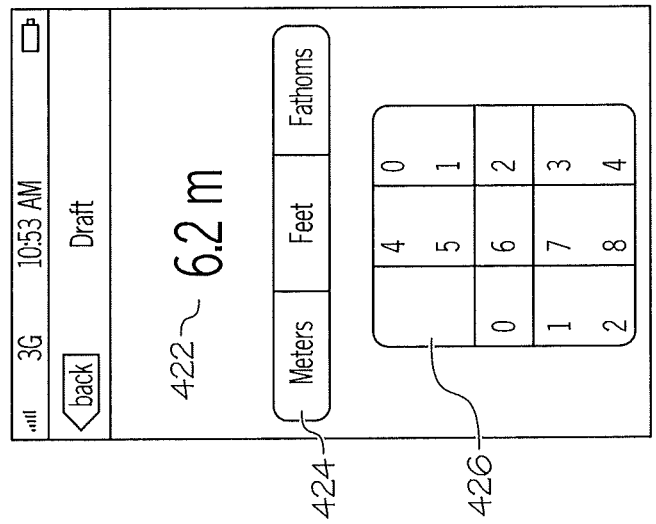
FIG. 4Aiii
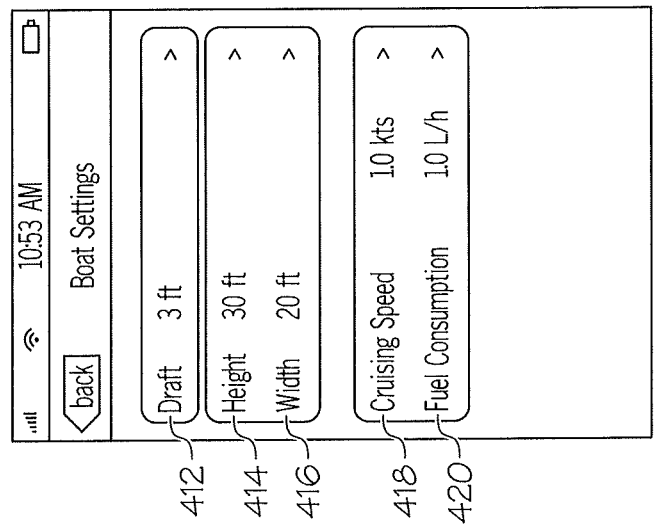
FIG. 4Aii
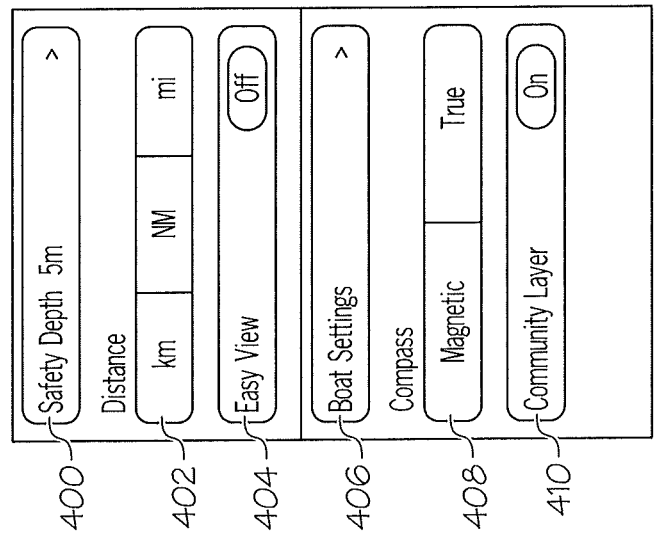
FIG. 4Ai

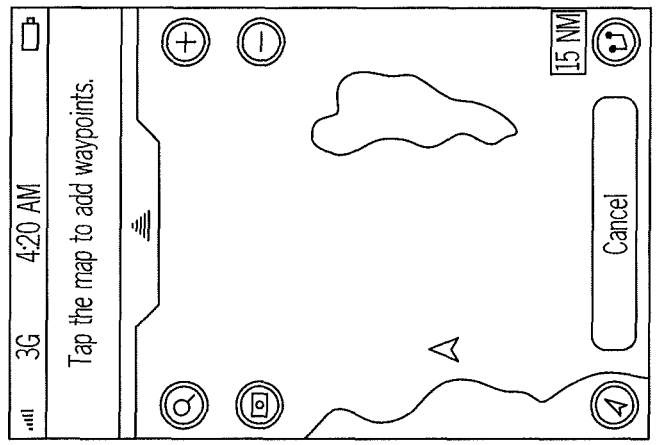
FIG. 4Biii
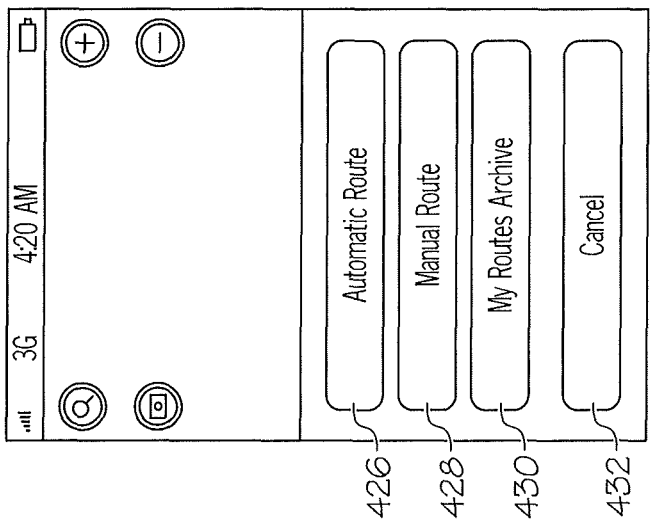
FIG. 4Bii
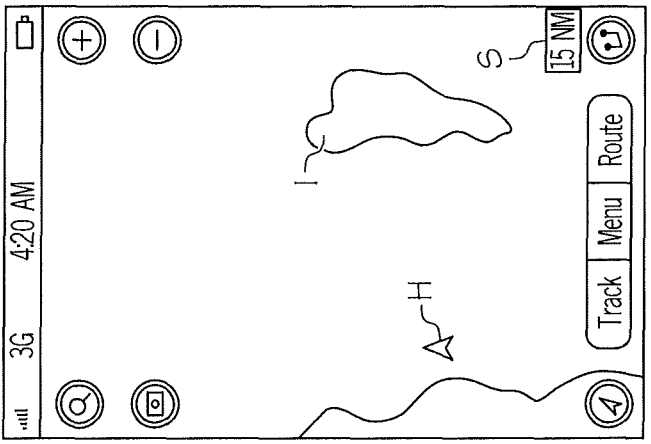
FIG. 4Bi

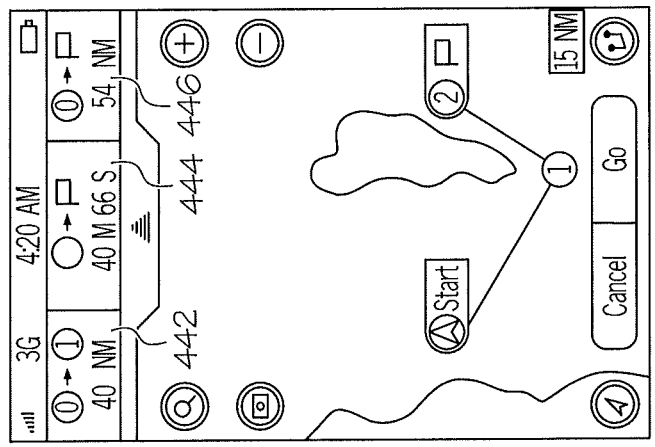
FIG. 4Ciii
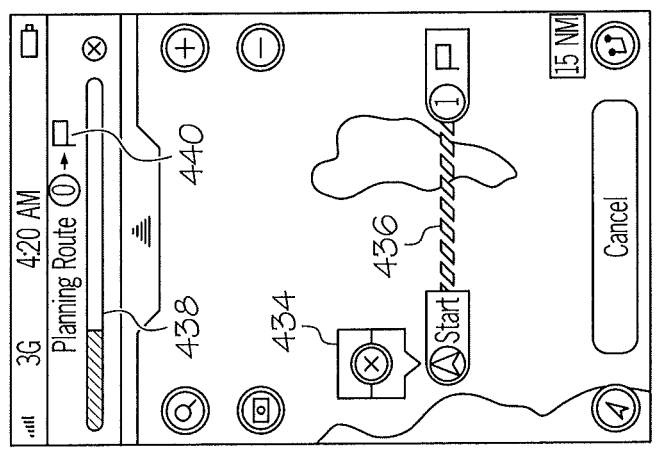
FIG. 4Cii
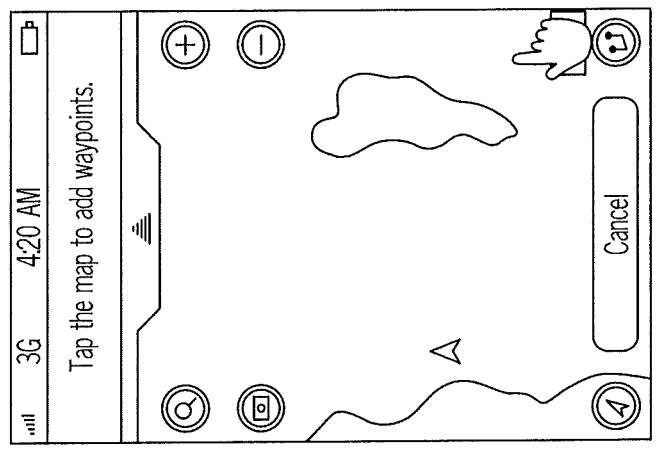
FIG. 4Ci

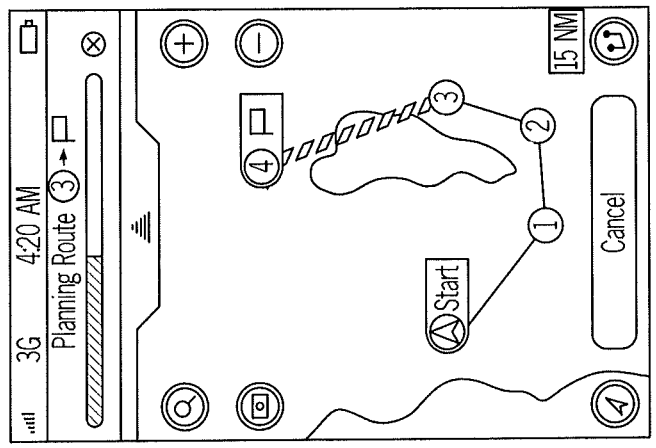
FIG. 4Diii
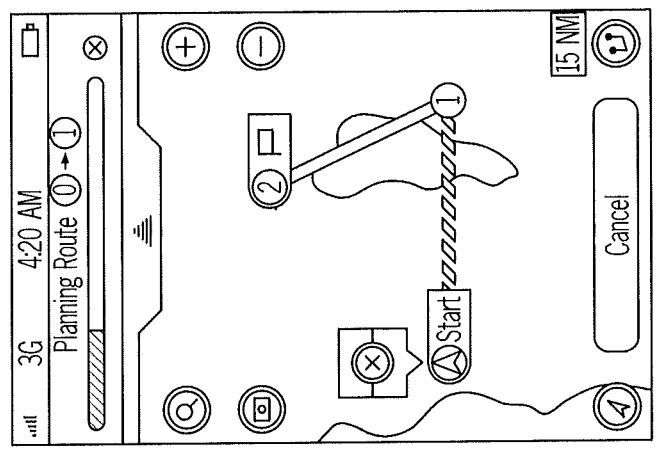
FIG. 4Dii
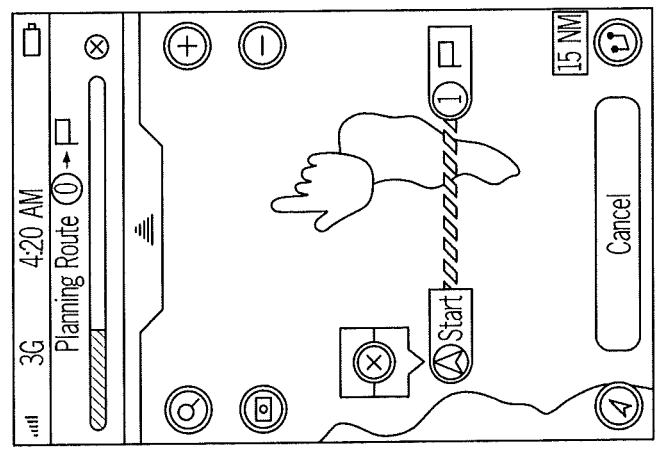
FIG. 4Di

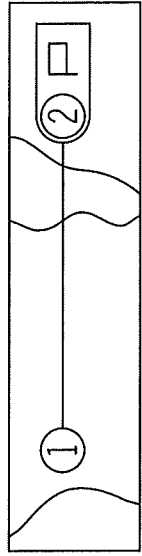
FIG. 4Eii
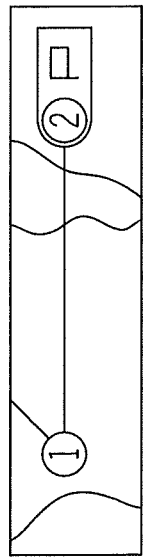
FIG. 4Eiv
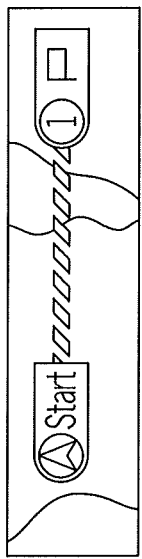
FIG. 4Ei
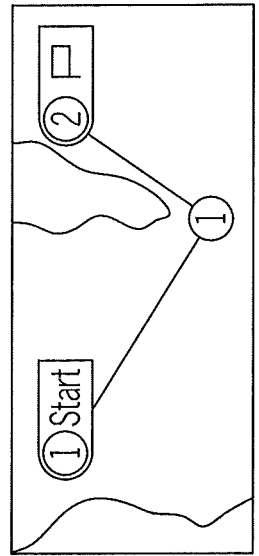
FIG. 4Eiii

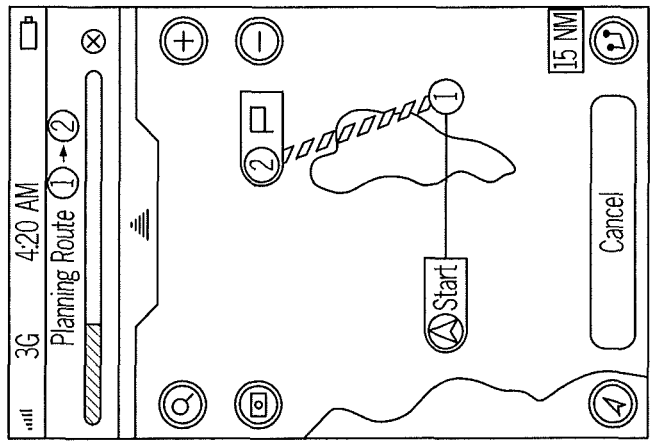
FIG. 4Fiii
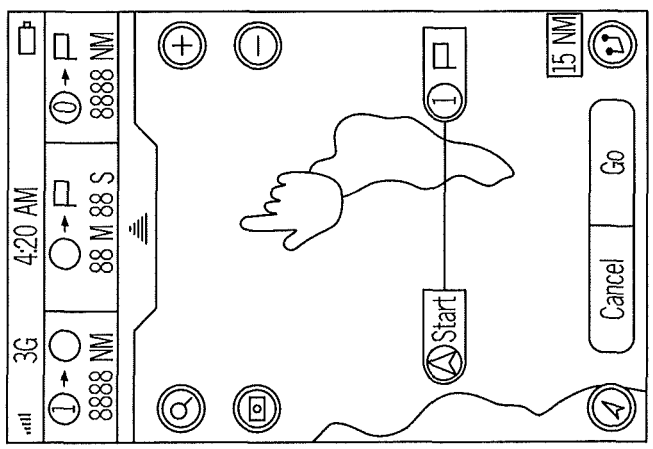
FIG. 4Fii
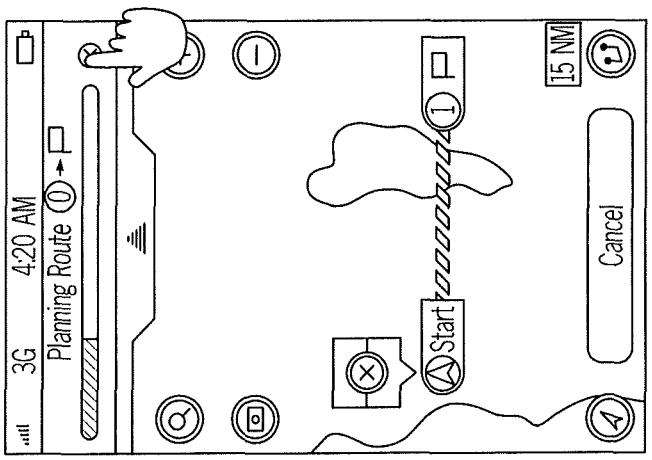
FIG. 4Fi

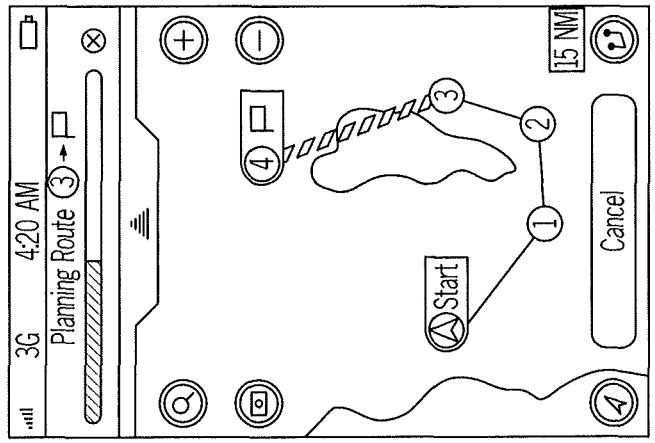
FIG. 4Giii
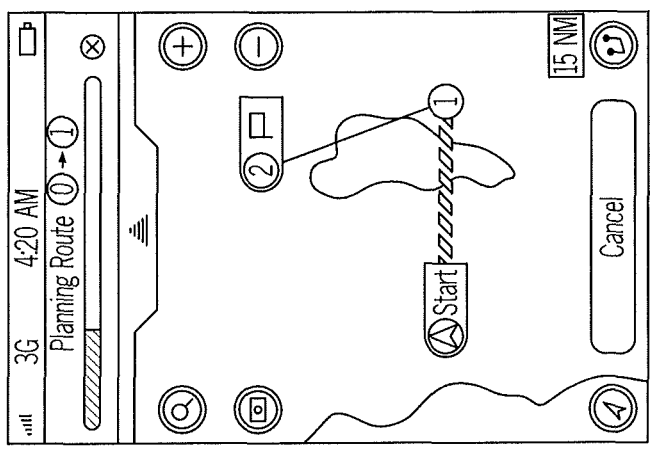
FIG. 4Gii
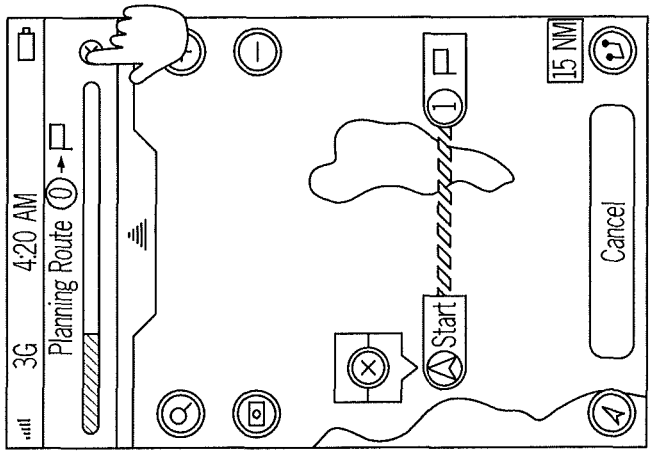
FIG. 4Gi

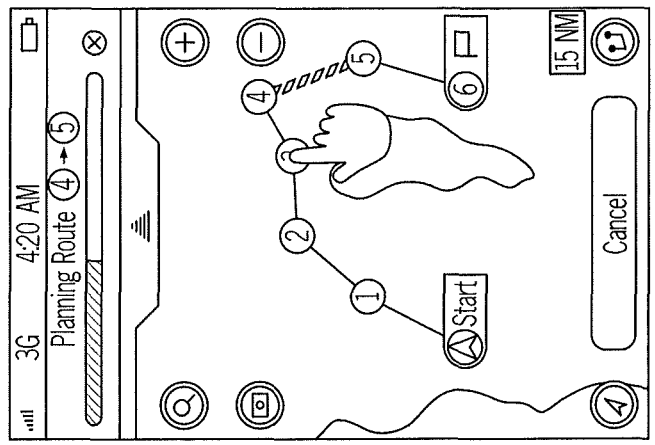
FIG. 4Gvi
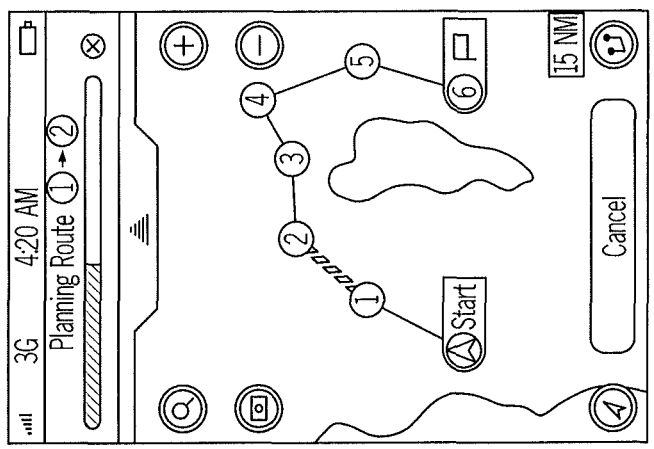
FIG. 4Gv
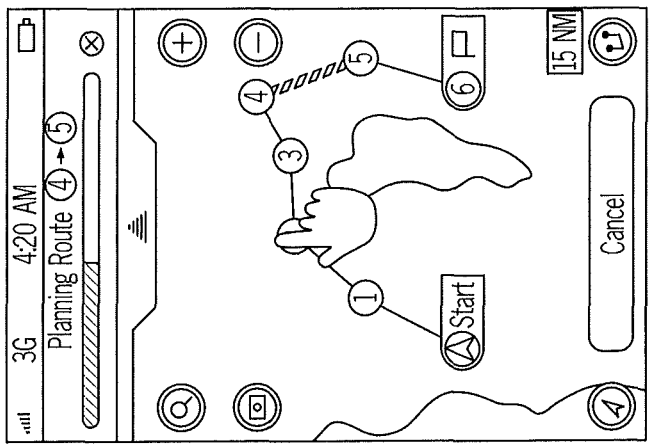
FIG. 4Giv

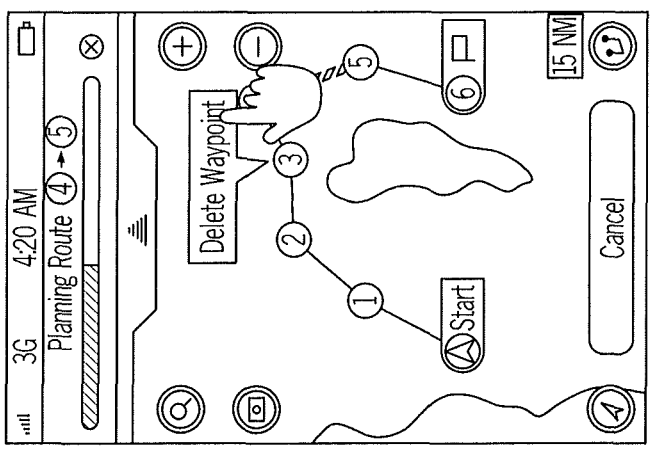
FIG. 4Gvii
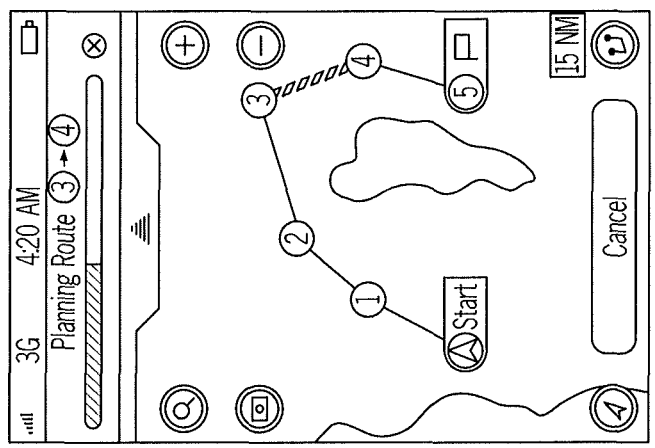
FIG. 4Gviii

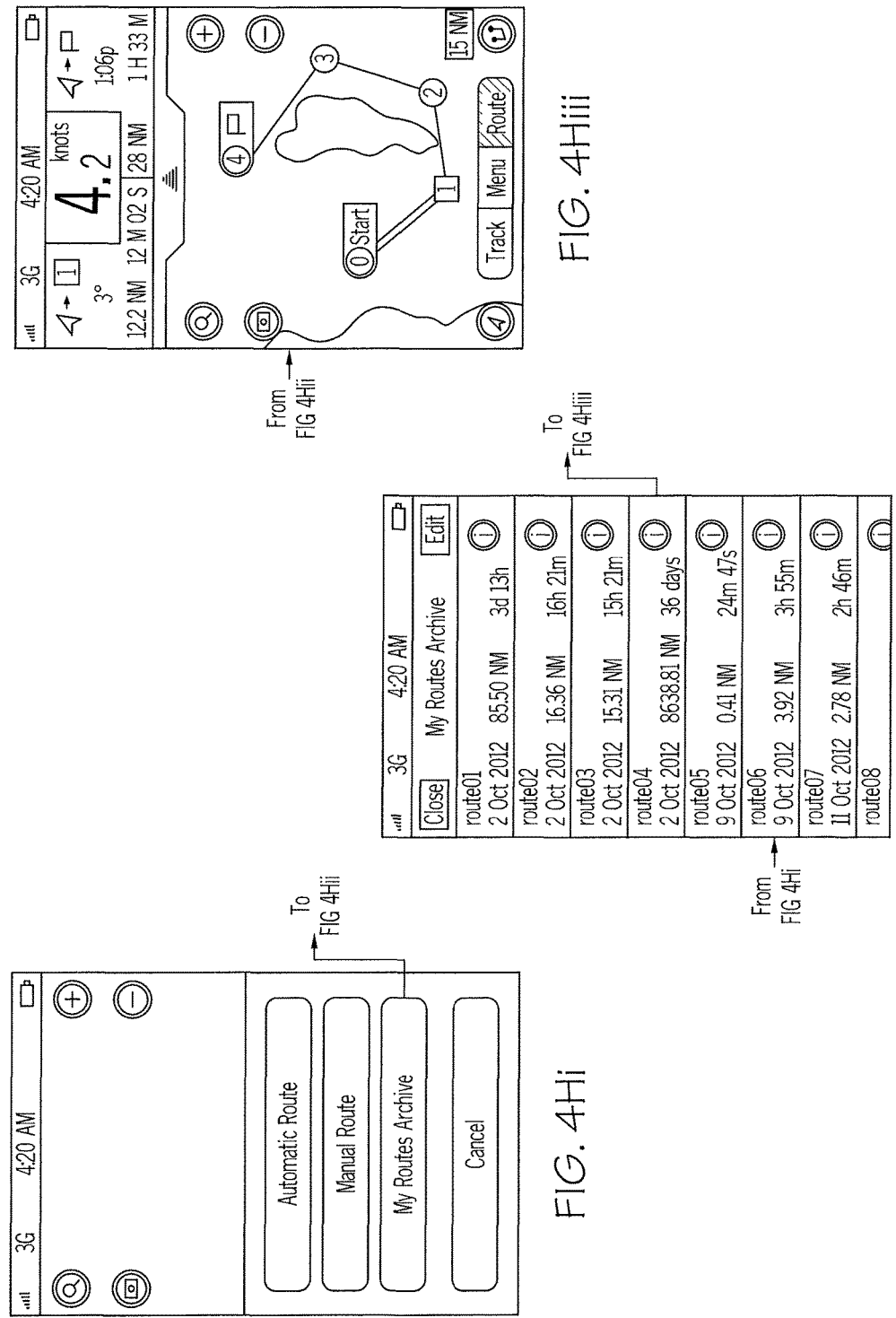

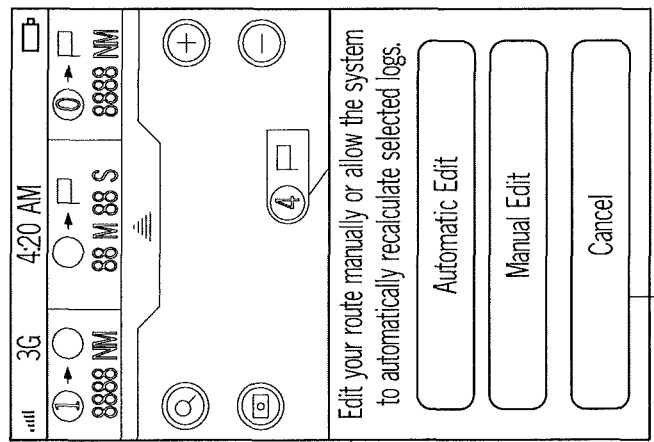
FIG. 4Iiii
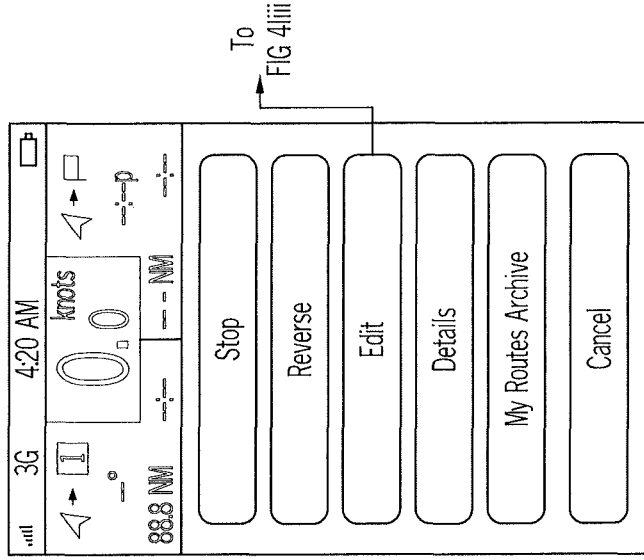
FIG. 4Iii
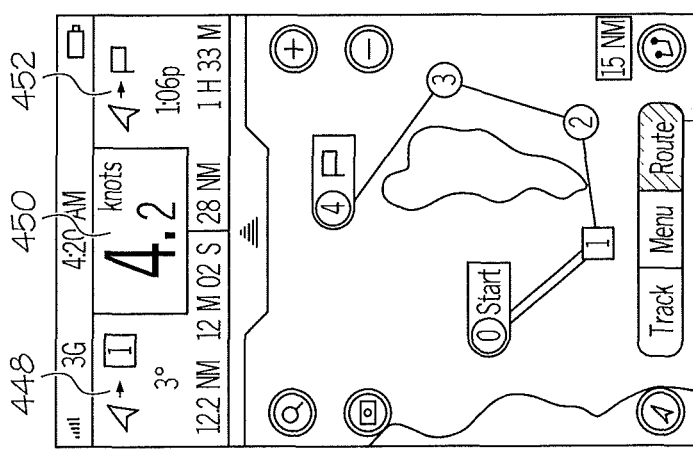
FIG. 4Ii

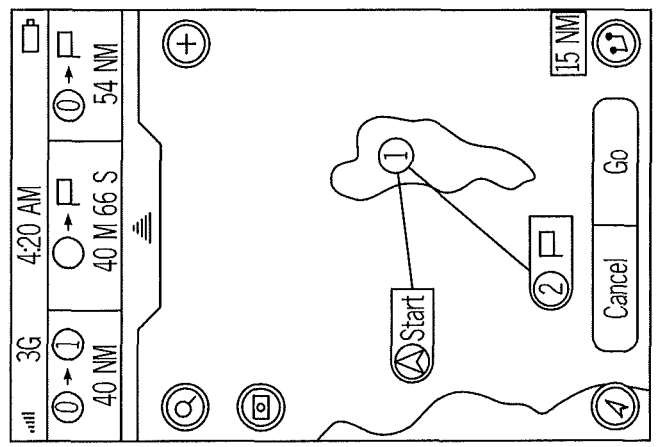
FIG. 4Jii
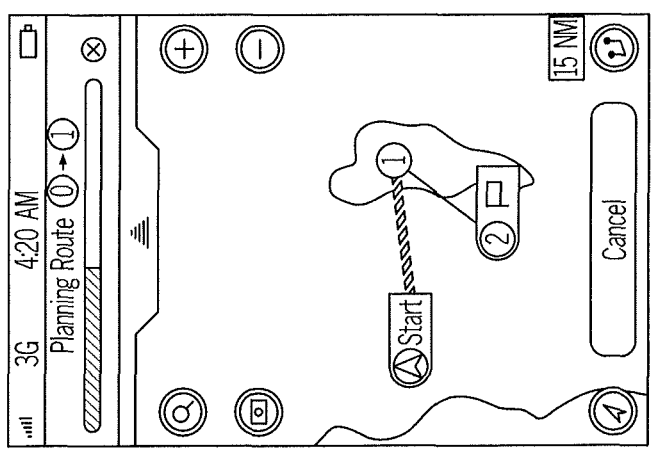
FIG. 4Ji

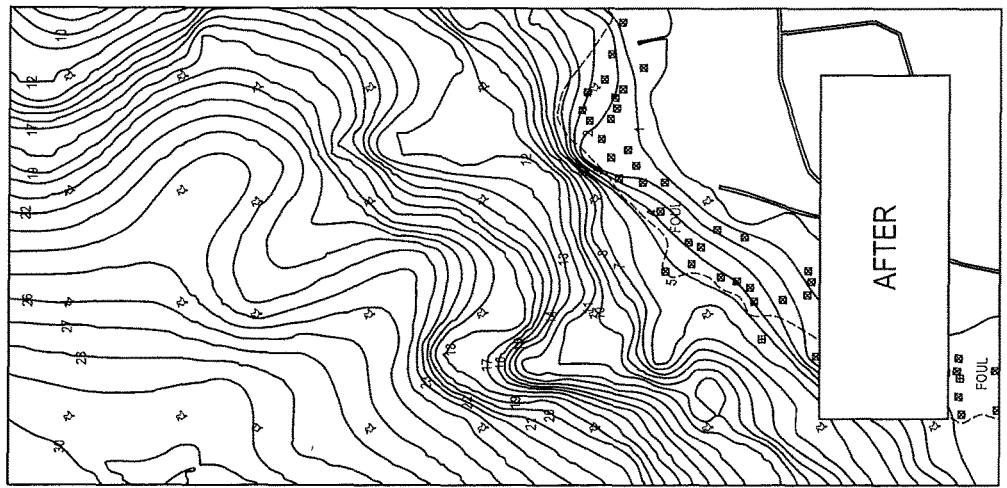
FIG. 13C AFTER
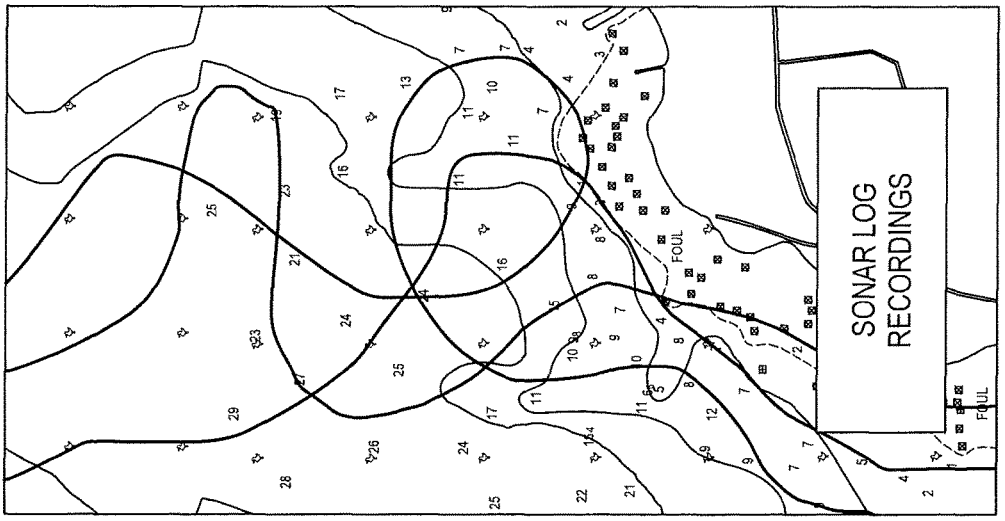
FIG. 13B SONAR LOG RECORDINGS
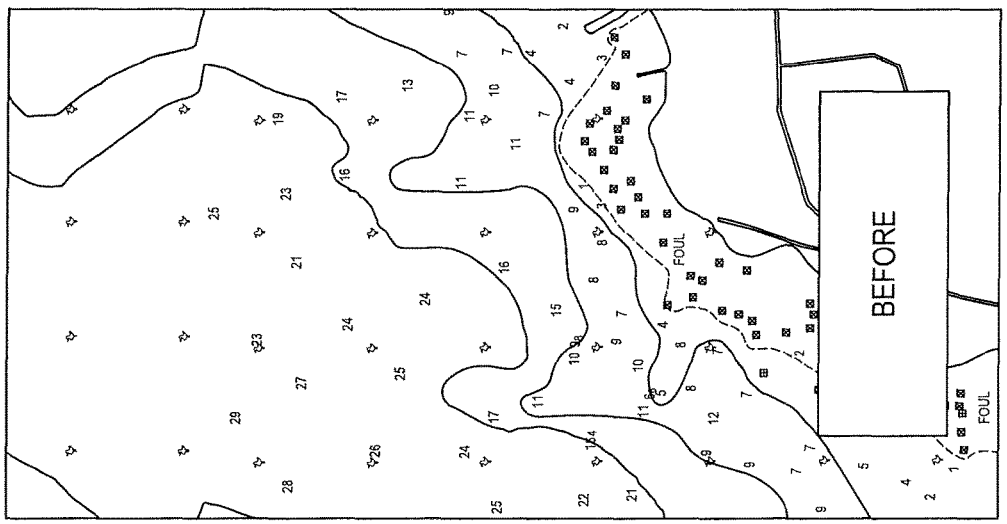
FIG. 13A BEFORE

APPARATUS AND METHODS FOR ROUTING

RELATED APPLICATIONS

This application is a continuation application of U.S. patent application Ser. No. 14/146,955 filed on Jan. 3, 2014, which claims the benefit of U.S. patent application Ser. No. 13/723,655 filed on Dec. 21, 2012, the disclosure of which is hereby incorporated by reference in its entirety.

BACKGROUND

Inventive concepts relate to navigational devices and, more particularly, to navigational routers, and methods for performing navigational routing.

Marine vessels may be equipped with radios, radar systems, cameras, global positioning system (GPS) transponders, SONAR systems, and other sensors that provide a variety of information for the operator of the marine vessel, also referred to herein as, simply, a boater. A boater may employ such information, along with other information, such as that obtained from navigational charts, to plan a navigational route, or course, and to navigate along that course to reach a desired destination. Navigational routers may assist a boater in such endeavors.

Existing navigational routers may be somewhat inflexible, may provide unsatisfactory levels of feedback to operators, or may be incapable of routing under certain circumstances.

SUMMARY OF THE INVENTION

Exemplary embodiments in accordance with principles of inventive concepts include a marine electronic system (which may include an electronic navigational router, a plotter, fish finder, or other electronic marine navigational aid) that includes a graphical user interface including an input device and a display, a processor to control the display to display marine cartographic information, the processor further configured to display regions of shallow water.

Exemplary embodiments in accordance with principles of inventive concepts include a marine electronic system wherein a processor is configured to accept user input to define shallow areas, to correlate the user-defined shallow area with cartographic data, and to display the user-defined shallow areas.

Exemplary embodiments in accordance with principles of inventive concepts include a marine electronic system wherein a processor is configured to display shallow areas using a different color than other areas.

Exemplary embodiments in accordance with principles of inventive concepts include a marine electronic system wherein a processor is configured to display shallow areas using a different texture than other areas.

Exemplary embodiments in accordance with principles of inventive concepts include a marine electronic system includes a graphical user interface including an input device and a display, a processor to control the display to display marine cartographic information, the processor further configured to display cartographic information including a range of depths in a manner that highlights that range of depths.

Exemplary embodiments in accordance with principles of inventive concepts include a marine electronic system wherein a processor is responsive to user input regarding a desired fishing range by displaying cartographic information for a range of depths, the range displayed in a color different from other displayed depths.

Exemplary embodiments in accordance with principles of inventive concepts include a marine electronic system wherein a processor is responsive to user input by displaying a fishing range in white.

Exemplary embodiments in accordance with principles of inventive concepts include a marine electronic system including a graphical user interface including an input device and a display, a processor to control the display to display marine cartographic information, the processor further configured to display cartographic information including contour lines corresponding to water depths associated with the contour lines.

Exemplary embodiments in accordance with principles of inventive concepts include a marine electronic system wherein a processor is further configured to display a region between two contour lines as a continuously variable shade of a display color.

Exemplary embodiments in accordance with principles of inventive concepts include a marine electronic system wherein a processor is further configured to display regions on either side of a contour line as a continuously variable shade of a display color.

Exemplary embodiments in accordance with principles of inventive concepts include a marine electronic system wherein the display color is blue.

Exemplary embodiments in accordance with principles of inventive concepts include a marine electronic system including a graphical user interface including an input device and a display; a processor to control the display to display marine cartographic information, the processor further configured to display cartographic information including contour lines corresponding to water depths associated with the contour lines, whereby the processor is responsive to user input by offsetting the values of the displayed contour lines from cartographic information.

Exemplary embodiments in accordance with principles of inventive concepts include a marine electronic system wherein a processor is responsive to user input by controlling the display to display a region of dry land as water-covered in response to an offset input by a user.

Exemplary embodiments in accordance with principles of inventive concepts include a marine electronic system wherein a processor is responsive to user input by controlling the display to display a submerged area as dry land in response to an offset input by a user.

Exemplary embodiments in accordance with principles of inventive concepts include a marine electronic system including a graphical user interface including an input device and a display, a processor to control the display to display marine cartographic information, the processor further configured to display cartographic information including bottom features.

Exemplary embodiments in accordance with principles of inventive concepts include a marine electronic system wherein a processor controls the display to display various bottom features using a color-coding scheme.

Exemplary embodiments in accordance with principles of inventive concepts include a marine electronic system wherein a processor controls the display to display a gravel seabed using the color orange.

Exemplary embodiments in accordance with principles of inventive concepts include a marine electronic system wherein a processor controls the display to display a seabed area as a mixture of seabed types by mixing the associated color codes, with the degree of inclusion of each color controlled by the percentage of the associated seabed type in the region.

Exemplary embodiments in accordance with principles of inventive concepts include a marine electronic system includes a graphical user interface including an input device and a display, a processor to control the display to display marine cartographic information, the processor further configured to display an overlay along with the cartographic information.

Exemplary embodiments in accordance with principles of inventive concepts include a marine electronic system wherein a processor is configured to alter an overlay's degree of transparency in response to input from a user.

Exemplary embodiments in accordance with principles of inventive concepts include a marine electronic system wherein a processor is configured to display an overlay on a land region.

Exemplary embodiments in accordance with principles of inventive concepts include a marine electronic system wherein a processor is configured to display a map overlay on a land region.

Exemplary embodiments in accordance with principles of inventive concepts include a marine electronic system wherein a processor is configured to display a photographic image overlay on a land region.

Exemplary embodiments in accordance with principles of inventive concepts include a marine electronic system including a graphical user interface including an input device and a display, a processor to control the display to display marine cartographic information, the processor further configured to adjust the display to reflect changes in water levels.

Exemplary embodiments in accordance with principles of inventive concepts include a marine electronic system wherein a processor is configured to adjust the display according to tidal information.

Exemplary embodiments in accordance with principles of inventive concepts include a marine electronic system wherein a processor is configured to automatically adjust the display according to tidal information.

Exemplary embodiments in accordance with principles of inventive concepts include a marine electronic system wherein a processor is configured to automatically update tidal information and automatically adjust the display according to the updated tidal information.

Exemplary embodiments in accordance with principles of inventive concepts include a marine electronic system wherein a processor is configured to respond to user input by obtaining tidal information and adjusting the display according to tidal information.

Exemplary embodiments in accordance with principles of inventive concepts include a marine electronic system includes a graphical user interface including an input device and a display; a processor to control the display to display marine cartographic information, the processor further configured to obtain tidal information from a tidal station.

Exemplary embodiments in accordance with principles of inventive concepts include a marine electronic system including a graphical user interface including an input device and a display, a processor to control the display to display marine cartographic information, and the processor further configured to save a developed navigational route.

Exemplary embodiments in accordance with principles of inventive concepts include a marine electronic system wherein a processor is configured to save a developed navigational route locally.

Exemplary embodiments in accordance with principles of inventive concepts include a marine electronic system wherein a processor is configured to save a developed navigational route remotely.

Exemplary embodiments in accordance with principles of inventive concepts include a marine electronic system wherein a processor is configured to save a developed navigational route in the form of a navigated track.

Exemplary embodiments in accordance with principles of inventive concepts include a marine electronic system wherein a processor is configured to save an automatically developed navigational route.

Exemplary embodiments in accordance with principles of inventive concepts include an electronic navigational system including a processor configured to save nautical navigation routes from a plurality of electronic navigational routers; and the processor responsive to requests by providing saved nautical navigation routes to a marine electronic system.

Exemplary embodiments in accordance with principles of inventive concepts include a marine electronic system wherein a processor is configured to provide a saved nautical navigation route to a marine electronic system other than the one from which the route was received.

Exemplary embodiments in accordance with principles of inventive concepts include a marine electronic system including a processor configured to retrieve a stored nautical navigational route, the processor configured to edit the retrieved route, and the processor configured to control a display to display the edited route along with marine cartographic information.

Exemplary embodiments in accordance with principles of inventive concepts include a marine electronic system wherein a processor is configured to retrieve a stored navigational route from a remote location.

Exemplary embodiments in accordance with principles of inventive concepts include a marine electronic system wherein a processor is configured to edit a route by truncating a retrieved route.

Exemplary embodiments in accordance with principles of inventive concepts include a marine electronic system wherein a processor is configured to edit a route by leaving it intact.

Exemplary embodiments in accordance with principles of inventive concepts include a marine electronic system wherein a processor is configured to edit a route by linking a plurality of retrieved routes.

BRIEF DESCRIPTION OF THE DRAWINGS

Exemplary embodiments in accordance with principles of inventive concepts will be more clearly understood from the following detailed description taken in conjunction with the accompanying drawings in which:

FIGS. 13A, 13B, and 13C are screenshots illustrating the use of tracks to supplement cartographic information in accordance with principles of inventive concepts;

DETAILED DESCRIPTION

Figure 1:
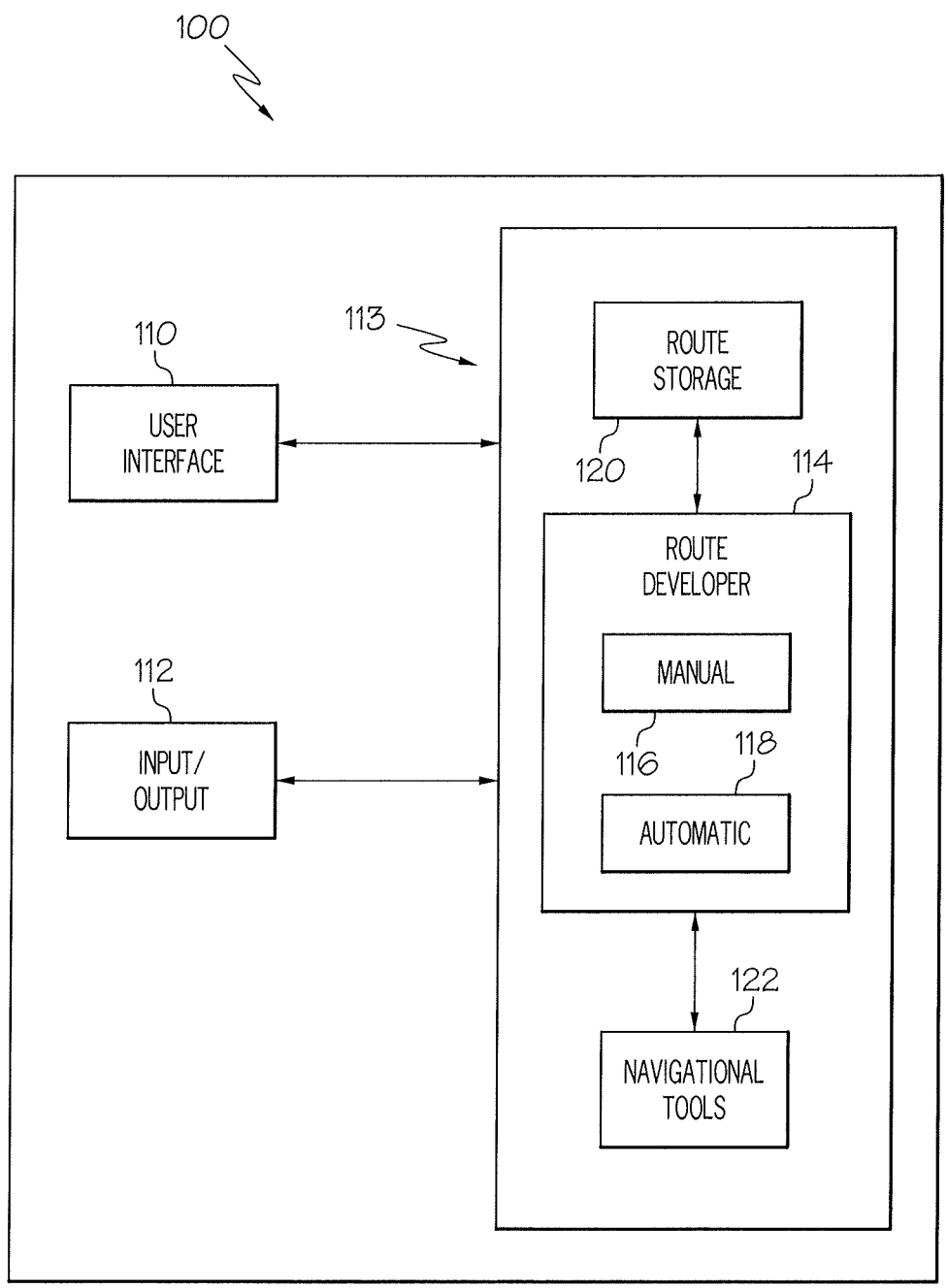
FIG. 1 is a block diagram of an exemplary embodiment of an electronic navigational router in accordance with principles of inventive concepts.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements should be interpreted in a like fashion (for example, "between" versus "directly between," "adjacent" versus "directly adjacent," "on" versus "directly on"). The word "or" is used in an inclusive sense, unless otherwise indicated.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if an element in the figures is turned over, elements described as "bottom," "below," "lower," or "beneath" other elements or features would then be oriented "atop," or "above," the other elements or features. Thus, the exemplary terms "bottom," or "below" can encompass both an orientation of above and below, top and bottom. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

An exemplary embodiment of a navigational routing system 100 in accordance with principles of inventive concepts is depicted in the block diagram of FIG. 1. The navigational routing system 100 includes a user interface 110, and an input/output system 112. A routing subsystem 113 includes a route developer 114, which, in accordance with principles of inventive concepts, includes manual 116 and automatic 118 route development components. Route storage 120 may be used, in accordance with principles of inventive concepts, to store and retrieve completed routes, either automatically or under the direction of a user, for example.

As will be described in greater detail in the discussion related to the following FIGS., a route may be developed manually or automatically. Regardless of the manner in which a route is developed, it may be stored in route storage 120 and later retrieved by a user, either for direct, immediate use (for example, while cruising), or to be edited in order to develop a different route that may be modified relative to the previously stored route. Information related to geographical and navigational features, such as navigational chart information, point obstructions, navigational buoys, and other man-made obstructions, may be downloaded and stored in the navigational routing system 100. In various embodiments, the download and retrieval of geographical and navigational feature information can occur via the internet from a host system. This download can take place in real time, so that the feature information is retrieved each time a user performs a route development operation, or can take place offline, so that the entire database of geographical and navigational information is downloaded and stored on the system 100 a single time and always available to a user, even during times when internet access is unavailable. Navigation tools 122, which may be housed separately from the routing subsystem 113, may operate in concert with routing subsystem 113 to, for example, update the current position, speed, and heading of a user's vessel.

As will be described in greater detail in the discussion related to the following FIGS., navigational routing system 100 may be implemented on a portable electronic device, such as a dedicated marine navigation system, a laptop computer, a notebook computer, a tablet computer, or smartphone, for example. User interface 110, which will be described in greater detail in the discussion related to the following FIGS., and, in particular, FIG. 5, accepts input from a user and outputs information to a user. User interface 110 may include devices that allow the system 100 to accept user input through voice, touchscreen, keyboard, trackball, joystick, or other device, for example. User interface 110 may also include devices that allow output in the form of displays or audio output, for example.

In accordance with principles of inventive concepts route developer 114 may develop a route from a starting point to ending point that includes a plurality of legs, or links, (that is, reaches between two waypoints, also referred to herein as "nodes," which may represent waypoints) along the way. As will be described in the discussion related to the following FIGS., user interface 110 may display information related to a plurality of those legs in accordance with principles of inventive concepts. User interface 110 may also allow a user to input information or commands that allow a user to edit developed routes, either on-the-fly, as the route is being developed, or in a store-and-retrieve manner. In accordance with principles of inventive concepts a user may manually or automatically edit developed routes, regardless of whether the routes have been manually or automatically generated.

Figure 2:
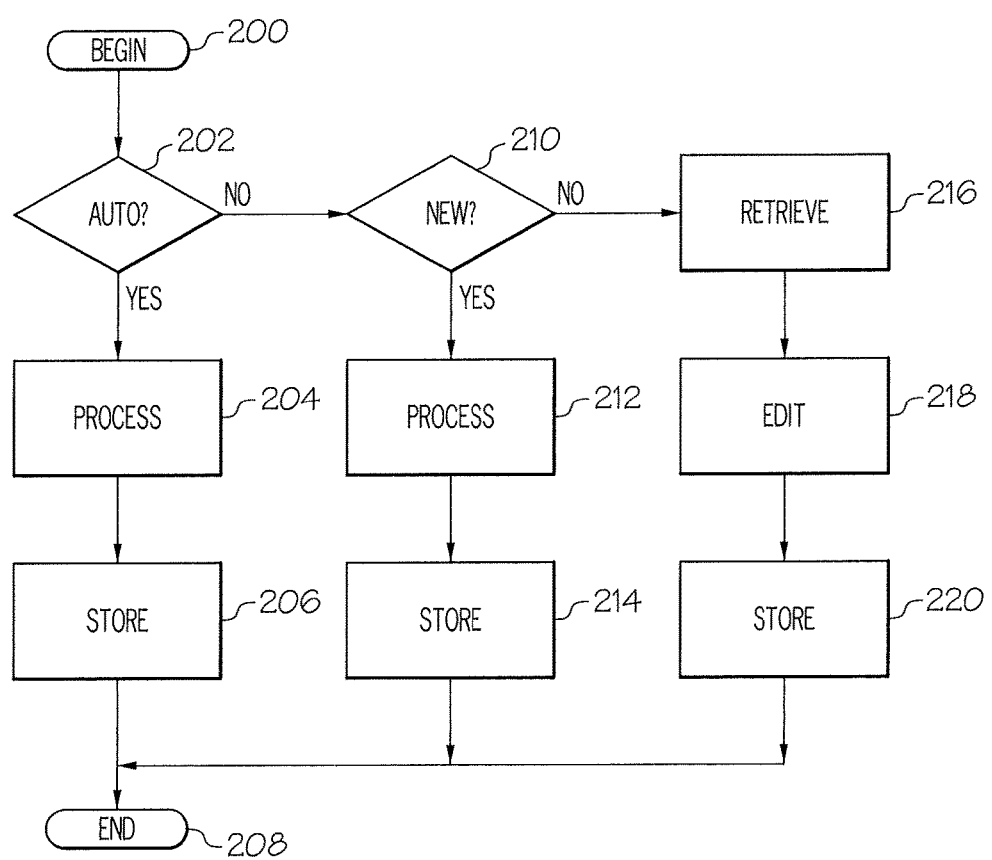
FIG. 2 is a flow chart of an exemplary embodiment of a process of developing a navigational route in accordance with principles of inventive concepts.

The flow chart of FIG. 2 depicts an exemplary embodiment of a navigational routing process in accordance with principles of inventive concepts. The process begins in process step 200 and proceeds from there to step 202. In an exemplary process in step 202 a navigational router in accordance with principles of inventive concepts determines whether the routing process is to be automatic or manual. As will be described in greater detail in the discussion related to the following FIGS., a user may be prompted by a router 100 to select an operational mode, manual or automatic, at the beginning of a routing process. If routing is to be automatic, the process proceeds to step 204 where automatic routing is carried out. Automatic routing in accordance with principles of inventive concepts will be described in greater detail in the discussion related to FIGS. 3A through 3H, for example. After automatic routing, which, in accordance with principles of inventive concepts, may include user interaction and "on-the-fly" editing, the process proceeds to optional step 206, where the system 100 may, automatically or under control of a user, store a developed route. From step 206 the process proceeds to end in step 208.

Returning to step 202, if manual routing is selected, the process proceeds to step 210, where the decision is made to either manually process a new route or manually process a previously developed and stored route. If a new route is to be processed, the process proceeds to step 212, where manual routing is carried out. Manual routing in accordance with principles of inventive concepts will be described in greater detail in the discussion related to other FIGS. From step 212 the process proceeds to step 214 where the processed route may, optionally, be stored. From step 214, the process proceeds to end in step 208.

Returning to step 210, if the decision is made to manually route, or edit, a previously generated route the process proceeds to step 216, where the routing system retrieves a previously created route, for example, from storage 120. From step 216 the process proceeds to step 218 where the existing route is edited. A route editing process in accordance with principles of inventive concepts will be described in greater detail in the discussion related to other FIGS. herein. From step 218 the process proceeds to step 220 where the route may be stored in accordance with principles of inventive concepts. From step 220 the process proceeds to end in step 208.

Figure 3A:
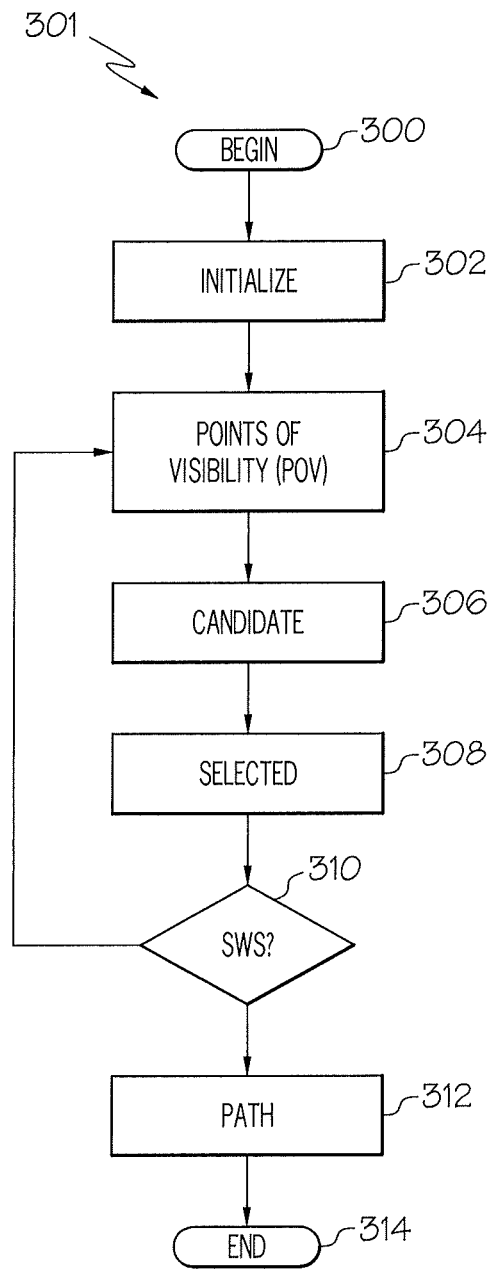
FIGS. 3A through 3H illustrate an exemplary embodiment of a process of automatically developing a navigational route in accordance with principles of inventive concepts.
Figure 3B:
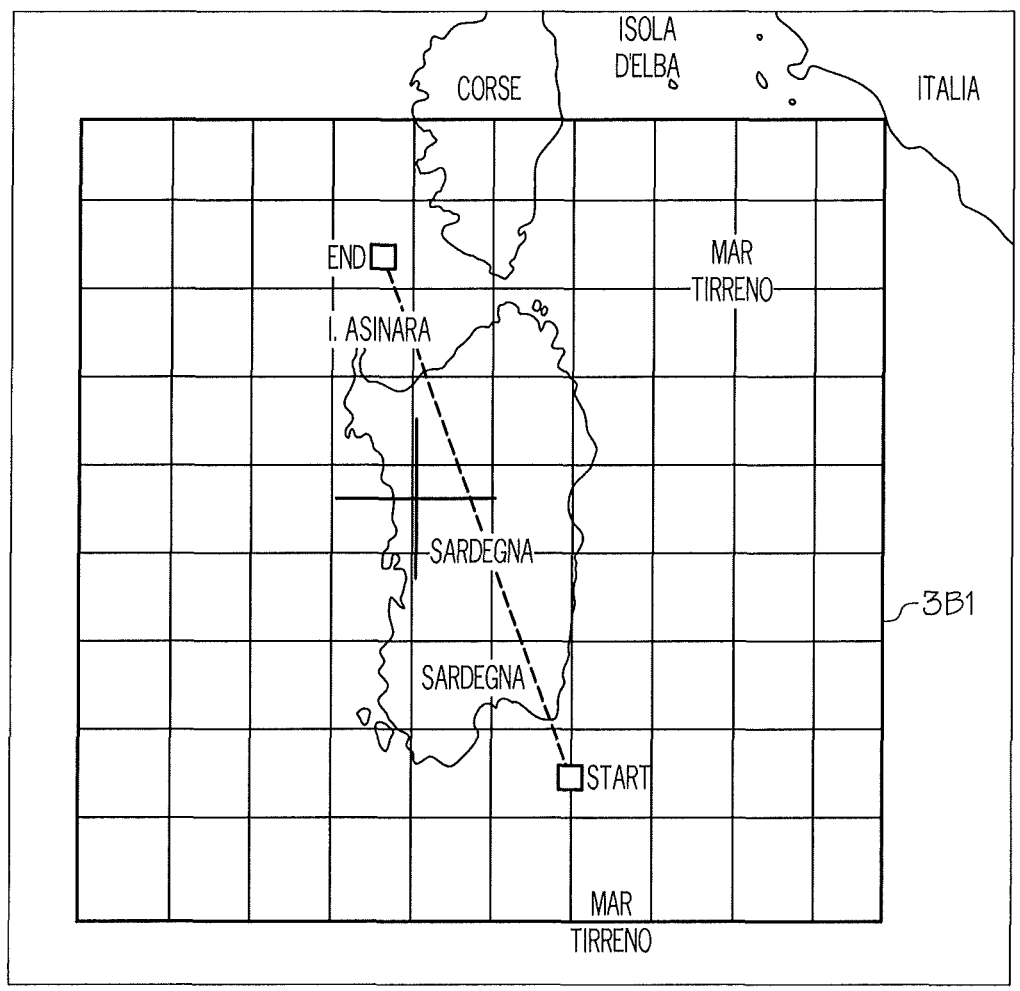
Figure 3C:
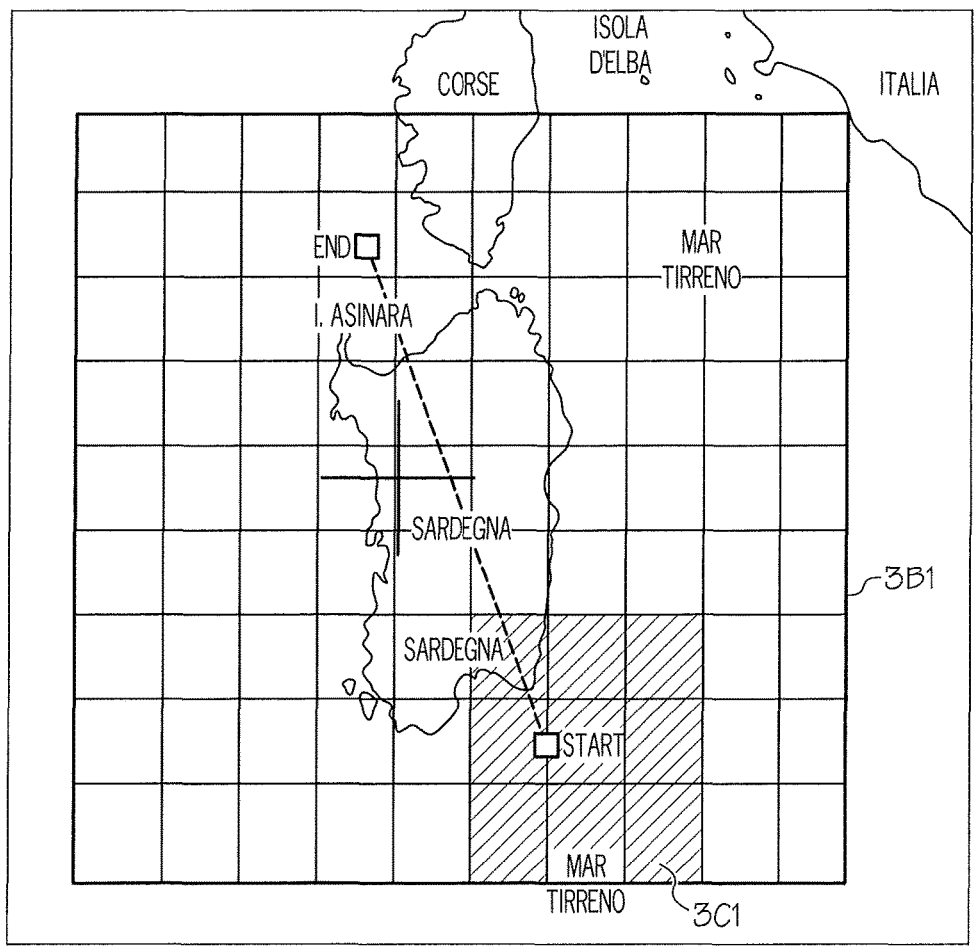

An exemplary embodiment of the process of automatically developing a route in accordance with principles of inventive concepts is depicted in the flow chart of FIG. 3B. In an exemplary embodiment of an automatic routing process in accordance with principles of inventive concepts, a path-finding process based on A* may be employed. A* is known and described, for example, in "Generalized best-first search strategies and the optimality of A*," Journal of the ACM 32(3):505-536. In accordance with principles of inventive concepts, memory usage may be reduced to accommodate relatively limited amounts of storage available to a portable electronic device such as may be employed by an automatic navigational router in accordance with principles of inventive concepts. Reducing memory usage and employing non-optimal routing may also increase operational speed, particularly when using devices, such as portable electronic devices, that may posses only limited processing power. Such a process, particularly the interactive aspects of such a process, will be described in greater detail in the discussion related to other FIGS. herein, and, in particular FIGS. 3B through 4J.

Figure 4K:
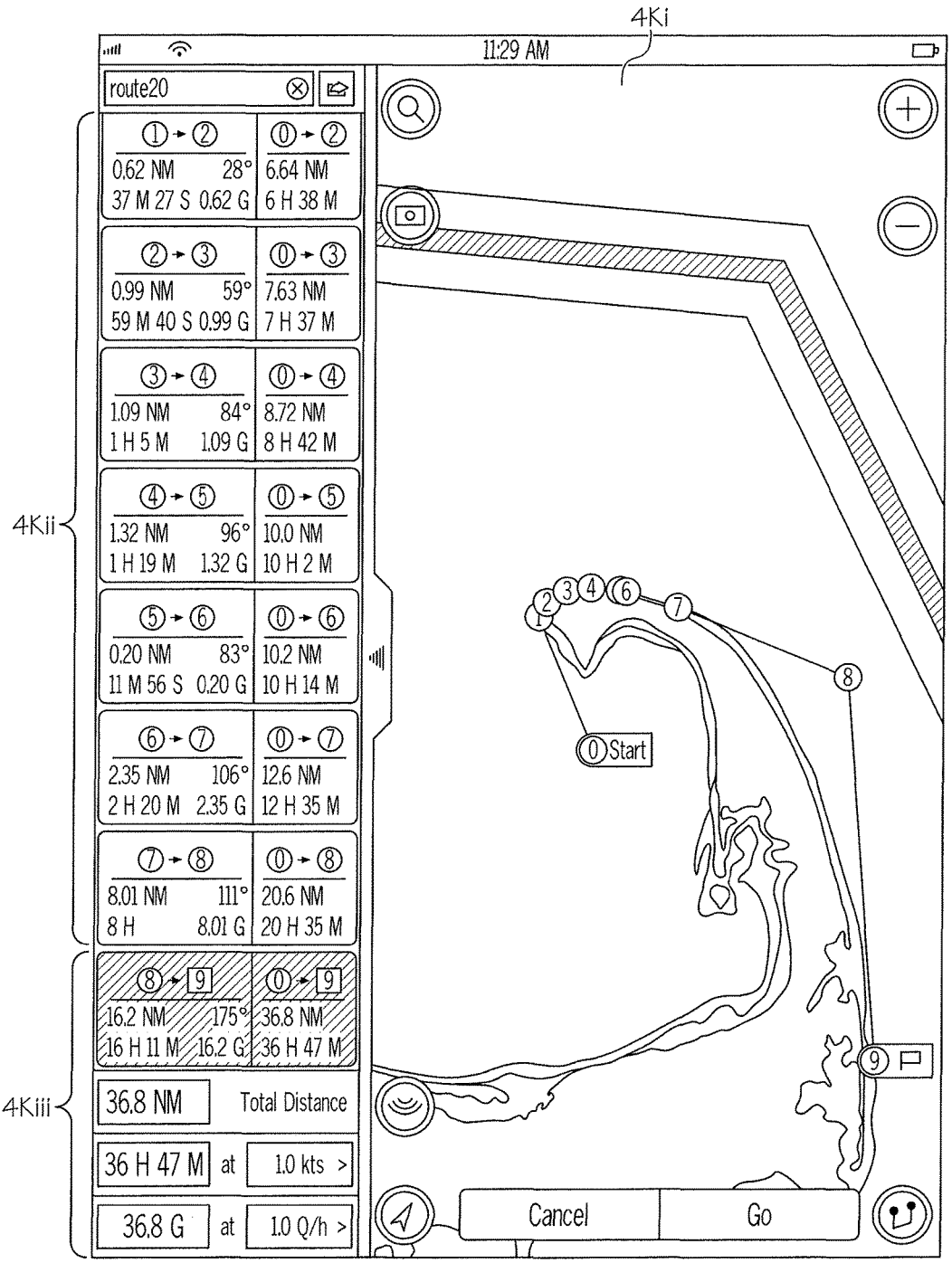
FIGS. 4Ai, 4Aii, 4Aiii, 4Bi, 4Bii, 4Biii, 4Ci, 4Cii, 4Ciii, 4Di, 4Dii, 4Diii, 4Ei, 4Eii, 4Eiii, 4Eiv, 4Fi, 4Fii, 4Fiii, 4Gi, 4Gii, 4Giii, 4Giv, 4Gv, 4Gvi, 4Gvii, 4Gviii, 4Hi, 4Hii, 4Hiii, 4Ii, 4Iii, 4Iiii, 4Ji, 4Jii and 4K, illustrate an exemplary embodiment of a process of developing a navigational route in accordance with principles of inventive concepts.

In this exemplary embodiment the process begins in step 300, where, as described in greater detail in the discussion related to FIGS. 3B and 4C, for example, user input is received indicating the start point and endpoint of a desired route. From step 300 the process proceeds to step 302. In step 302 a geographic area of interest is defined and data structures are initialized. In accordance with principles of inventive concepts the initialization includes a uniform square discretization of a multidimensional region that encompasses the start and end nodes of a route to be developed. The information related to the multidimensional region may be obtained, for example, from charts that characterize a body of water upon which the user intends to travel from starting node to ending node. In accordance with principles of inventive concepts, a node may be placed in every discretized cell and each node connected with its eight neighbors using bidirectional edges. Costs of edges may be assigned as being equal to their Euclidean lengths. Nodes may be generated on the fly and the least-cost (that is, for example, shortest distance) path between starting and ending nodes is selected as the automatically developed route. In accordance with principles of inventive concepts, in order to reduce computing time and/or memory requirements, various weightings may be applied to the process to obtain sub-optimal results, for example.

In accordance with principles of inventive concepts, the geographic area of interest may be determined by the starting location (also referred to herein as the starting node) and goal, or end, locations (also referred to herein as the end, or goal, node) of a proposed route. In accordance with principles of inventive concepts, memory use is minimized, or reduced, for example, by storing data related to only a portion of the geographic area of interest while developing a route, by compressing that data, and by calculating legs, or links, between nodes "on-the-fly," without storing them. Additionally, due to possibly limited processing power, an automatic routing process may employ suboptimal processing, yielding results that, although not "optimal," are suitable for use in an automatic routing environment. Additionally, by processing only a portion of a geographic area of interest during each iteration of a Selected Node operation, processing requirements may be further reduced.

In accordance with principles of inventive concepts, data structures initialized in this step (that is, step 302) include a candidate set, a selected set, and a selected node. The selected node is the node that is currently being developed. That is, in the first iteration of steps 304 through 310 of the process 301, the selected node is the starting node, during the second iteration the selected node is the selected in the previous loop, etc. The selected set includes nodes that have been selected during previous iterations of steps 304-310 during execution of the process 301. The candidate set includes all the nodes never selected (from among all nodes within the discretized geographic region), and that could still be selected in future iterations.

The chart of FIG. 3B illustrates an exemplary embodiment in which start and end points have been selected by a user to navigate around the island of Sardinia and an automatic navigational router in accordance with principles of inventive concepts has initialized data sets. The data sets have been initialed, as described above, with the Candidate Set and Selected Set of nodes initialized as empty, and the Selected Node is the node, indicated as the Start node by a user. The automatic navigational router defines a geographical search space, for example, the geographical space indicated by the rectangular outline 3B1 in FIG. 3B, within which to find a path from the start node to the end node.

Returning to FIG. 3A; from the initializations of step 302, the process 301 proceeds to step 304, where the automatic navigational router in accordance with principles of inventive concepts selects a sub-region around the Selected Node within the geographic area which encompasses the selected start and end points. As previously described, the Selected Node is the Starting Node at the beginning of the automatic routing process. Cartographic vectorial data in the sub-region around the Selected Node is analyzed according to navigation rules (for example, avoiding areas of restricted access, such a militarily restricted areas, or area where the user's boats characteristics indicate the boat would be unable to navigate) to develop a set of points, referred to as points of visibility (POV), which are used in the node path development. The chart of FIG. 3C highlights the exemplary sub-region 3C1.

Figure 3D:
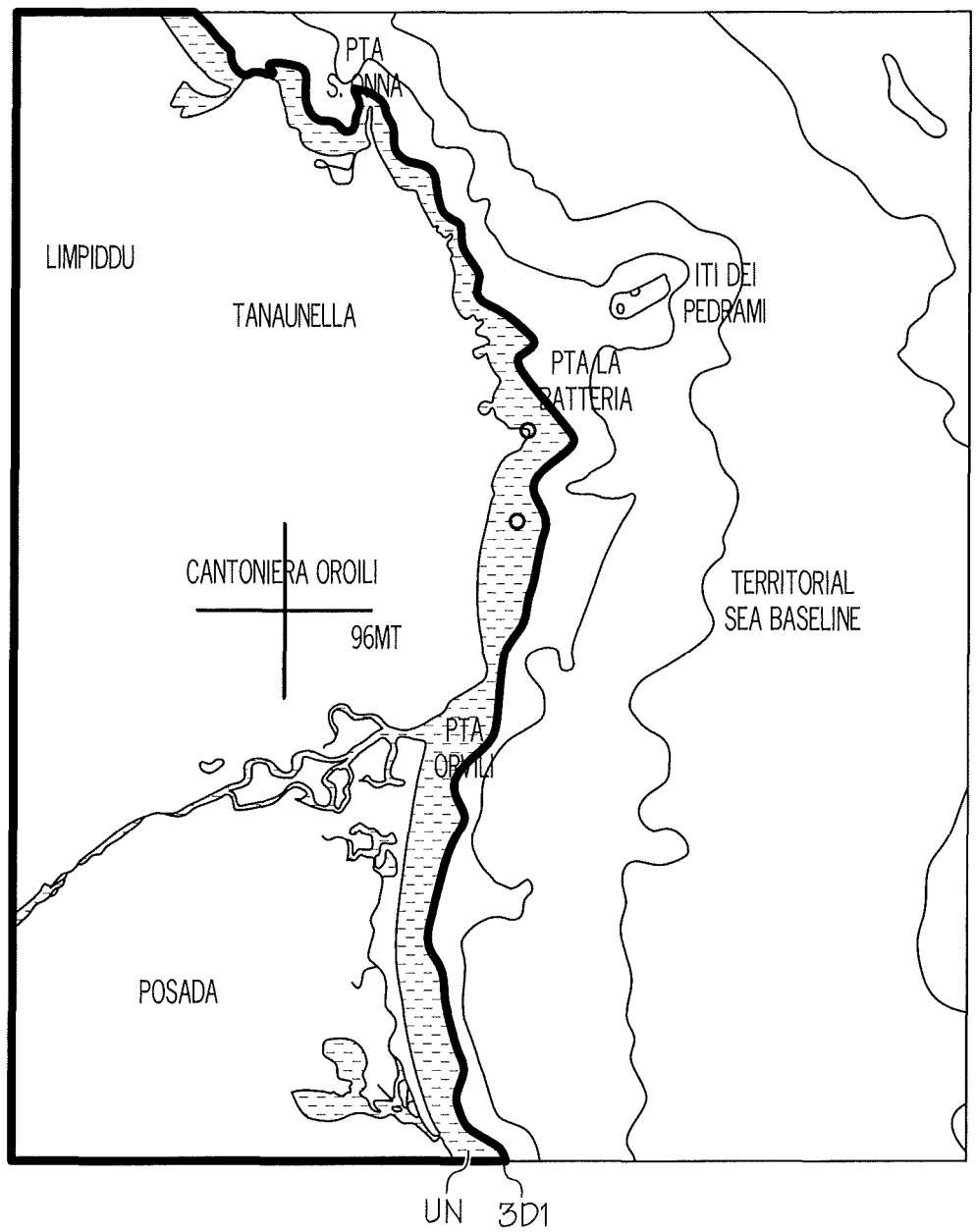

In accordance with principles of inventive concepts, the points of visibility are developed by retrieving vectorial data related to the subregion 3C1 from cartography according to a set of navigation rules. The retrieved vectorial data is then rasterized in order to reduce data complexity. The rasterized vectorial data is then interpreted to extract a geometry meaningful for navigation (that is, geometry that separates navigable from non-navigable regions) in an exemplary embodiment in accordance with principles of inventive concepts. For example, the heavy line 3D1 of FIG. 3D depicts a region that is potentially navigable by the user's vessel. From the extracted/simplified geometry the automatic navigational router in accordance with principles of inventive concepts then extracts a set of points, points of visibility, that is optimized to minimize, or reduce, the number of points that retain all the important features of the geometry previously extracted. The set many also be further compressed (for example, by ignoring points dividing a lake from land if the user's start and end points are in open sea).

Figure 3E:
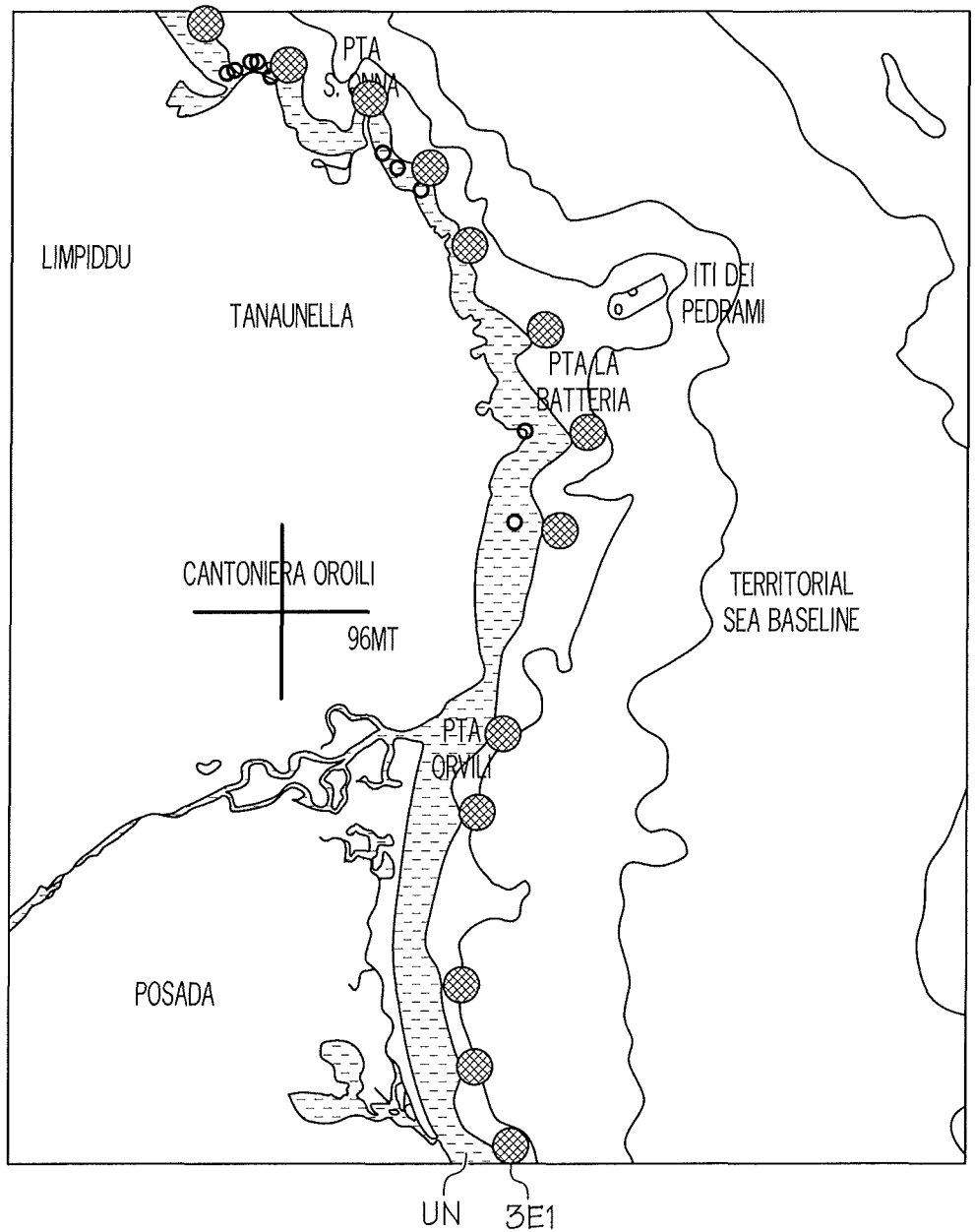

From step 304, where points of visibility are developed, the process proceeds to step 306 where points of visibility are developed into a set of candidate nodes, as illustrated, for example, in FIG. 3E by candidate nodes 3E1. A navigational router in accordance with principles of inventive concepts develops a subset of links between the set of points of visibility previously developed and the Selected Node (e.g., the Start Node, at the beginning of the process). To decide which links to create, in accordance with principles of inventive concepts the costs of navigation are analyzed based on an evaluation process, which determines the cost of reaching the candidate node from the Selected Node. A potential link is checked against the raster data of the cartography and only created if the Selected Node can "see" the node that would form the other endpoint of the link. That is, the link is only formed if no navigational obstruction lies between the Selected Node and the point of visibility node in question. For each node in the point of visibility set, the cost of navigation to the Selected Node is analyzed. If a link is successfully formed between the Selected Node and a point of visibility node, the related point of visibility node is added to the candidate set of nodes.

Figure 3F:
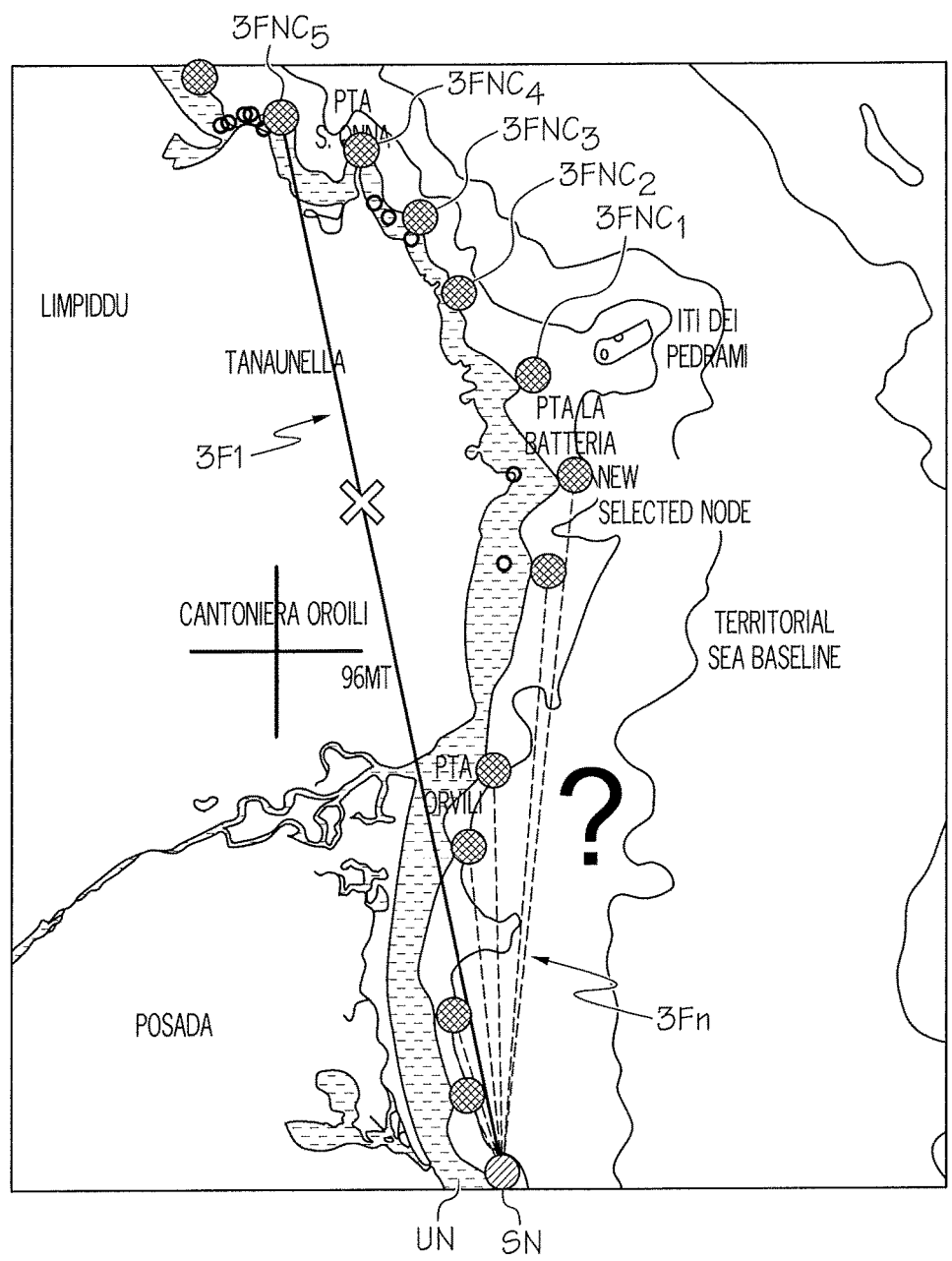

The chart of FIG. 3F depicts this development of a candidate set of nodes through the formation of links. For example, failed link 3$f$1 is not "navigably visible" to Selected Node SN (that is, a portion of the island of Sardinia intervenes), so the node at the distal end of failed link 3$f$1, and those at the distal ends of other failed nodes within the selected subregion, are not added to the candidate set of nodes. As previously indicated, in accordance with principles of inventive concepts, a region UN too shallow, or otherwise un-navigable, borders the land (Sardinia, in this exemplary embodiment), and a potential link that passes through that region UN would fail too (that is, would not be navigably visible) and, as a result, nodes associated with those potential links will not be included in the candidate set of nodes. For example, although land does not intervene between node 3FNC1 and Selected Node, the line that would link Selected Node and node 3FNC1 would pass through the un-navigable region UN and, as a result, node 3FNC1 is not navigably visible to the Selected Node and is not, therefore, a member of the candidate set associated with this, the current, Selected Node. On the other hand, links 3$fn$ do not fail; they are navigably visible to Selected Node SN and, as a result, the nodes at the distal ends of links 3$fn$ are added to the candidate set of nodes.

Figure 3G:
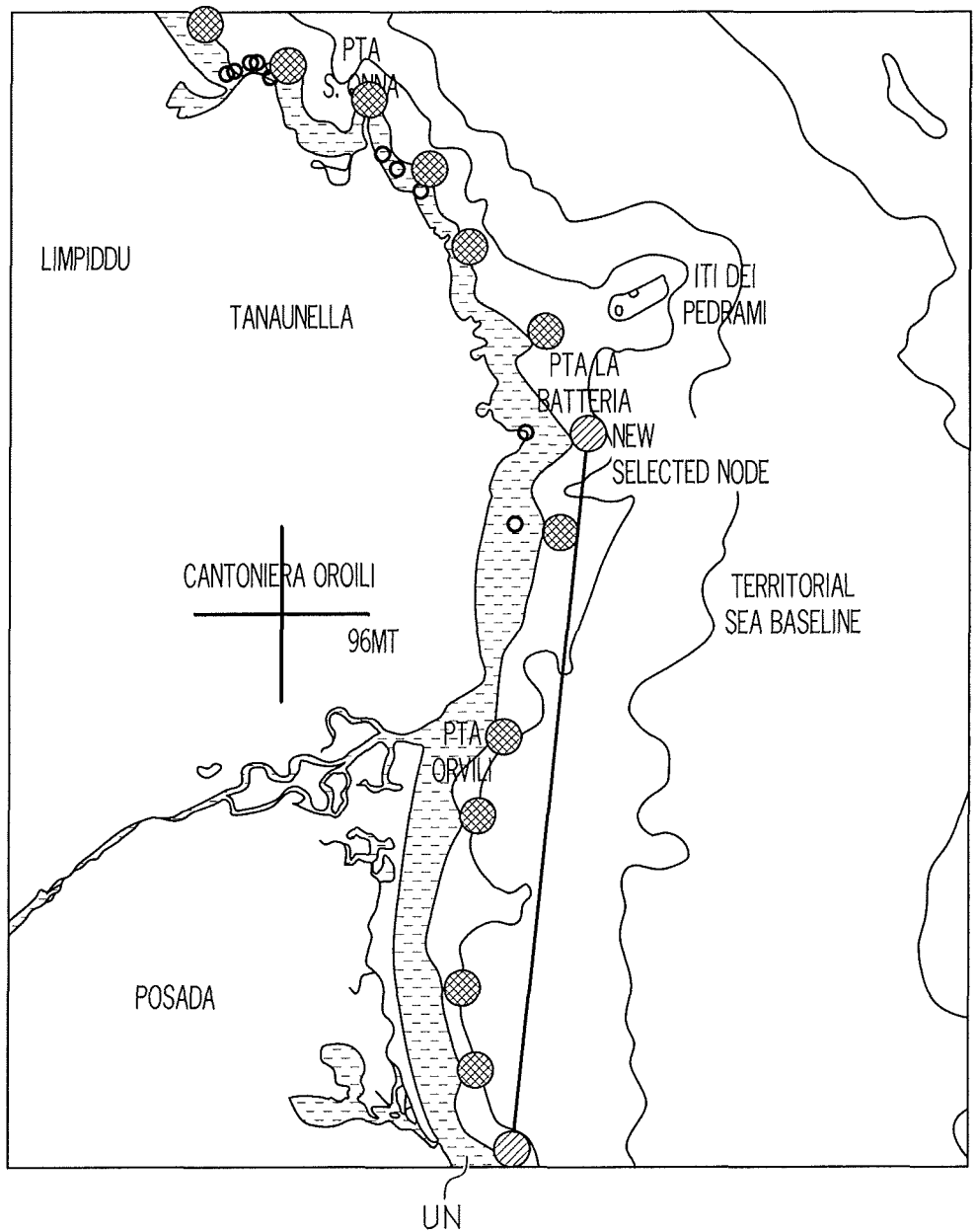

Returning to FIG. 3A, the process proceeds from step 306, where candidate nodes related to the current Selected Node are developed, to step 308 where the new, or next, Selected Node is chosen from among the set of candidate nodes. In accordance with principles of inventive concepts the chosen node may be the one associated with the lowest cost from the Selected Node, as determined during the link-creation process, and which also minimizes the linear cost to the End Node. The newly chosen Selected Node is depicted in the chart of FIG. 3G.

Returning to FIG. 3A, the automatic navigational router proceeds from step 308 to step 310 where it determines whether the new Selected Node is the End Point. If the newly chosen Selected Node is not the End Point, the automatic navigational router determines whether an upper threshold has been reached and, if not, returns to step 304 and proceeds from there as previously described, using the newly chosen Selected Node as the basis for developing candidate nodes and selecting among those candidates. On the other hand, if the threshold has been exceeded, the automatic navigational router indicates to the user that the route could not be developed. The use of an upper threshold is optional, but, generally, a navigational router in accordance with principles of inventive concepts may include a feature that permits the process to "time out" and, in accordance with principles of inventive concepts, the timeout feature may be adjustable by a user, for example.

Figure 3H:
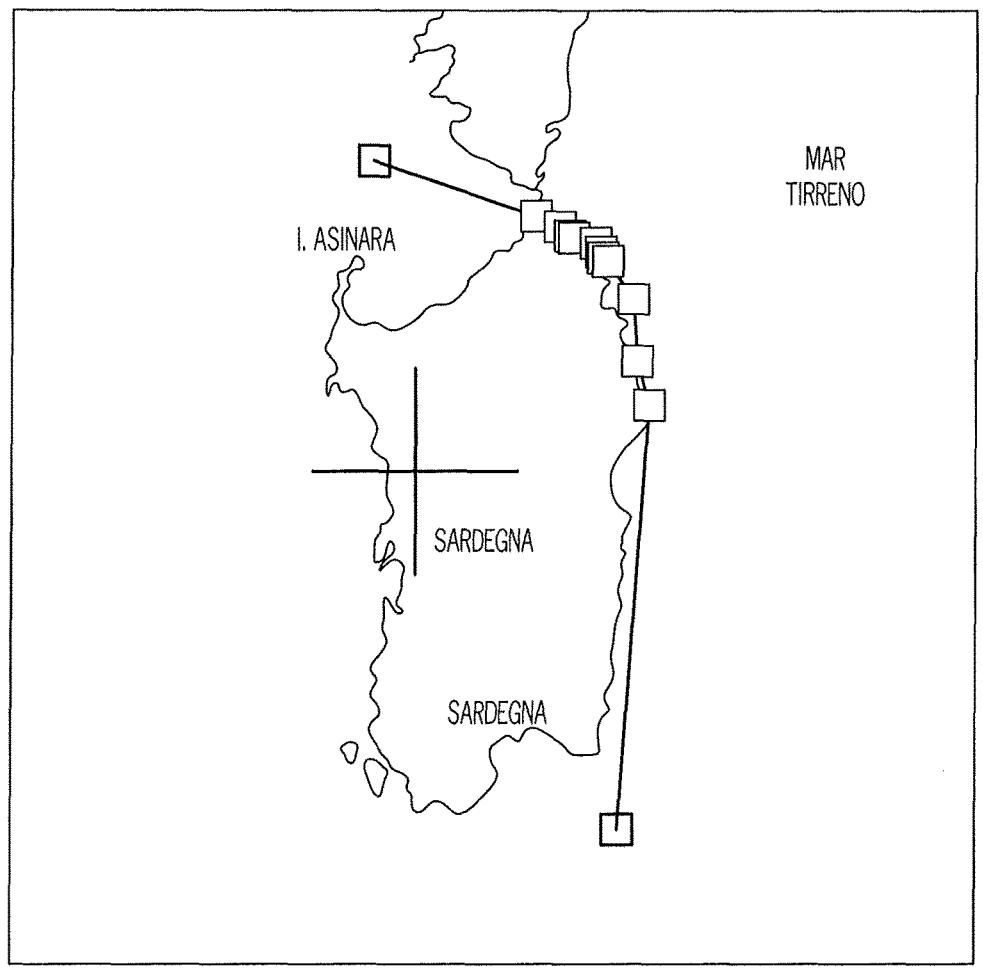

In accordance with principles of inventive concepts the threshold may be set at a relatively high number of iterations, but low enough to prevent router processing that may require a user to wait too long. In accordance with principles of inventive concepts a user may select a different End Point, closer to their Start Point, allow the automatic navigational router to develop a route between that closer End Point and their Start Point, store the route developed between those points, and then have the automatic navigational router develop a route to their original End Point from the closer End Point: that is, break the route into component routes. If the iteration threshold is not exceeded the End Point will be reached and the completed route will be built, from the End Node back through Selected Nodes to the Start Node in step 312 and from there to end in step 314. Path completion in accordance with principles of inventive concepts is depicted in the chart of FIG. 3H.

In accordance with principles of inventive concepts a navigational router may develop and display routing information as illustrated in the exemplary screenshots of FIG. 4A through 4J. The three screenshots of FIG. 4A include an upper level screen 4Ai that allows a user to navigate to a boat settings screen 4Aii and, from there to a specific boat setting screen 4Aiii. Screen 4Ai includes displays of a "safety depth" 400 (which, in accordance with principles of inventive concepts is not used in automatically developing a route), distance selection bar 402 (giving a user the option, for example, to display distances in kilometers, nautical miles, or miles), an "easy view" option that, for example, improves the readability of the cartographic information by enlarging text and symbols, a boat settings 406 bar that allows a user to enter into the navigational router system information relative to his boat, a compass display bar 408, allowing a user to opt for the use of either a magnetic or true compass, and a community layer bar 410 that, when activated, allows a user to contribute information to a community of users by, for example, adding or editing the locations of map objects, point obstructions, or the like, for example.

In accordance with principles of inventive concepts, an automatic navigational router may employ information characterizing a user's boat in the process of automatically determining routes for the boat. To that end, a user may activate the boat settings bar 406 of screen 4Ai to navigate to boat settings screen 4Aii. The boat settings screen 4aii includes bars 412, 414, 416, 418, and 420 that allow a user to respectively enter his boat's draft, height, width, cruising speed, and fuel consumption. For example, in accordance with principles of inventive concepts, when the draft settings bar 412 of screen 4Aii is activated a user is presented with screen 4Aiii that allows a user to enter his boat's draft 422. Option bar 424 allows a user to enter the boat's draft in meters, feet, or fathoms. In accordance with principles of inventive concepts the option for draft dimensions may be convenience of display (that is, for displaying draft dimensions in a format the user is familiar with) and to coordinate the boat data with charts employed by an automatic navigational router in accordance with principles of inventive concepts or other navigational tools. A set wheel 426 may be employed by a navigational router in accordance with principles of inventive concepts to allow a user to enter his boat's draft data, for example.

Because a boat's draft may change, depending upon loading for example, and concomitantly, the boat's height (distance above the water line) may also change depending upon loading, an automatic navigational router in accordance with principles of inventive concepts may include a range of values around those entered by a user in order to accommodate different loading situations or, in an alternative embodiment, may use the exact value entered by a user when developing a route. In either case, an automatic navigational router in accordance with principles of inventive concepts may include some margin in the difference between the boat's draft and the water depths provided by cartographic data while developing routes. Tidal information may also be employed to provide a user with routes that reflect tides (and water levels) at specific times and/or at sub-ranges such as, low tide, high tide, and intermediate levels. In accordance with principles of inventive concepts an automatic navigational router may also include information related to historic, political, cultural, recreational, or other points of interest so that a user may employ such information in developing a route. In accordance with principles of inventive concepts, such information may allow a user to select a route or a portion thereof from among preselected routes of touristic, scientific, historical, cultural, or other interest. Such routes or route segments may include passages such as inland water routes, for example. In some exemplary embodiments cartographic information is stored in object oriented databases and, as a result, point hazards, such as projecting rocks, for example, may not be accounted for in the database and/or in a routing system that employs such a database. However, such point hazards may be included in a database and avoided by an automatic navigational router in accordance with principles of inventive concepts.

The screen shots of FIG. 4B depict three exemplary screens 4Bi, 4Bii, and 4Biii in accordance with principles of inventive concepts that respectively illustrate: a main screen, a route selection screen, and routing screen. In the main screen 4Bi an icon H indicates the current location and heading of a user's boat overlaid on a current map that includes a scale S and geographic features, including an island I. in accordance with principles of inventive concepts, the current location and heading may be obtained from, for example, a global positioning system. The global positioning system may provide speed and heading information, in addition to current location information. Compass readings may also be incorporated into the heading information.

A menu bar includes user options for track, menu, and route. The track option tracks and displays the boat's current location and heading (as is illustrated), the menu option allows a user to return to a main menu for further options, and the route option allows a user to generate a route. Other icons, such as, "+", "−," "camera," and "lens" (for searching), "signal strength," and "battery level" may be standard icons related to the operation of a portable electronic device, such as a tablet computer or smart telephone, upon which a navigational router in accordance with principles of inventive concepts may operate. In this exemplary embodiment, a user activates the route option, by "clicking" or "double-clicking" (depending upon the platform's user interface) on the route icon in the menu bar. The resulting screen 4Bii displays options for automatic routing 426, for manual routing 428, for accessing an archive of previously developed and stored routes 430, or to cancel the operation 432. If a user opts for automatic routing, the router in accordance with principles of inventive concepts displays screen 4Biii and prepares to automatically develop a route for the user.

Although the following FIGS. and discussion related thereto will largely be dealing with automatic routing, many of the features, including display features, are also available in a manual router in accordance with principles of inventive concepts. FIG. 4C includes three screens; 4Ci, 4Cii, and 4Ciii, that respectively display a screen that may be displayed immediately after automatic routing has been chosen by a user, a screen including start and end points of a route, and a screen that displays a completed route. In accordance with principles of inventive concepts, a user can add waypoints by tapping, or otherwise selecting, a location on the map, and the automatic navigational router, in addition to accommodating the added waypoint, will provide immediate animated feedback to the user regarding the progress of the route's development.

As illustrated in screen 4Cii, in an exemplary embodiment, during development of a route, the automatic navigational router may default to the current location of the user's routing system, which may be provided by a global positioning system. However, a user may delete that default starting waypoint, by tapping on a delete icon 434 (an "X" in the screen shot), and then plan their route starting from another location. Because, in accordance with principles of inventive concepts, routes may be stored, a user may develop a route starting at a starting point other than their current location, save the completed route, then employ the completed route at a future time when they have arrived at the selected start point. While the route is being developed, a leg that is being processed 436 may be displayed in a manner that distinguishes it from other legs, such as completed legs. In the exemplary embodiment of screen 4Cii, the leg may be displayed in a broken line and may also be of a color that corresponds with legs that have been successfully developed. A progress bar 438 provides an indication of the progress being made by the automatic navigational router in developing the route. A leg icon 440 may be used to indicate which leg of a route is currently being developed. In this exemplary embodiment, the leg from the start point "0" to the endpoint, indicated by a checkered flag, is under development.

When a route is completed, the display proceeds to screen 4Ciii, where completed legs from start to waypoint 1 and from waypoint 1 to endpoint are displayed. Additionally, in area 442 the distance of the first leg, forty nautical miles in this exemplary embodiment, is displayed. The total estimated time to follow the route, based on the boat's speed entered earlier by a user, is displayed in region 444. Another region 446 displays the total distance, from the first point to the endpoint.

If a user wishes to add or edit waypoints while still in a planning mode, that is, while the automatic navigational router is in the middle of developing a route, they can do so by tapping on the map displayed by the navigational router. Waypoints added manually by a user during "planning" or, as is also referred to herein, route development, are incorporated by the automatic navigational router on-the-fly. In accordance with principles of inventive concepts a user may move, add, or delete waypoints, even as the automatic navigational router develops a route, and the router accommodates the newly input (or deleted) waypoints. Such a process is illustrated in greater detail in screens 4Di, 4Dii and 4Diii of FIG. 4D. Screen 4Di illustrates a screen where two waypoints have been selected, similar to previously-described screen 4Cii. In accordance with principles of inventive concepts a user can manually add another waypoint, as illustrated by the addition of waypoint 2 in screen 4Dii. As depicted by screen 4Diii waypoints 1 and 2 may be developed by the automatic navigational router in order to reach the first endpoint input by a user, now waypoint 3, and the automatic navigational router continues to develop waypoints in order to reach the new end point 4, entered by the user as a route was being developed to the first endpoint.

In accordance with principles of inventive concepts a navigational router may display legs using different colors, patterns, or other features in order to signify different attributes of a leg. FIG. 4E illustrates exemplary embodiments of different such indicators, with a dashed blue pattern signifying a leg that is being developed, a continuous 50% black, also referred to herein as grey, line indicating that the leg is awaiting calculation, or development, a continuous blue line indicating a leg that has been successfully developed, and a continuous red line indicating a leg which has "failed." By "failed," we mean a line that transits a "non-navigable" region, according to cartographic information. As will be described in greater detail in the discussion related to the following FIGS., in accordance with principles of inventive concepts, a user has the freedom to override the automatic navigational router to include a "failed" leg in their route. Such a feature may be useful, for example, if the user is particularly aware of a region that cartographic data would indicate is un-navigable, given the user's boat's information, and the user knows that, for example, a bridge may open to accommodate a boat having a mast as high as that of their boat, or that a particular water features was obliterated during a recent storm, for example.

As indicated in screens 4Fi, 4Fii, and 4Fiii of FIG. 4F, in accordance with principles of inventive concepts, a user may interrupt a route development at any time by tapping the "X" in the progress bar (screen 4Fi), allowing the user to view other screens (screen 4Fii), and return to route development (screen 4Fiii) at any time.

Screens 4Gi-4Gviii of FIG. 4G illustrate a way in which a user may edit their route from the planning phase (corresponding to steps 302 through 310 of FIG. 3A) in a navigational router in accordance with principles of inventive concepts. Editing may be carried out in a variety of ways and the route may be re-developed or left intact, depending upon the state of the preceding or subsequent legs. Screens 4Gi through 4Giii depict the addition of a new endpoint, as previously described in the discussion related to FIG. 4D, for example. Screens 4Giv and 4Gv depict the movement of a waypoint, waypoint 2 in this example, from one location to another, and the navigational router recalculating the leg from waypoint 1 to new waypoint 2 and preparing to redevelop legs from waypoint 2 on, as necessary (for example, the leg from waypoint 3 to waypoint 4, which was already developed, need not be redeveloped). In accordance with principles of inventive concepts, legs may be "rubber-banded" in the display to illustrate the navigational router's accommodation of the new placement of a waypoint.

Screens 4Gvi to 4Gvii depict the elimination of waypoint 3, for example. In accordance with principles of inventive concepts, a navigational router may connect the preceding and following waypoints (in an exemplary embodiment, the automatic navigational router does not redevelop that leg), and the leg is displayed in a manner that distinguishes it, for example, by displaying it as a solid red line.

FIG. 4H includes screens 4Hi, 4Hii, and 4Hiii that illustrate the manner by which, a navigational router in accordance with principles of inventive concepts may allow a user to store and retrieve routes directly from a route menu. Previously described screen 4Hi includes the options for automatic route development, manual route development, and a route archive. When the route archive button is activated, an archive of routes may be displayed, as in screen 4Hii. A user may then select one of the stored routes to display the route, as in screen 4Hiii.

FIG. 4I includes screens 4Ii, 4Iii, and 4Iiii, which illustrate how an exemplary embodiment of a navigational router in accordance with principles of inventive concepts may allow a user to edit a route, either manually or automatically. Screen 4Ii depicts a route retrieved from a user's archive, as described in the discussion related to FIG. 4H. Screen area 448 includes icon that indicates the data within the region relates to the leg from start to waypoint 1. In this exemplary embodiment the heading information for this leg is 3 degrees, which is the angle of the segment linking the current boat position with the nearest waypoint combined with the North direction, the leg is 12.2 nautical miles in length and the time to traverse this leg is twelve minutes and two seconds (travelling at 4.2 knots as indicated in region 450). Region 452 displays similar information for the total route (that is, 28 nautical miles and one hour and 33 minutes and estimated time of arrival 1:06 pm) when a user activates the route button screen, 4Iii is displayed, affording a user the option of editing the route. When a user activates the edit button, screen 4Iiii is displayed giving the user the user the option of editing either manually or automatically.

As briefly described earlier, a user may manually place a waypoint in a prohibited area. Such an occurrence is depicted in screens 4Ji and 4Jii of FIG. 4J. In screen 4Ji a user moves waypoint 1 into a non-navigable area, the center of an island. The router notifies the user of the legs that are non-navigable (both legs in this example) by highlighting the legs by coloring them a solid red, for example. The user may use the legs or move the waypoint ("1" in this example) to an area that allows the automatic navigational router to redevelop a route. Although not show in this illustrative example, it may be that a user has particular knowledge about a region that is superior, or more recent, than the cartographic data associated with charts used for routing. In such a situation a user may want to navigate through a region that the charts indicate is non-navigable by his boat, but which the user knows is now navigable. There may be instances when a navigational router in an exemplary embodiment in accordance with principles of inventive concepts is unable to complete an automatic routing after a threshold number of iterations, as previously described. In such a case, the router will provide an indication of such a failure to the user and the user then may attempt a different route; one that, for example does not include as many obstacles as his first selected route. In order to accommodate limited storage capacity or processing power, a navigational router in an exemplary embodiment in accordance with principles of inventive concepts may limit the number of waypoints in a route. If, during the course of calculating a route, the navigational router meets the threshold number of waypoints, the navigational router may indicate such to the user and invite the user to edit the route, allowing the user to, for example select one of the already-developed waypoints as the new endpoint. The router may then finish the route without exceeding the threshold; the user may store the abbreviated route; and the user may then create another route from the modified endpoint to the original endpoint, for example. In accordance with principles of inventive concepts if a user attempts to automatically route into a region where he does not have map coverage, that is, he does not have cartographic data related to the region, he will be prompted to download the necessary cartographic data.

The screen of FIG. 4$k$ is an exemplary screen in accordance with principles of inventive concepts that provides a detailed view of a completed route (in this example, from within Cape Cod Bay at start point 1 to end point 9 off Orleans). As can be seen from this view, displayed maps may include cartographic data, such as water depths 4$ki$, depth contour lines, and other features that may typically be found on navigational charts. In this exemplary embodiment, detailed information related to each leg of a route (labeled "route 20" in this example) is displayed along the left of the screen in a series of blocks 4Kii. Each block includes detailed information, as previously described, related to a specific leg of the route. Detailed information related to the entire route, as previously described, may be contained in blocks 4Kiii (although, in the exemplary screen, in an intermediate step, blocks 4Kiii display information for the last section of 4$kii$). In some embodiments, the detailed leg information and route information available in blocks 4Kii and 4Kiii can be made visible and invisible to the user with the use of a display slider that the user can control.

Although details of a navigational router in accordance with principles of inventive concepts has been described, largely, in the context of automatic routing operations, manual routing in may employ substantially the same features, particularly as they relate to the display of route information. The primary differences between automatic and manual routing in accordance with principles of inventive concepts is that in manual mode a user may add waypoints wherever he chooses, including non-navigable areas, such as land, but no boat settings may be available to a user for route development. Additionally, in exemplary embodiments intermediate waypoints, which may be added during automatic routing (for example, to route around a non-navigable region), will not be automatically added in a manual mode. As previously discussed, in accordance with principles of inventive concepts, any stored route may be edited using either a manual or automatic routing mode. In this manner, a route created manually may be edited using automatic routing or manual routing and a route created automatically may be edited using automatic routing or manual routing.

Figure 5:
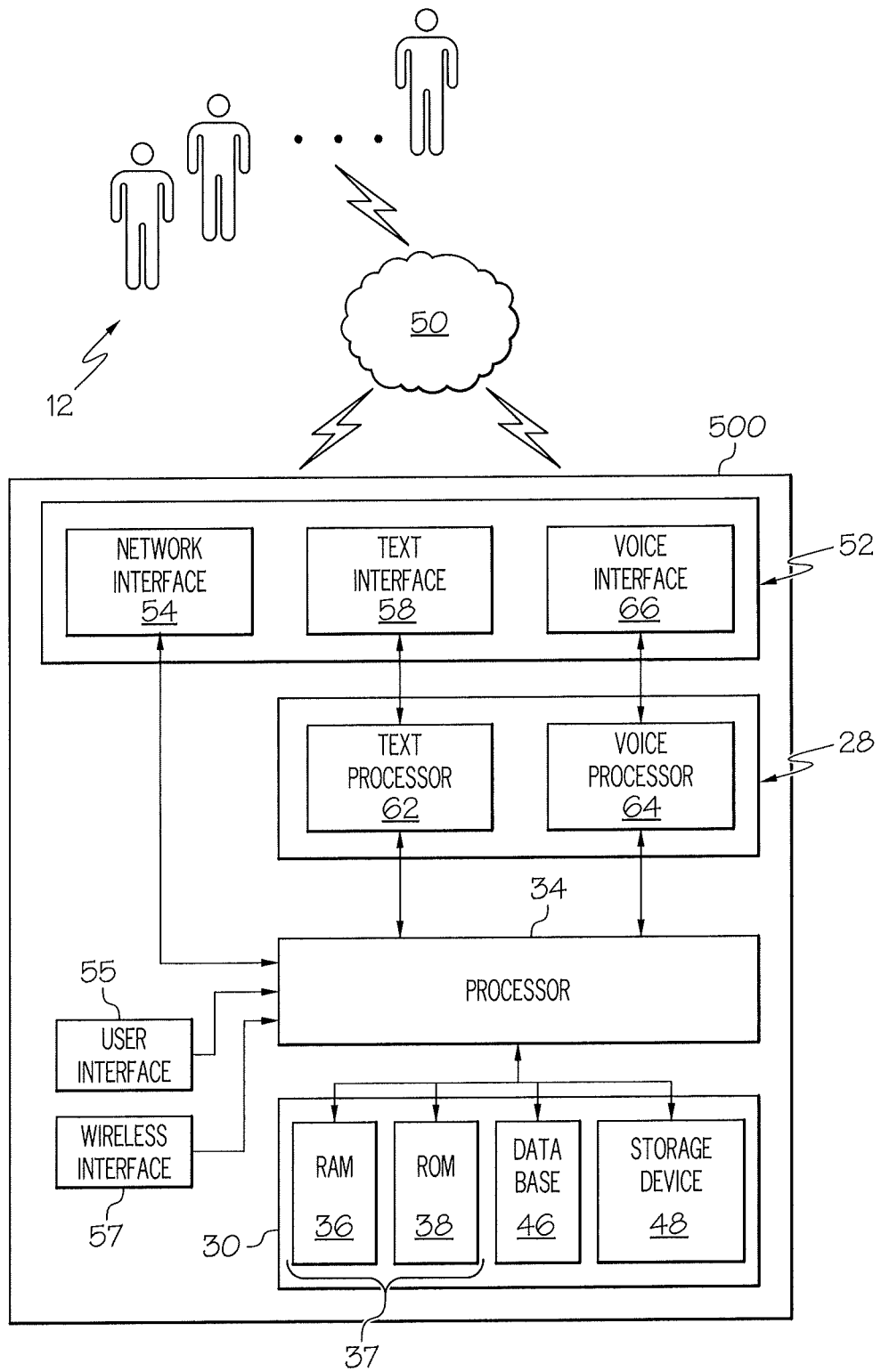
FIG. 5 is a block diagram of an exemplary electronic system which may develop a navigational route in accordance with principles of inventive concepts

FIG. 5 is an exemplary block diagram of a processing system 500 within which a navigational router (see, for example, FIG. 1) in accordance with principles of inventive concepts may be implemented. The processing system may included in a personal digital assistant (PDA), a cell phone, a computer, a laptop, a tablet, a terminal, or any other suitable electronic device, whether wired or wireless, for example. The processing system 500 includes at least one processor 34 (e.g., a central processing unit (CPU)) that stores and retrieves data from an electronic information (e.g., data) storage system 30. As will be appreciated by those skilled in the art, while processing system 500 is shown with a specific set of components, various embodiments may not require all of these components and could include more than one of the components that are included, e.g., multiple processors. It is understood that the type, number and connections among and between the listed components are exemplary only and not intended to be limiting.

In the illustrative embodiment, processor 34 is referred to as CPU 34, which may include any of a variety of types of processors known in the art (or developed hereafter), such as a general purpose microprocessor, a bit-slice processor, a digital signal processor or a microcontroller, or a combination thereof, for example. CPU 34 may be operably coupled to storage systems 30 and configured to execute sequences of computer program instructions to perform various processes and functions associated with the navigational router, including the storing, processing, formatting, manipulation and analysis of data associated with the navigational router (e.g., cartographic data, user input, boat specifications, etc.). The computer program instructions may be loaded into any one or more of the storage media depicted in storage system 30.

Storage system 30 may include any of a variety of semiconductor memories 37, such as, for example, random-access memory (RAM) 36, read-only memory (ROM) 38, a flash memory (not shown), or a memory card (not shown). The storage system 30 may also include at least one database 46, at least one storage device or system 48, or a combination thereof. Storage device 48 may include any type of mass storage media configured to store information and instructions that processor 34 may need to perform processes and functions associated with the navigational router. As examples, data storage device 48 may include a disk storage system or a tape storage system. A disk storage system may include an optical or magnetic storage media, including, but not limited to a floppy drive, a zip drive, a hard drive, a "thumb" drive, a read/write CD ROM or other type of storage system or device. A tape storage system may include a magnetic, a physical, or other type of tape system.

While the embodiment of FIG. 5 shows the various storage devices collocated, they need not be as they could be remote to each other, to processor 34 or both. Storage system 30 may be maintained by a third party, may include any type of commercial or customized database 46, and may include one or more tools for analyzing data or other information contained therein. In particular, database 46 may correspond, all or in part, to a cartographic database, and may include tools for matching cartographic data to locations, whether past, present or future, of a user's vessel, and relating that information to navigational systems, as previously described.

In various embodiments, data storage system 30 may be configured to store data representative of the users 12 (and their boats). Data representative of users 12 may include data that is not specific to the navigational router, such as a name, a delivery address, a zip code, a credit card number, a social security number, a phone number, an email address, or a combination thereof, as examples. Data representative of a user may include data associated with the user and the navigational router, such as, type of boat, boat draft, boat height, boat beam, boat weight, a username, a password, a user rating or ranking, a user comment, a member or account number, an access code, community comments regarding navigation, and so on.

As an example, database 46 may include any hardware, software, or firmware, or any combination thereof, configured to store data. Specifically, database 46 may be configured to store data and information representative of one or more of the plurality of users 12, their boats, and cartographic and navigational information. In some embodiments, database 46 may include one or more fields, wherein a field may be an element of a database record in which one piece of information may be stored. In particular, a field may be configured to store an element of data representative of one or more of the users 12.

In some embodiments, one or more storage device in the data storage system 30 (e.g., database 46) may be configured to store cartographic or route data, or other data associated with the navigational router. Data associated with the navigational router 100 may be stored in storage system 30 using any suitable database format, such as, for example, a relational database, a hierarchical database, or any suitable schema. Data storage system 30 may be configured to store information in a format configured to enhance operations of CPU 34 or other functions of the navigational router.

Processing system 500 may include or interface with one or more security systems (not shown), configured to at least partially restrict or control access to one or more components of processing system 500. Security systems may include hardware, software, firmware or a combination thereof, such as, for example, a firewall, password protection software, user authentication software, encryption software and the like. In some embodiments, security systems may be configured to limit a function of the navigational router, limit access to data associated the navigational router, or both.

In some embodiments, processing system 500 may be configured so that select data contained within storage system 30 may be inaccessible to one or more of the users 12.

Processing system 500 may include a network interface system or subsystem 54 configured to enable cartographic data updates, for example. As such, processing system 500 may be configured to transmit or receive, or both, one or more signals related to the functions of the navigational router 100. A signal may include any generated and transmitted communication, such as, for example, a digital signal or an analog signal. As examples, network 50 may be a local area network (LAN), wide area network (WAN), virtual private network (VPN), the World Wide Web, the Internet, voice over IP (VOIP) network, a telephone or cellular telephone network or any combination thereof. The communication of signals across network 50 may include any wired or wireless transmission paths. The navigational router previously described may employ the one or more networks 50, for example.

To enable communications via network 50, processing system 500 may include a set of interfaces 52 and a set of processors 28, 34. The set of processors 28 may include a text processor 62 and a voice processor 64, along with CPU 34. The set of interfaces may include a network interface 54, a text interface 58 and a voice interface 66, as shown in this embodiment. As mentioned above, network 50 may represent a combination of networks configured to transmit and receive communications with processing system 500, via any of the set of interfaces 52.

CPU 34 may be operably coupled to network interface system 54 for exchanging typical computer network information, e.g., via the Internet, a LAN, WAN, VPN or some combination thereof. Network interface system 54 may be configured to permit communication between and among the users 12 and processing system 500, for example using an Internet protocol (IP) or other network-based protocol. In such cases, network interface system 54 may be configured to utilize TCP/IP, HTTP, DNS or any other application, transport, network, or link protocol, or combination of the foregoing.

Text interface 58 may be operably coupled to a text processor 62 configured to process received text message and text messages to be transmitted. Text interface 58 may be configured to permit text-based communication between users 12 and processing system 500. For example, in combination, text interface 58 and text processor 62 may include functionality to communicate with a two-way pager, a personal digital assistant (PDA), a cell phone, a computer, a laptop, a tablet, a terminal, or any other suitable electronic device, whether wired or wireless. Text processor 62 may include an email system configured to transmit, receive, or process, email messages or a combination thereof. Text processor 62 may also include an instant-messaging (IM) system, a two-way paging system or other system configured to transmit, receive, or process, or a combination thereof, text-based information. As will be appreciated by those skilled in the art, such systems may also provided mechanisms for transferring files between devices. Such files may include any of a wide variety of content.

Voice interface 66 may be operably coupled to a voice processor 64 configured to process received voice information and voice data to be transmitted. Voice interface 66 may be configured to permit voice-based communication between and among the users 12 and processing system 500. For example, in combination, voice interface 66 and voice processor 64 may be configured to enable interaction with a cell phone, a fixed-line telephone, a VOIP device or other similar device, or combinations thereof. For example, voice interface 66 may be configured to transmit, receive, or both digital or analog signals using wired to wireless communications devices and systems, such systems may include telephone, cellular telephone and VOIP systems, as examples.

In some embodiments, the operable connections between components of processing system 500 may be other than as shown in FIG. 5. For example, data storage system 30 may be operably connected to communication processors 28 or interfaces 52, or both, such that users from the plurality of users 12 may modify data stored in data storage system 30 using such interfaces and processors. User interface 55, which may include one or more displays, including touch-screen displays, for example, may also include keypad, button, or other input devices, including, in some exemplary embodiments, voice interface 66. User interface may be in addition to network interface 50, for example. Wireless interface may include various technologies, such as Bluetooth technologies that permit a user and/or a navigational router to communicate with other devices including navigational devices, for example, and may be in addition to network interface 54.

In various embodiments, systems that may be associated with the navigational router 100 may include one or more systems configured to provide additional functions associated or useful in conjunction with a navigational routing system. For example, systems associated with the navigational router may include a tracking system (not shown) configured to track the current location and/or heading of a device associated with the navigational router.

It is also contemplated that the navigational router may be implemented using one or more processing systems 500. For example, various embodiments of an navigational router may include a plurality of processing systems 500, components of processing system 500, or other systems associated with the navigational router. Heavy usage may, for example, require relatively high computational power to efficiently operate the navigational router.

In exemplary embodiments in accordance with principles of inventive concepts a system, which may be embodied as a router, plotter or marine navigational device, for example, may determine contours associated with a range of depths and display that range of depths. Such a display may be used, for example, to display a range of depths for fishing. An exemplary embodiment in accordance with principles of inventive concepts of such a display is illustrated in the screen shot of FIG. 6A. Land areas 600 may be distinguished from other areas on the display by use of color and/or texture, for example. A nominal shore line 602 (also referred to herein as a "dry line"), which may be a mid-tide line, low-water tide line, or higher water tide line, for example, may be displayed. The location of shore line 602 may be determined by data provided by official sources or institutions, such as The National Oceanic and Atmospheric Administration (NOAA), the British Admiralty, The United States Army Corps of Engineers (USACE; for navigable streams and bodies of water within the United States), Basin Authorities (related to specific lakes), or other state or private enterprises, or by users, for example. In exemplary embodiments in accordance with principles of inventive concepts, because shoreline information may vary from time to time, shoreline information may be updated from any of these various sources either automatically or in response to a user's request. That is, shorelines may vary dramatically over time, due to drought, an overabundance of precipitation, or due to scheduled or unscheduled releases of water from an impoundment, for example, that results in a shifting of the shoreline. In accordance with principles of inventive concepts, "official sources" may refer to entities, such as government entities, that are charged with maintaining such shoreline information and who may obtain such information through official surveys that may take place on a regular basis (for example, once a year) or that may be conducted in response to an event, such as a hurricane, that alters shoreline information.

Figure 6A:
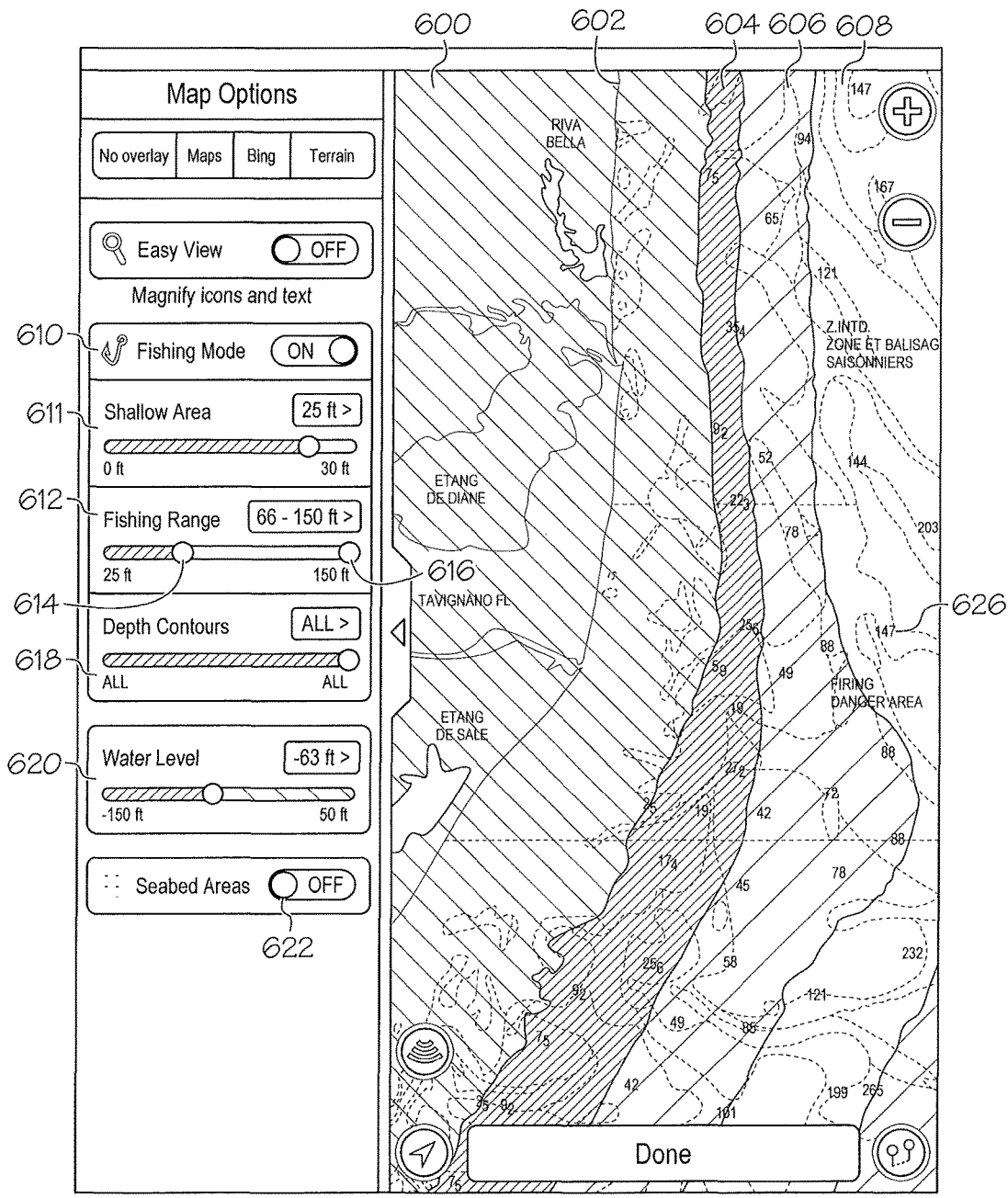
FIGS. 6A and 6B are screenshots illustrating the display of water levels in accordance with principles of inventive concepts.

A region of shallow waters 604 may be highlighted or displayed using display features such as a unique color, texture, temporal variation or combination of such features, for example, that is distinct from that of the land area 600 and a region of deeper water 606 may be displayed using yet another color and/or texture. In exemplary embodiments in accordance with principles of inventive concepts a system may accept a user's input, through a slider 611 for example, regarding what the user considers "shallow." In the exemplary embodiment in accordance with principles of inventive concepts of FIG. 6A, a user may set the value of shallow water to include areas having a depth of from zero to thirty feet, as indicated by slider 611. In the screenshot of FIG. 6A, a user has set the shallow water definition at twenty five feet. As a result, any watery regions having a depth of less than twenty-five feet will be included in the displayed shallow area 604.

In accordance with principles of inventive concepts, a system may accept vessel characteristics, such as draft and beam, for example, and automatically determine from such input regions that are shallow and display such regions accordingly. That is, regions that may be judged of adequate depth for a jet boat, with very little draft, may be considered shallow for a larger sail boat with a six foot draft, for example. A system in accordance with principles of inventive concepts may accept a vessel's draft information, compare that information to cartographic information and display regions that are considered shallow for the vessel. For ease of use, the margin, that is, the difference between the vessel's draft and the cartographic depth that is considered acceptable for travel, may be preset by the system and may also be user-adjustable, for example.

In accordance with principles of inventive concepts, a user may manually shift the nominal shoreline to accommodate shoreline movement (as indicated, for example, by the NOAA or other source); a user may retain the nominal shoreline and manually offset displayed features from the nominal shoreline (using, for example, update information provided by a navigational system in accordance with principles of inventive concepts); or a system in accordance with principles of inventive concepts may automatically update the nominal shoreline to accommodate such shoreline shifts, for example.

Other variations in shoreline information may be accommodated by a system in accordance with principles of inventive concepts. Tidal information, and its effect on the location of a shoreline, may be automatically updated or may be manually updated by a user. In a manual mode a user may use a cursor, mouse, slider, or other user interface tool to adjust the shoreline (and have the system update depths accordingly). In a manual mode such as this, a user may obtain updated shoreline information necessary for such adjustments by downloading the information from a nearby tide station, from a weather bureau, or from another reporting body, (including other users), for example.

In an exemplary embodiment in accordance with principles of inventive concepts, tide station icons may be displayed on the charts and a user may "select" a tide station by "clicking on" its associated icon. In response to such a tide station selection, the system may download tide and other information from the selected tide station (via wireless connection, for example) and display the related information, for example, by expanding the display of the tide station icon and displaying the tide information within the expanded icon. A user may then use the tide information thus-obtained to manually update the displayed shoreline and the system may then adjust depth information accordingly.

Alternatively, a user may leave the shoreline unmoved and use an offset value to alter the display of depths, as previously described. In other exemplary embodiments, a system in accordance with principles of inventive concepts may automatically update tidal information and adjust the displayed shoreline and depths accordingly. Such adjustments may be projected into the future, for example, by extrapolating or interpolating the location of the shoreline at a given time when provided the tide at another given time. That is, for example, a tidal station may provide the system with the time of low tide and a user, or the system, may interpolate the location of the shoreline at a time prior to low tide, or extrapolate the location of the shoreline at a time after the low tide. A system in accordance with principles of inventive concepts may obtain the information from a tidal station or other source proximate a point of interest, such as a point within a graphical display, for example. The information may also pertain to locations proximate the system itself, which may be in a location that is not concurrently displayed, for example.

A system and method in accordance with principles of inventive concepts may provide both automatic and manual shoreline/tidal updates and may allow a user to select whichever mode he prefers to use. Similar adjustments may be made, automatically or manually, for non-tidal variations in water levels, for example, in impoundments within which water levels may be controlled by man or which may experience seasonal, or weather-related, variations. Additionally, a system in accordance with principles of inventive concepts may automatically download tidal information from the nearest tidal station, weather station, or other source, and employ that information to automatically update shoreline location, depth contours and water levels.

In an exemplary embodiment in accordance with principles of inventive concepts of FIG. 6A, a user may activate the fishing mode using button 610. Range selector 612 allows a user to set a fishing depth range employing slider button 614 and slider button 616 to set the upper and lower limits, respectively, of a fishing range. In exemplary embodiments in accordance with principles of inventive concepts, depths outside the fishing range are displayed as they were before selection of the fishing range. That is, for example, if a user sets the fishing range between sixty and one hundred and fifty feet, and if the region below one hundred and fifty feet had been displayed as a light blue region, that region would remain light blue.

In exemplary embodiments in accordance with principles of inventive concepts, a system may directly employ cartographic data or may offer the option of enhanced cartographic data for display. Cartographic data may be provided by government agencies, such as NOAA, The Army Corps of Engineers, or The British Admiralty, by private cartographic services, or by users, for example. User-supplied information may be uploaded by end users who employ a system in accordance with principles of inventive concepts, for example, and that uploaded information may be combined with existing cartographic information. In accordance with principles of inventive concepts, cartographic data may be enhanced by interpolation, for example, to provide increased depth resolution. That is, for example, if cartographic information from an official agency provides depth information with contour levels at two meter intervals, a system in accordance with principles of inventive concepts may interpolate the contour information to produce finer-grained resolution, of, for example, one or one-half meter intervals.

Different contours may be displayed as different shades of the same color (dark blue through a very light blue, for example) or as different colors, for example. In exemplary embodiments in accordance with principles of inventive concepts, regions between contour lines may be shaded in a continuously variable manner, with color (or grey-level) varying between the contour lines. Additionally, the full range of a color may be evenly distributed across displayed contours, or, at a user's discretion, for example, the same depth levels (that is, regions between the same contour lines), may be displayed using the same shade, regardless of the number of contours being displayed. That is, for example, in one display that includes a region with very steep features the full range of shading (for example, from deepest to lightest blue) may be distributed across ten contour levels and in another display that does not include so many contour levels, the same range of shading may be distributed across a lesser number of contour levels.

Alternatively, the same contour region (for example, from zero to ten feet) may be assigned the same color shading in all displays. Contour lines may be displayed under control of a user. For example, even if contours are displayed at one-foot intervals, with shade variation for each interval, a user may elect to have contour lines displayed at only every five or ten feet. Any or all of the contour lines may be marked with the associated depth of the water or, optionally, the depth of a contour line may be displayed in response to a user's graphical interaction, for example, by "mousing over" or "clicking on" a contour line.

In accordance with principles of inventive concepts, a user may manipulate depth contour slider 618 to control the areas in which depth contours are displayed. In the exemplary embodiment of FIG. 6A, depth contours are displayed for all depths. However, a user may prefer to display details such as contour depths for only a range of depths, such as a fishing range, in order to better focus on that range of depths. A system and method in accordance with principles of inventive concepts allows a user to do so.

A water level slider 620 allows a user to manipulate the display so that water level adjustments may be accommodated on the display. If, for example, the body of water of interest is susceptible to level adjustments, a user may adjust the display to correspond to such water level adjustments. For example, if the body of water is an impoundment, such as Lake Mead, water levels may drop due to drought or the release of water or it may rise due to heavy snowmelt, for example, and, in accordance with principles of inventive concepts, a user may employ the water level slider 620 to adjust the displayed water level accordingly. In the exemplary embodiment of FIG. 6A, the user has adjusted the water level downward by 63 feet. In response, the system updates the display to extend the land area beyond the nominal shore line 602 to include areas that are up to 63 feet deep under nominal conditions. Other areas, such as the shallow area 604, deeper water 606 (water having a depth between the lowest extend of the shallow area (twenty-five feet in this exemplary embodiment) and the upper limit of the fishing range (sixty-six feet in this exemplary embodiment), and the fishing range 608 are redrawn to reflect the adjusted water levels.

In exemplary embodiments in accordance with principles of inventive concepts, the lower limit of a user's shallow area selection may automatically be reflected in the upper limit of the fishing range. That is, for example, if a user sets the lower limit of his shallow area to twenty five feet, as illustrated in the exemplary embodiment of FIG. 6A, the upper limit of his fishing range may be limited to no less than twenty-five feet, again, as illustrated in the exemplary embodiment of FIG. 6A, where a user may select a fishing range of between twenty-five and one hundred and fifty feet (the user has set a fishing range of between sixty-six and one hundred and fifty feet in this exemplary embodiment).

When activated, seabed areas button 622 displays for a user seabed features. Such features may be identified using various colors, color combinations, or textures, for example. In exemplary embodiments in accordance with principles of inventive concepts, a sandy bottom area may be displayed as a yellow area, a muddy bottom area may be displayed as a green area, a rocky bottom area may be displayed as a brown area, and a clay bottom area may be displayed as a white area surrounded by a black dotted line, for example.

In exemplary embodiments in accordance with principles of inventive concepts, water levels may be adjusted and displayed according to tide levels. The tide levels used for such an adjustment may be predicted or measured values, for example, and may be obtained from a variety of sources, including the National Oceanic and Atmospheric Administration (NOAA) or the British Admiralty, for example. In exemplary embodiments in accordance with principles of inventive concepts, a system may provide weather and tide information, accessible, for example, through an interactive menu. A user may obtain tide information through such a menu or, as previously described, by interacting with a tidal station icon on a user display. And, also as previously described, a user may employ such tide information to manually update the system's chart display (using a positive or negative offset, for example) to reflect the level of the tide.

Figure 6B:
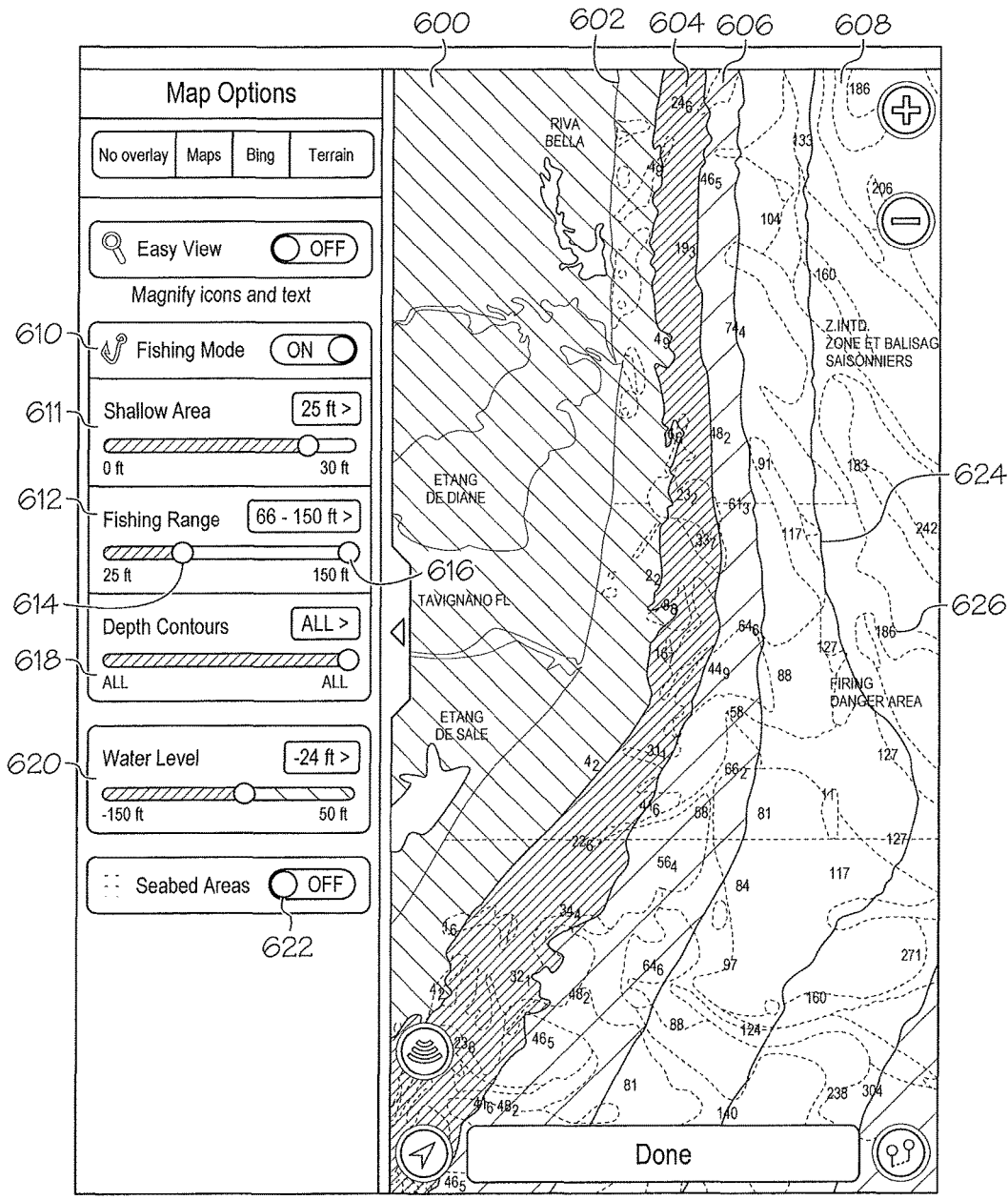

The screenshot of FIG. 6B displays a user interface with a user having made substantially the same selections as with the screenshot of FIG. 6A, except that in this case the water level has been reduced from the nominal value by twenty-four feet, rather than the sixty-three feet of FIG. 6A. Adjustment of water levels is reflected in the differences in shallow areas 604, deeper areas 606, and fishing region 608. For illustrative purposes a line 624 demarking the upper limit of the fishing region with the negative sixty three foot water level offset of FIG. 6A is shown in FIG. 6B, where the water level offset is negative twenty four feet. In accordance with principles of inventive concepts, line 624 would not necessarily be shown in an actual display. Water level adjustments are also reflected in adjusted contour lines and water depths, as demonstrated, for example, by water depth indicator 626.

In FIG. 6A the water depth at the point indicated by reference number 626 is one hundred and forty seven feet and, in FIG. 6B, where the water level adjustment is only twenty four feet, rather than the sixty three feet of FIG. 6A, the depth at that point is one hundred and eighty six feet, reflecting the difference in water level adjustment of thirty-nine feet. The area of land exposed, that is the area of land between the nominal shore line 602 and the adjusted shore line (that is, the uppermost level of the shallow area with adjusted water levels), also reflects the adjusted water levels. Although not shown in FIGS. 6A and 6B, contour levels may also be shifted by a system in accordance with principles of inventive concepts in response to user input regarding water level adjustments. Although user input is generally referred to herein as the mechanism for updating water levels, a system and method in accordance with principles of inventive concepts may adjust water levels automatically, for example, in response to input from a processor that obtains such information locally (for example, from sounding equipment that compares measured depths to charted depths) or remotely (for example, from information downloaded through a wireless link).

Figure 7A:
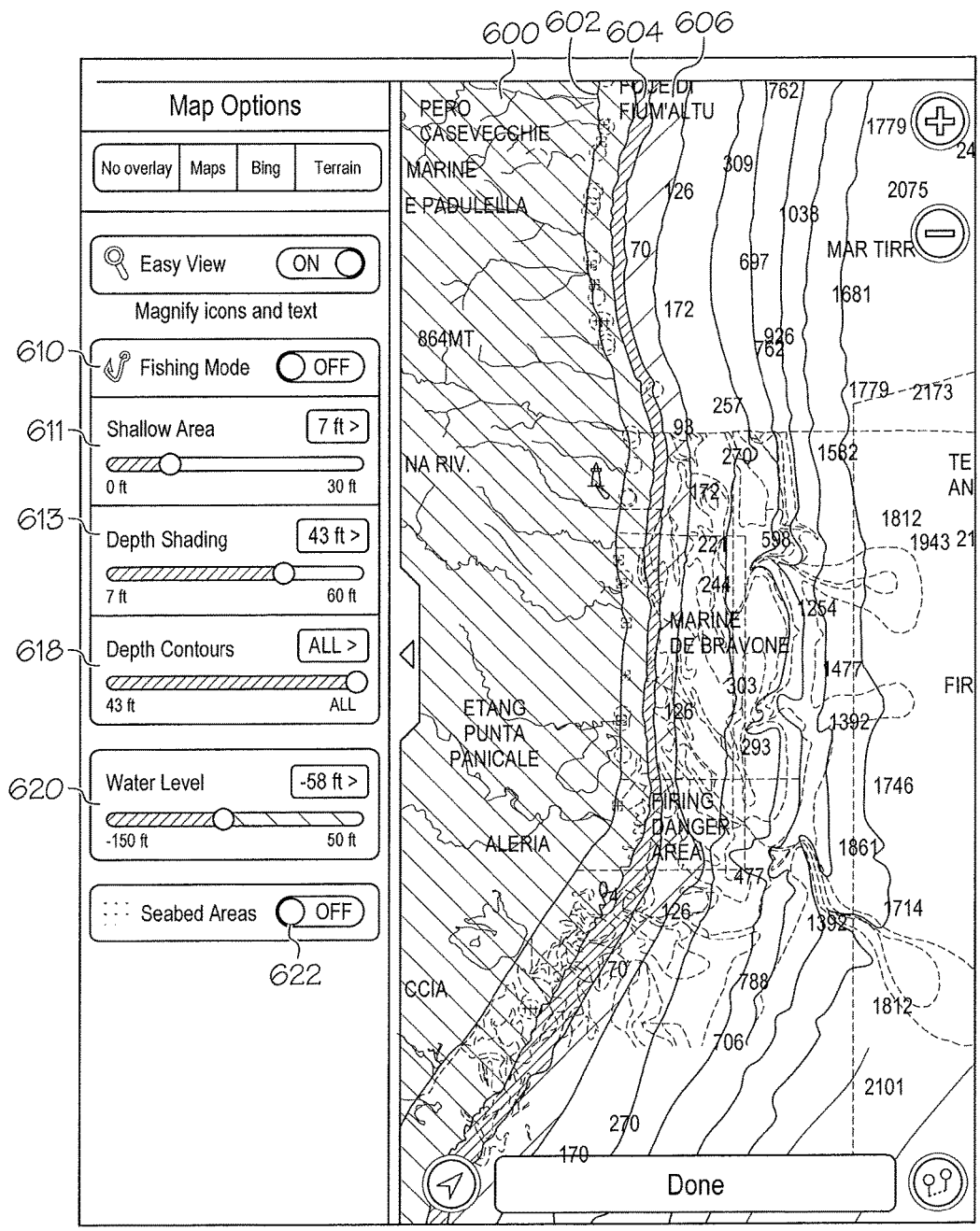
FIGS. 7A and 7B are screenshots illustrating the display of depth shading and seabed areas in accordance with principles of inventive concepts.
Figure 7B:
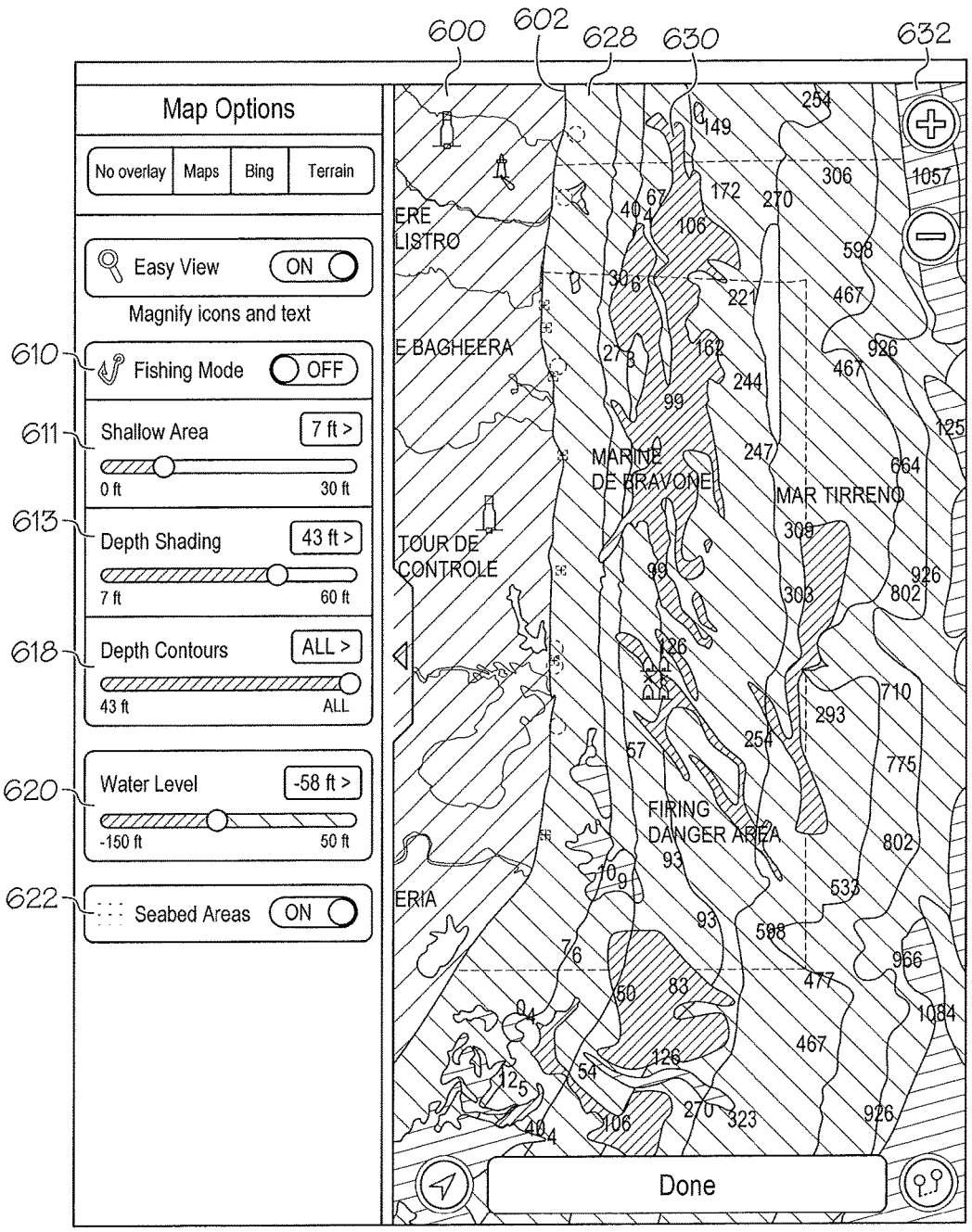

A system and method in accordance with principles of inventive concepts may display depth shading and seabed areas, as illustrated in the exemplary screenshots of FIGS. 7A and 7B. In this exemplary embodiment, depth shading, and the associated depth shading slider 613, is only available when the system's fishing mode is deactivated, as indicated by fishing mode button 610 being positioned in the "OFF" position. In the exemplary embodiment of FIG. 7A the shallow area is set to include all areas with depths up to and including seven feet. Depth shading which can be selected using slider 613 from depth values that range from an upper limit that coincides with the shallow area setting (seven feet in this exemplary embodiment) to a lower limit that may be a fixed value (sixty feet in this exemplary embodiment). In exemplary embodiments in accordance with principles of inventive concepts, a multitude of contours may be displayed, with each contour delineated by a contour line and/or contour shade. For example, although only two contour levels, and a corresponding two shades, or intensities, of blue, are displayed in the exemplary embodiment of FIG. 7A, in accordance with principles of inventive concepts, tens or hundreds of shades of one or more colors may be used to identify various contours.

Although, in this exemplary embodiment, a single color, blue, is used to display all contours, additional colors may be employed in order to display contours, for example, when several contours are displayed and additional colors may help a user distinguish among the displayed contours. Contour information may be obtained from any of a variety of sources, including NOAA, the British Admiralty, or, supplementary SONAR soundings. A user may select from among a variety of contour "thicknesses" (that is, variations in depth) ranging, in exemplary embodiments, from one foot to sixty feet and, although limited to sixty feet in the exemplary embodiment of FIG. 7A, the lower limit of a contour-shading range may extend to the lower limit of cartographic data available. In exemplary embodiments each region between two consecutive depth contour lines is colored with a more or less intense shade of blue. In exemplary embodiments in accordance with principles of inventive concepts, logarithmic processing allows the variation in intensity to be almost continuous and contour steps may be as little as a foot or less. In this exemplary embodiment, depth contours are displayed for regions where the water is deeper than that for which depth shading is employed. In exemplary embodiments in accordance with principles of inventive concepts, depth contours may be displayed at various, user-selectable intervals (every five feet or every ten feet, for example), as available data permits.

In the exemplary embodiment of the screenshot of FIG. 7B, as indicated by activation of the seabed areas button 622, the display of seabed areas is turned on. In this exemplary embodiment, the yellow of seabed area 628 indicates that that area has a sandy bottom, the orange of seabed area 630 indicates that the area has a gravel bottom, the green of seabed area 632 indicates a muddy bottom. Other bottom surfaces may include a rocky bottom indicated by a brown area and a clay area indicated by a black dotted line filled with white. Such information may be useful, for example to a fisherman who may employ such information in a search for different types of fish that frequent different bottom areas. Additionally, in accordance with principles of inventive concepts, more detailed information about seabed characteristics, such as percentage composition (for example, gravel sediments containing from 50% to 100% particles ranging in size from 2 to 20 millimeters).

Figure 8:
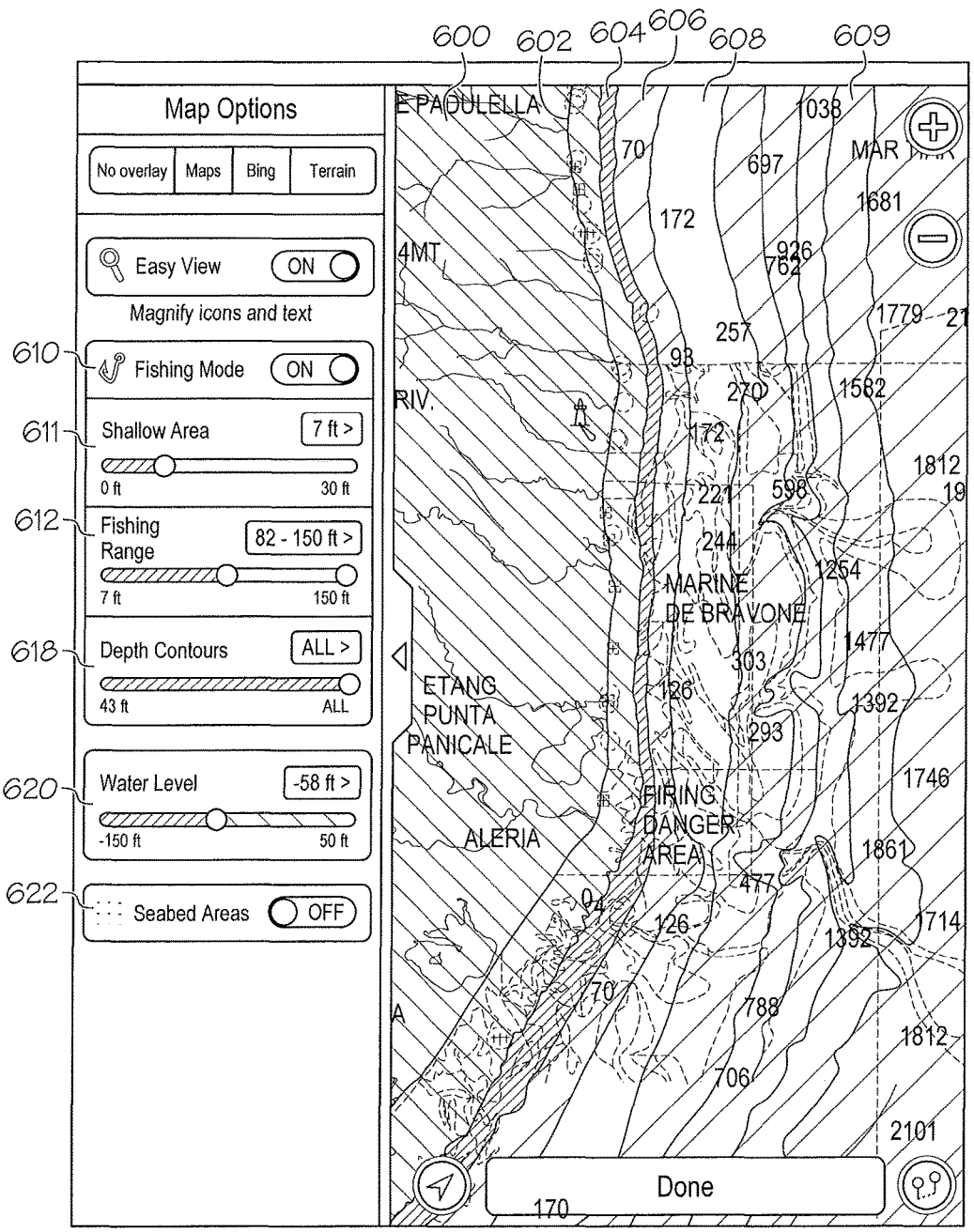
FIG. 8 is a screenshot illustrating the display of a fishing range in accordance with principles of inventive concepts.

As indicated in the exemplary embodiment in accordance with principles of inventive concepts of the screenshot of FIG. 8, a navigational router may highlight a fishing range 608 using, for example, a white color, with ranges 606 and 609 respectively above and below the fishing range. In this exemplary embodiment, the fishing range is set to between eighty-two and one hundred and fifty feet. Additionally, in this exemplary embodiment, a white region indicates the selected fishing range, when operating in fishing mode and, when not in fishing mode, a white region indicates a region of maximum depth (that is, a region at least sixty feet deep in this exemplary embodiment). In exemplary embodiments in accordance with principles of inventive concepts, a white region is safe for navigation.

Figure 9A:
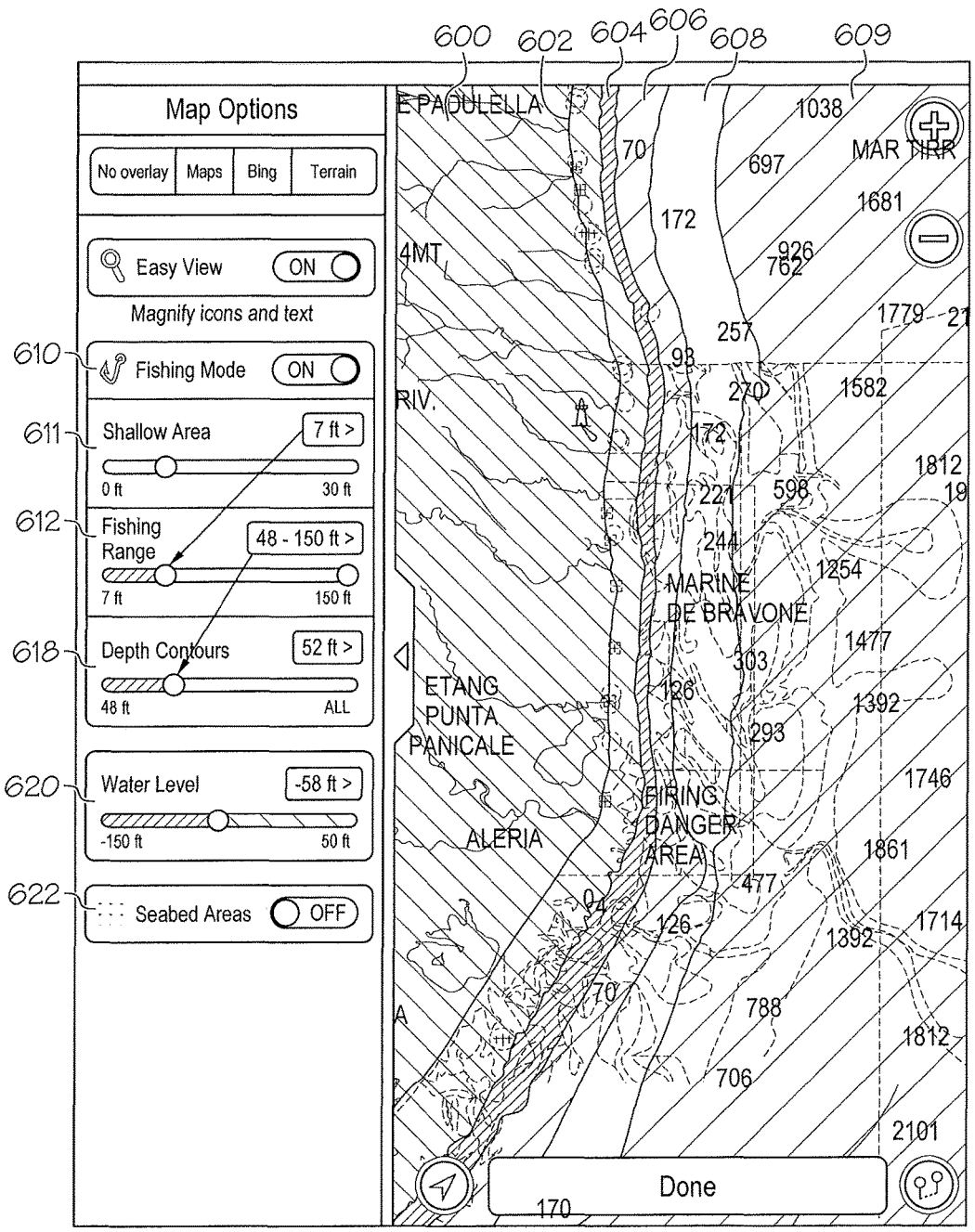
FIGS. 9A and 9B are screenshots illustrating the display of shallow areas and depth contours in accordance with principles of inventive concepts.

In an exemplary embodiment in accordance with principles of inventive concepts, minimum levels for selection of a fishing range and for selection of regions within which to display depth contours may be set by a navigational router. Such minimum values may be, as illustrated in the exemplary embodiment of FIG. 9A, set at the deepest level of the shallow area setting and at the minimum value of the fishing range, respectively. That is, in exemplary embodiments, the fishing range may be limited to areas at least as deep as the deepest level chosen as a shallow area. In the exemplary embodiment of FIG. 9A, a user has chosen the shallow area to be any area that is less than seven feet. The slider 612 that allows a user to select a fishing range reflects the seven foot shallow area selection by only allowing a fishing range to be selected from within the range of seven to one hundred and fifty feet. Similarly, because the user has selected a range of from forty eight to one hundred and fifty feet for a fishing range, the router allows a user to select depth contours to be displayed for depths greater than or equal to the forty eight feet level that is the shallower end of the fishing range, as reflected by the forty eight feet displayed at the upper level of depth contour slider 618.

Figure 9B:
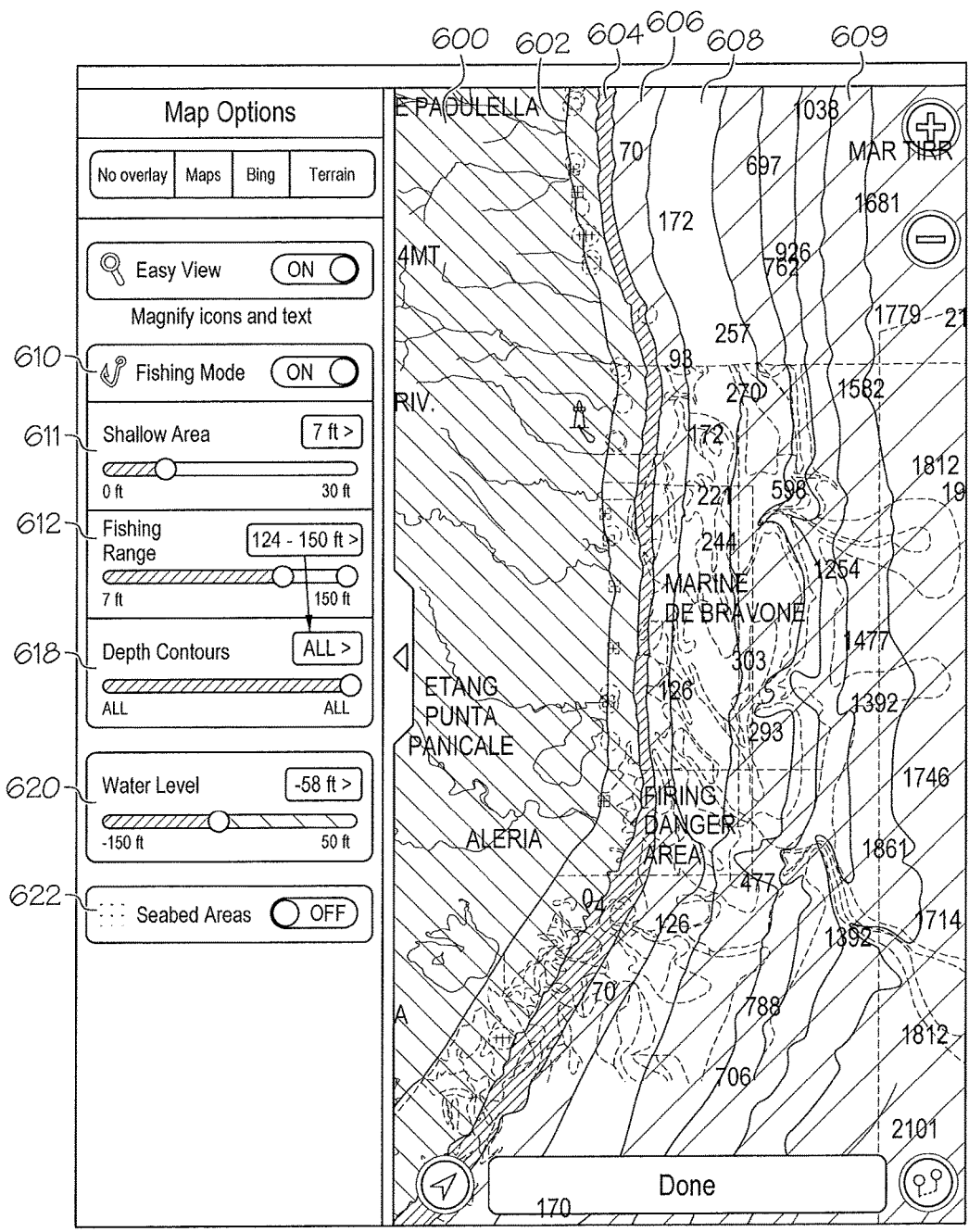

As illustrated in the exemplary embodiment of FIG. 9B, in accordance with principles of inventive concepts, the selection of the upper level of a fishing range may be automatically reflected in the display of depth contours. That is, in exemplary embodiments in accordance with principles of inventive concepts, an upper limit of a fishing range of sixty feet or greater may trigger depth contours to be displayed at all levels, as in FIG. 9B, where the upper level of the fishing range, at one hundred twenty four feet exceeds the sixty feet limit.

Figure 10A:
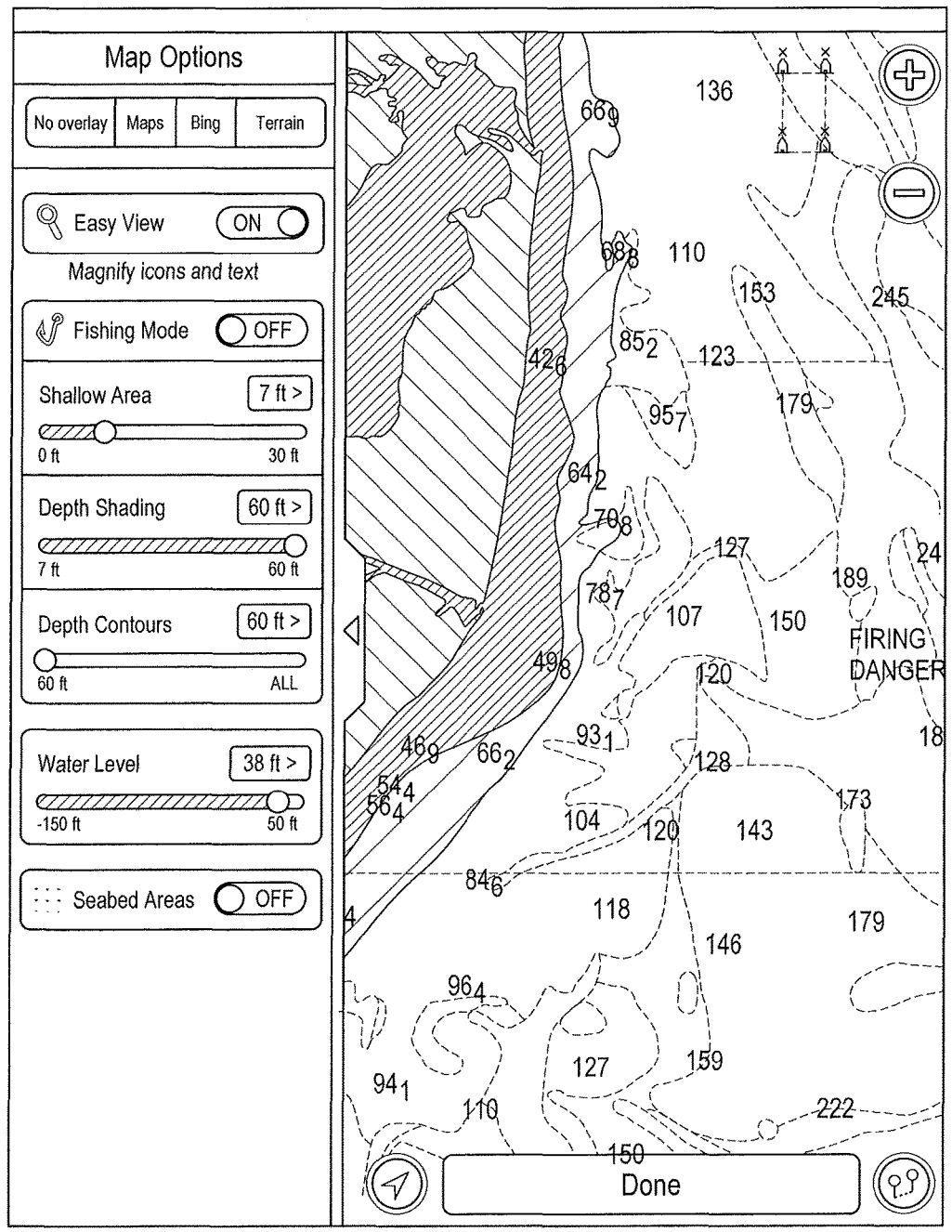
FIGS. 10A and 10B are screenshots illustrating the display of depth contours in accordance with principles of inventive concepts.
Figure 10B:
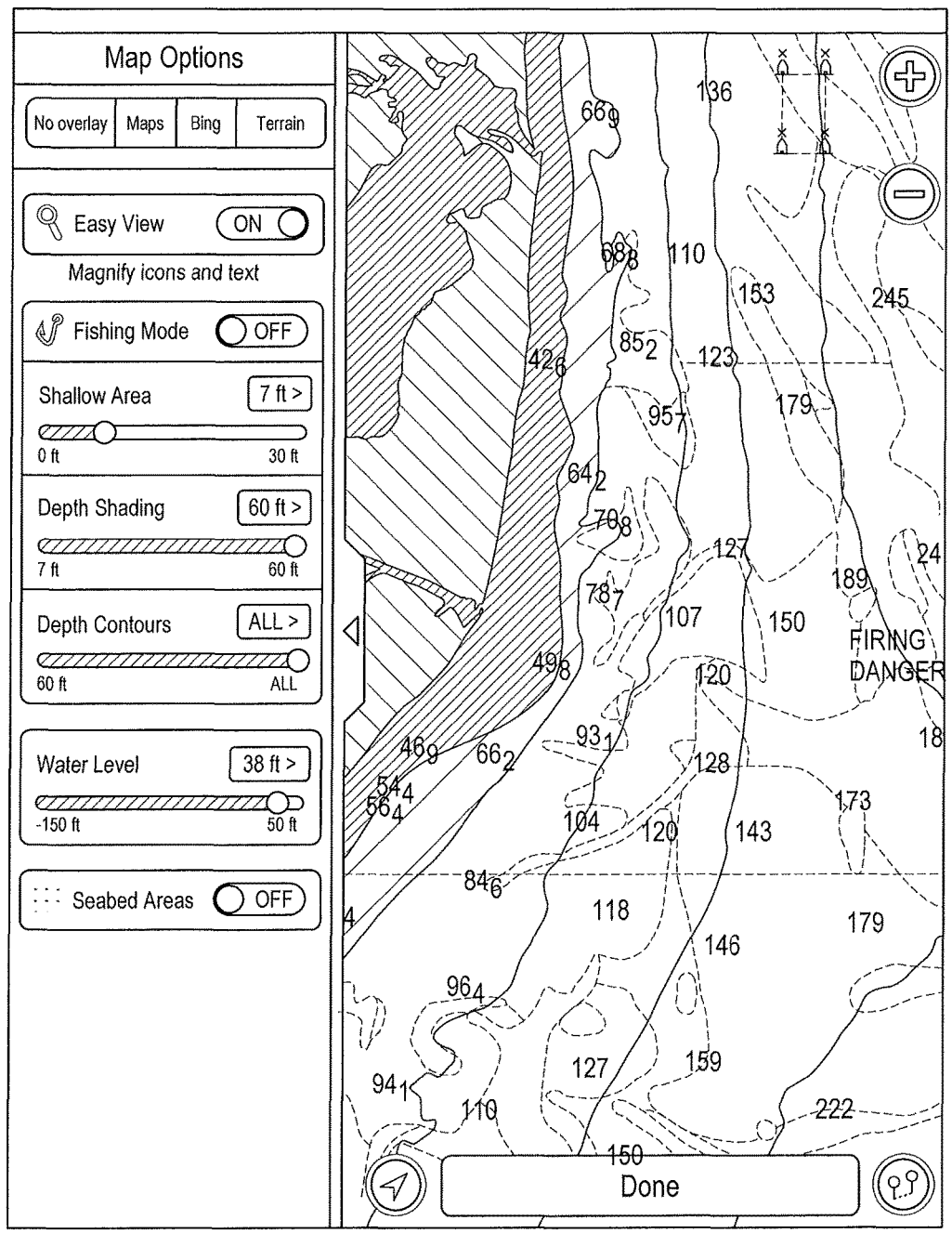

In accordance with principles of inventive concepts, as illustrated in the screenshots of FIGS. 10A and 10B, depth contours are always displayed in white areas. In the exemplary screen shot of FIG. 10A, depth contours are set at sixty feet and at "ALL" in the screenshot of FIG. 10B. In this exemplary embodiment, the color palette employed to display depth contours ranges from a dark blue, representing shallowest regions, through a light blue, representing deep regions (as previously described, in this exemplary embodiment, sixty shades of blue are employed to depict sixty different depth ranges), to a white area, which is used to depict maximum depths (that is, depths greater than or equal to the deepest level at which depth shading is made available). In exemplary embodiments in accordance with principles of inventive concepts, regions that are depicted in white are deemed to be safe for navigation.

Figure 11:
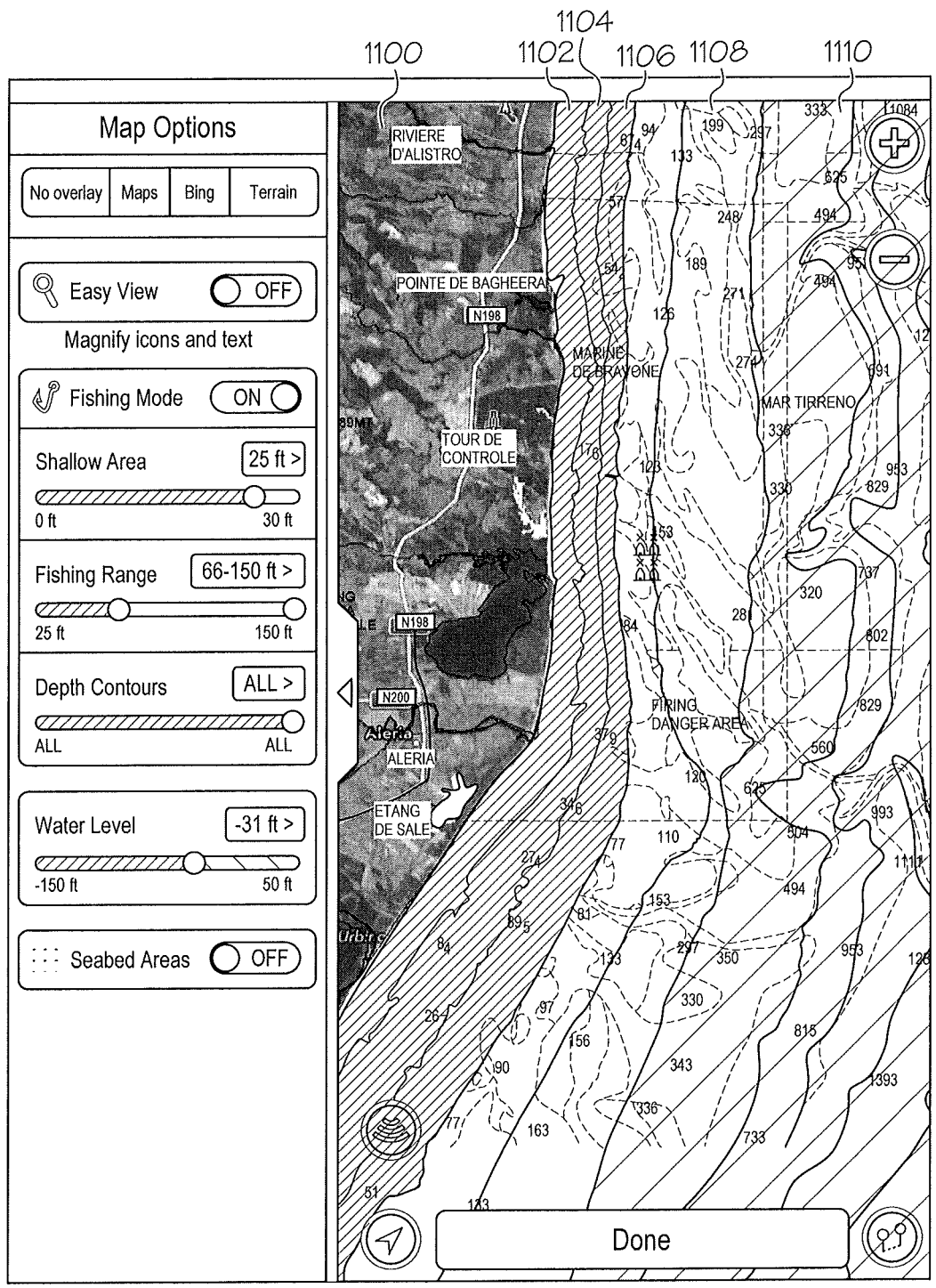
FIG. 11 is a screenshot illustrating the display of overlays in accordance with principles of inventive concepts.
Figure 12:
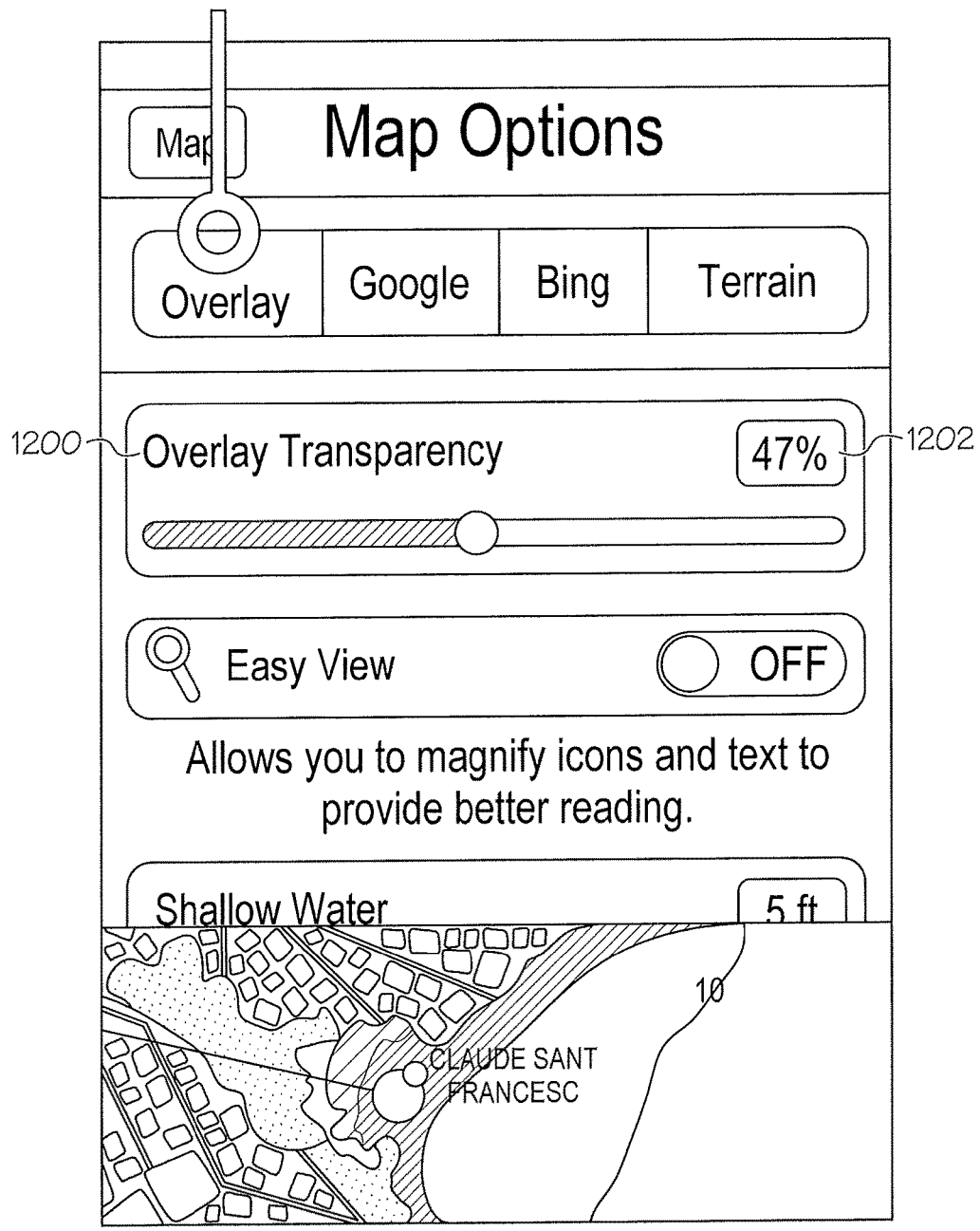
FIG. 12 is a screenshot illustrating the adjustment of transparency levels in accordance with principles of inventive concepts.

A navigational router in accordance with principles of inventive concepts may provide overlays to a user and allow the user to select such overlays to enhance the view of a displayed region. The application of one such overlay, a satellite image overlay, is illustrated in the screenshot of FIG. 11. In this exemplary embodiment a satellite image including a land area 1100, a nominal overlay water area 1102, a shallow area 1104 (including red icons to indicate that it is a shallow area), and a region 1106 that reaches down to the upper limit of the fishing range 1108, is overlaid on the chart image of the screenshot. Nominal overlay water area 1102 is a region of water that would be seen from the air if viewed at a nominal time (e.g., high tide, low tide, or mid-tide), but, in this example, because the user has set the water level at −31 feet, it appears as a water region situated above the shallow area and displaced shoreline. Fishing range 1108 and a range 1110 deeper than the deeper limit of the fishing range are as previously described. In accordance with principles of inventive concepts, other overlays, such as graphic overlays, may be overlain on a chart display in accordance with principles of inventive concepts. Overlays may include maps from any of a variety of sources, terrain, or other features, for example. In accordance with principles of inventive concepts, overlay images may be obtained from a variety of sources, including, for example, web browsers. As illustrated in the screenshot pair of FIG. 12, a user may adjust the transparency of an overlay using, for example, a slider 1200, or numerical percentage input 1202 (each is reflected in the other).

In exemplary embodiments in accordance with principles of inventive concepts a system may employ readings from various sources to update cartographic data and to, for example, increase the resolution of contours displayed, stored, or otherwise used (for example, for calculating routes) by a system in accordance with principles of inventive concepts. FIG.13A-13C illustrates the use of SONAR log recordings, which may be acquired by a user directly and entered into a system in accordance with principles of inventive concepts, or may be acquired by another party (for example, another user of a system in accordance with principles of inventive concepts) and employed by a system in accordance with principles of inventive concepts for the acquiring user and/or for other parties using such a system. Such information is not limited to SONAR information. A system in accordance with principles of inventive concepts may employ such acquired data to interpolate depths between existing depth contours and thereby develop charts having finer gradations in contours (that is, more contours for a given difference in depth), as illustrated by the greater number of contour lines in FIG. 13C, after employing SONAR logs for interpolation, than in FIG. 13A, before SONAR logs were acquired. Readings, such as SONAR readings, may be acquired specifically for use by a system in accordance with principles of inventive concepts, using a specific grid-search pattern, for example, in combination with more frequent soundings in areas of specific interest (for example, in areas of known hazard, or in areas where depths are known to change dramatically). As illustrated by the "random walk" appearance of the recording path of FIG. 13B, however, readings may be obtained as an ancillary process while performing other operations, such as pleasure-cruising, fishing, or transporting cargo or passengers, for example. Data obtained during any of these activities may be obtained by any number of users, whether they also use a system in accordance with principles of inventive concepts or not, and may employed by a system in accordance with principles of inventive concepts to refine cartographic information by, for example, using such information ("crowd-sourced" information, for example) to interpolate depth readings and to otherwise update chart information.

In exemplary embodiments in accordance with principles of inventive concepts a chart plotter may communicate with a SONAR device to develop and record cartographic information, with longitude and latitude values provided by the plotter and depth values provided by the SONAR device. The resultant track may be formatted and uploaded, for example, to a central repository, where they may be validated, for example, by a service provider. Tracks may be rejected, or invalidated, for example, if the data is corrupted or unreadable, if a date for the track is not provided, if the tracking information relates to an area that is out of a coverage area, or if values appear to be anomalous, with data values that diverge significantly (with the significance threshold determined by the service provider) from established cartographic data. For example, if a track indicates that a certain point has a depth of ten meters, while an established chart indicates that the depth is actually three hundred meters, the track may be invalidated.

In exemplary embodiments in accordance with principles of inventive concepts a navigational router may employ pre-defined routes, or route segments, to create a route for a user. When going from point A to point B a user may download a predefined route, store the route, and follow it during a cruise or may download the route "on the fly" during a cruise. Various routes may be strung together by a navigational router in accordance with principles of inventive concepts. For example, if a user intends to travel from point A to point D, routes may be available from point A to point B, from point B to point C, and from point C to point D. A navigational router in accordance with principles of inventive concepts will allow a user to download and store all such routes and link them together to provide a route from point A to point D, for example.

In exemplary embodiments in accordance with principles of inventive concepts a system employs a vessel-centric approach to route development. That is, a user may enter attributes of his vessel (for example, draft, beam, etc.) and the system responds to those attributes in the development of routes for the vessel. This is in contrast to an approach whereby a user simply enters information regarding what he considers a safe depth within which to operate. Because a vessel's characteristics may change over time: as fuel is depleted, as stores are added to or depleted from a vessel, as operating speeds change, in exemplary embodiments in accordance with principles of inventive concepts a user may enter and update such vessel-centric characteristics and the system provides safe operating margins for the vessel when developing a route for the vessel. The system allows a user to determine an operating margin, by selecting from a pull-down menu, by directly entering a clearance figure, or by other entry means; takes into account cartographic characteristics (that is, water depths, sea floor hazards, obstructions, weather hazards, etc.), vessel characteristics (draft, vessel type, operating speed, beam, etc.); and automatically, or with user assistance, develops a route for a given set of waypoints entered by the user.

Figure 14:
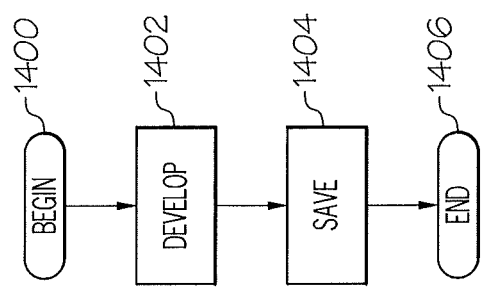
FIG. 14 is a flow chart illustrating the process of developing and saving navigational routes in accordance with principles of inventive concepts.

In exemplary embodiments in accordance with principles of inventive concepts a system in accordance with principles of inventive concepts may save routes that have been developed for future use. Such routes may be developed automatically (employing techniques such as those described above for automatically developing routes), may be developed manually, or may be developed using a combination of automatic and manual route-developing techniques. Such routes may be developed using a vessel-centric approach, as described above, or may simply chart-specific techniques whereby a user and/or router employs cartographic information to track minimum depths, for example. An exemplary embodiment of a process of saving developed routes in accordance with principles of inventive concepts will be described in conjunction with a discussion of the flow chart of FIG. 14. An exemplary process of saving routes in accordance with principles of inventive concepts begins in step 1400 and proceeds from there to step 1402 where a route is developed. The route may be developed automatically, manually, or by a combination of automatic and manual development. The route may be developed using a vessel-centric (taking in to account a vessel's draft, for example) or chart-centric (to include no less than a certain chart-depth, for example) approach, for example. The route may be developed to avoid shallow waters, off-limits regions, weather hazards, to provide the shortest route, to take advantage of favorable winds or currents, or to take advantage of other non-nautical features, as previously described and may employ various levels of interaction from a user. The route may be developed using any technique, including those described above and other known route development techniques.

Once a route is developed the process moves to step 1402 where the developed route is saved. In exemplary embodiments in accordance with principles of inventive concepts, a route may be saved locally, by electronically storing the route in a navigational router in accordance with principles of inventive concepts (using volatile or non-volatile memory, a disk drive, a flash drive, or other storage technology) or by storing it in an associated electronic system, such as a portable electronic device such as a laptop, tablet, smartphone, or other device. Alternatively, or in addition to, local savings, the route may be transferred to other devices, such as other user systems, or to one or more centralized repositories of routes. In accordance with principles of inventive concepts, routes may be transferred directly to other users' systems or may be transferred to one or more centralized storage systems for archiving. Such archived routes may then be transferred to one or more other users who may wish to employ an archived route for all, or a part, of a voyage they plan on undertaking.

In accordance with principles of inventive concepts, routes developed using vessel-centric characteristics may include vessel-centric information (draft, beam, or other characteristic for example) associated with the developed route. Such routes, that is, routes developed with vessel-centric characteristics in mind, may also be organized, at least in part, according to those vessel-centric characteristics. In exemplary embodiments in accordance with principles of inventive concepts, a navigational router may automatically, or with user assistance, plot a route that avoids hazards and/or take advantage of favorable conditions. In exemplary embodiments in accordance with principles of inventive concepts, a navigational router may take into account vessel characteristics to avoid hazards, such as shallow water, strong currents, foul weather, or other hazards or to take advantage of favorable weather, favorable prevailing winds, or favorable prevailing currents, for example. A network of such routes may developed by multiple users, by commercial, government, or other agencies, and may be saved and may be made available to users. Such a network of routes may be used, even, for example, on the open ocean, where it may be more convenient to re-use established routes than to recalculate routes each voyage, for example. Such a network of routes may take any of a variety of forms, including a simple grid pattern that may emulate a street and avenue layout in a city, for example, and may include diagonal, arcuate, or other routes that may allow for shorter overall routes.

Some routes may simply be tracks, that is, the actual logs, of voyages. That is, routes need not be computed before being traversed, but may be stored during and/or after a voyage that develops the route "on the fly," with or without automatic routing assistance. The use of such routes, that is, those based on the tracks of previous voyages, may be of particular importance in particularly hazardous areas, such as canals, which may include many shallow areas and obstacles, for example. Employing a route that is based on or is embodied by the track of a previous successful voyage may provide particular reassurance to the operator of a vessel.

In exemplary embodiments in accordance with principles of inventive concepts a system may develop routes by avoiding hazards, particularly hazards that are specific to a user's vessel (for example, a jet boat won't require the same draft as a heavily-laden barge, nor will a cigarette boat be susceptible to the same wind and sea conditions that a thirty-foot sailboat will), may employ previously-developed, or predetermined, routes, or may employ a combination of predetermined routes and newly-developed, auto-developed, for example, routes. In some situations, automatically developed a route may be particularly challenging. For example, in narrow passages, such as channels marked by buoys, automatically developing a route may require significant processing (manually developing such a route may require even more time); determining where the channel begins, where the channel runs when red and green markers are not properly paired, and other challenges contribute to the difficulty of automatically developing a route in such circumstances. By developing such a route and storing it for use, either by the developer or by others, a system in accordance with principles of inventive concepts eases the burden of route development.

Even in relatively open waters a network of frequently-used navigation lines may be stored and employed by a system in accordance with principles of inventive concepts to aid in the development of routes. A system in accordance with principles of inventive concepts may store a network of previously-developed routes and employ such routes in the development of a new route much as, for example, one might employ a network of streets and avenues to navigate a city. If predetermined routes, for example, frequently-used routes that are stored as a network of routes, can be used to create a complete path from one endpoint to another, a system in accordance with principles of inventive concepts may simply link such predetermined routes. If, on the other hand, waypoints or destinations in a prospective route are not included in a set of predetermined routes, a system in accordance with principles of inventive concepts may calculate a route, or route segment(s), in a manner previously described (for example, avoiding hazards) and add one or more such automatically generated route segments to the network of predetermined routes to provide a completed route. In accordance with principles of inventive concepts, routes may be calculated, stored, validated, maintained, and employed, as just described, to calculate new routes. The validation and maintenance process may be performed, for example, by a system provider, for example, or by a third-party provider, such as a government or navigational authority. The validation process may entail experimental use of a route to ensure that the route is suitable, particularly, if it is to be suitable for a variety of vessels. The maintenance process may entail revisiting a route, particularly after a storm or other event that may have an effect on the navigability of a route.

After storing route information the process proceeds from step 1404 to end in step 1406.

Figure 15:
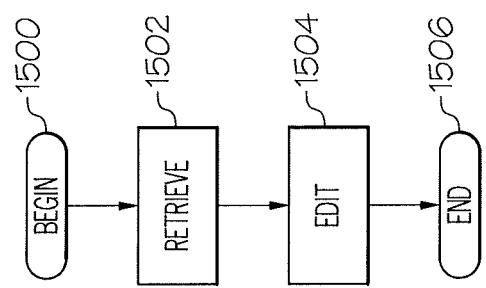
FIG. 15 is a flow chart illustrating the process of retrieving and editing navigational routes in accordance with principles of inventive concepts.

In exemplary embodiments in accordance with principles of inventive concepts a navigational router may retrieve a stored route and use that route for a voyage not yet completed. Such an activity will be described in greater detail in the discussion related to the flow chart of FIG. 15, where the process begins in step 1500 and proceeds from there to step 1502. In step 1502 the process retrieves a stored route. The stored route may have been previously developed and stored by the current user using the current navigational router or it may have been developed by another and stored, for example, in a central repository of routes. The central repository of routes may include, for example, a route storage system that may be operated by a third party, such as a commercial or governmental body, that makes available routes that it develops or that users develop and store. The process may retrieve routes that are characterized and organized by vessel-centric data, as previously described, or may retrieve routes that are simply cartographically determined (including, for example, no transits of regions of depths less than a threshold amount). Using vessel-centric data permits a user to readily retrieve a route that may have been developed for a vessel having the same characteristics (draft and beam, for example) as his own and, therefore, one which would likely be suitable for use with his own vessel. In exemplary embodiments in accordance with principles of inventive concepts a user may enter (using a graphical user interface, keyboard, or other input mechanism, for example)

proposed waypoints and the system may return one or more previously stored routes that may encompass all or a part of the user's proposed voyage.

The process proceeds from step 1502 to step 1504 where routes may be edited. Such editing may include combining retrieved routes or route segments or may include deleting a portion of a retrieved route, for example. If a previously developed route completely encompasses the waypoints of a user's proposed voyage, a user may manually, or a navigational router may automatically, eliminate extraneous route information. For example, if a user's proposed voyage includes Montauk, N.Y. and Chatham, Mass. as waypoints and a retrieved route includes Montauk, Chatham, and Gloucester, Mass., the segment of the route between Chatham and Gloucester may be eliminated, either manually or automatically by a navigational router in accordance with principles of inventive concepts.

On the other hand, if a user wishes to voyage from Montauk to Gloucester and two routes, one between Montauk and Chatham and one between Chatham and Gloucester, are available for retrieval, a system in accordance with principles of inventive concepts may retrieve and link the two routes in order to provide a single route from Montauk to Gloucester for a user. A gap between two legs of a voyage may be filled in using routing techniques, such as autorouting, as previously described. As previously mentioned, routes that have been developed for a vessel having identical characteristics, may be used directly by another such vessel.

While the present inventive concepts have been particularly shown and described above with reference to exemplary embodiments thereof, it will be understood by those of ordinary skill in the art, that various changes in form and detail can be made without departing from the spirit and scope of inventive concepts as defined by the following claims.

What is claimed is:

1. An electronic navigational system, comprising:
a graphical user interface including an input device and a display;
a processor coupled with the graphical user interface, the processor configured to develop a navigational marine route based on a characteristic of a vessel for which the marine route is to be developed,
wherein the processor employs a navigational aid in developing the marine route; and
wherein the marine route provides a clearance from a navigational marine hazard based on the characteristic and includes a start point and end point and at least one intervening waypoint when a navigational obstruction exists between the start point and end point.

2. The electronic navigational system of claim 1, wherein the characteristic of the vessel is the vessel's draft.

3. The electronic navigational system of claim 1, wherein the characteristic of the vessel is the vessel's beam.

4. The electronic navigational system of claim 1, wherein the navigational aid is a buoy.

5. The electronic navigational system of claim 1, wherein the processor employs water depth information obtained from a SONAR log to develop the navigational route in consideration of the vessel's characteristic.

6. The electronic navigational system of claim 1, wherein the processor is configured to save a developed navigational route locally.

7. The electronic navigational system of claim 1, wherein the processor is configured to save a developed navigational route remotely.

8. The electronic navigational system of claim 1, wherein the processor is configured to save a developed navigational route in the form of a navigated track.

9. The electronic navigational system of claim 1, wherein the processor is configured to save an automatically developed navigational route.

10. An electronic navigational system, comprising:
a processor configured to receive and store in a memory nautical navigation routes derived from SONAR logs by a plurality of marine electronic systems, each navigation route developed using water depth measurements produced by a plurality of independent measuring devices and providing a clearance for a vessel according to a characteristic of the vessel;
wherein the water depth measurements include information from at least one measurement device independent of the electronic navigational system; and
wherein the processor responds to requests by providing stored nautical navigation routes to a marine electronic system for use in navigation.

11. The electronic navigational system of claim 10, wherein the processor is configured to provide a stored nautical navigation route to a marine electronic system other than the marine electronic system from which the nautical navigation route was received.

12. A marine electronic system, comprising:
a processor configured to retrieve a stored nautical navigational route that has been developed using measurements of water depth from SONAR logs obtained from a plurality of independent marine electronic systems, wherein the water depth measurements include information from at least one measurement device independent of the electronic navigational system;
the processor configured to edit the retrieved route according to a characteristic of a vessel with which the navigational route is to be employed; and
the processor configured to control a display to generate and display the edited route along with marine cartographic information.

13. The marine electronic system of claim 12, wherein the processor is configured to retrieve a stored navigational route from a remote location.

14. The marine electronic system of claim 12, wherein the processor is configured to edit a route by truncating a retrieved route.

15. The marine electronic system of claim 12, wherein the processor is configured to edit a route by leaving it intact.

16. The marine electronic system of claim 12, wherein the processor is configured to edit a route by linking a plurality of retrieved routes.

17. The marine electronic system of claim 12, wherein the processor is configured to edit a route according to the location of a buoy.

18. The marine electronic system of claim 12, wherein the processor is configured to edit a route to provide a minimum clearance from a hazard.

19. The marine electronic system of claim 12, wherein the processor is configured to edit a route to employ the draft of a vessel with which the route is to be used to provide a minimum clearance from a hazard.

20. The marine electronic system of claim 12, wherein the processor is configured to edit a route to employ the beam of a vessel with which the route is to be used to provide a minimum clearance from a hazard.

21. The marine electronic system of claim 12, wherein the processor is configured to edit a route to employ the height above water line of a vessel with which the route is to be used to provide a minimum clearance from a hazard.

* * * * *